(12) United States Patent
Jeyabalan et al.

(10) Patent No.: US 10,274,066 B2
(45) Date of Patent: Apr. 30, 2019

(54) TURBINE ASSEMBLY FOR HYDROKINETIC TORQUE CONVERTER, AND METHOD FOR MAKING THE SAME

(71) Applicant: VALEO EMBRAYAGES, Amiens (FR)

(72) Inventors: Subramanian Jeyabalan, Troy, MI (US); Alexandre Depraete, Bloomfield, MI (US)

(73) Assignee: Valeo Embrayages, Amiens (FR)

( * ) Notice: Subject to any disclaimer, the term of this patent is extended or adjusted under 35 U.S.C. 154(b) by 197 days.

(21) Appl. No.: 15/168,984

(22) Filed: May 31, 2016

(65) Prior Publication Data

US 2017/0241530 A1 Aug. 24, 2017

Related U.S. Application Data

(63) Continuation-in-part of application No. 15/051,018, filed on Feb. 23, 2016.

(51) Int. Cl.
| | |
|---|---|
| *F16H 41/28* | (2006.01) |
| *F16H 45/02* | (2006.01) |
| *F16D 41/00* | (2006.01) |
| *F16B 5/06* | (2006.01) |

(52) U.S. Cl.
CPC ............ *F16H 45/02* (2013.01); *F16D 41/00* (2013.01); *F16H 41/28* (2013.01); *F16B 5/0642* (2013.01); *F16B 5/0664* (2013.01); *F16H 2041/285* (2013.01)

(58) Field of Classification Search
CPC ......................... F16H 2041/285; F16H 41/28
See application file for complete search history.

(56) References Cited

U.S. PATENT DOCUMENTS

| | | | |
|---|---|---|---|
| 2,749,710 A | 6/1956 | Russell | |
| 2,762,197 A | 9/1956 | Ullery | |
| 3,482,400 A * | 12/1969 | Giraud | F16H 41/28 60/362 |
| 3,828,554 A * | 8/1974 | Hau | F16H 41/26 60/361 |
| 5,655,875 A * | 8/1997 | Sekine | F16H 41/28 192/113.32 |
| 6,123,505 A * | 9/2000 | Sasse | B29C 45/2628 249/57 |
| 6,296,445 B1 | 10/2001 | Chasseguet et al. | |
| 6,378,676 B1 | 4/2002 | Chasseguet et al. | |
| 6,428,276 B1 | 8/2002 | Chasseguet et al. | |

(Continued)

*Primary Examiner* — F Daniel Lopez

(74) *Attorney, Agent, or Firm* — Berenato & White, LLC

(57) ABSTRACT

A hydrokinetic torque converter comprises a stator assembly and a turbine assembly rotatable about a rotational axis. The stator assembly comprises a stator comprising an annular stator hub coaxial to the rotational axis, an annular turbine core ring coaxial to the rotational axis, and a plurality of stator blades integral with and interconnecting the stator hub and the turbine core ring. The turbine assembly comprises a first turbine component coaxial with the rotational axis, and a second turbine component non-moveably secured to the turbine component coaxially therewith. The first turbine component is formed separately from the second turbine component. The first turbine component has a plurality of first turbine blade members integrally formed therewith.

11 Claims, 76 Drawing Sheets

(56) References Cited

U.S. PATENT DOCUMENTS

| | | | |
|---|---|---|---|
| 8,365,890 B2* | 2/2013 | Tamura | F16D 41/066 |
| | | | 192/110 B |
| 2015/0184701 A1* | 7/2015 | Lindemann | F16D 33/18 |
| | | | 60/365 |

* cited by examiner

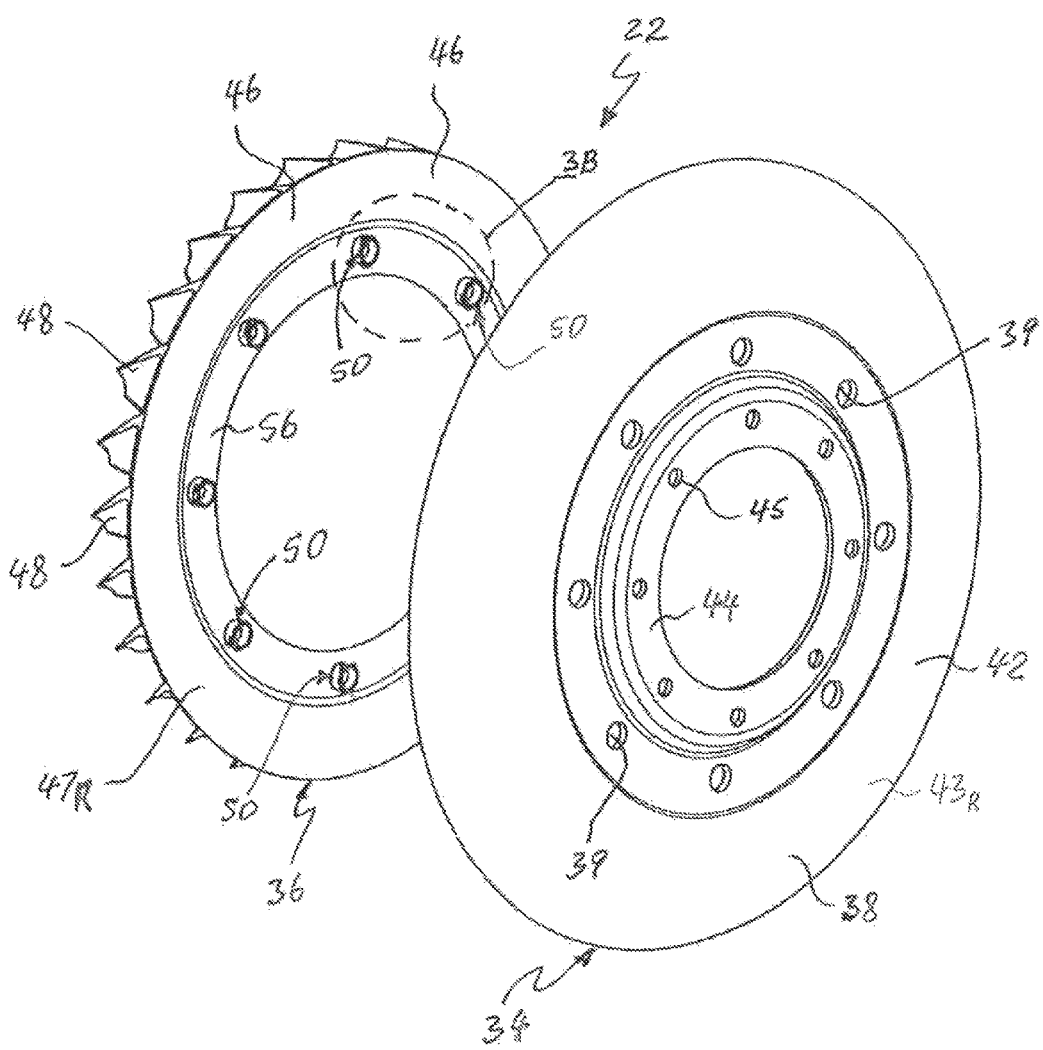

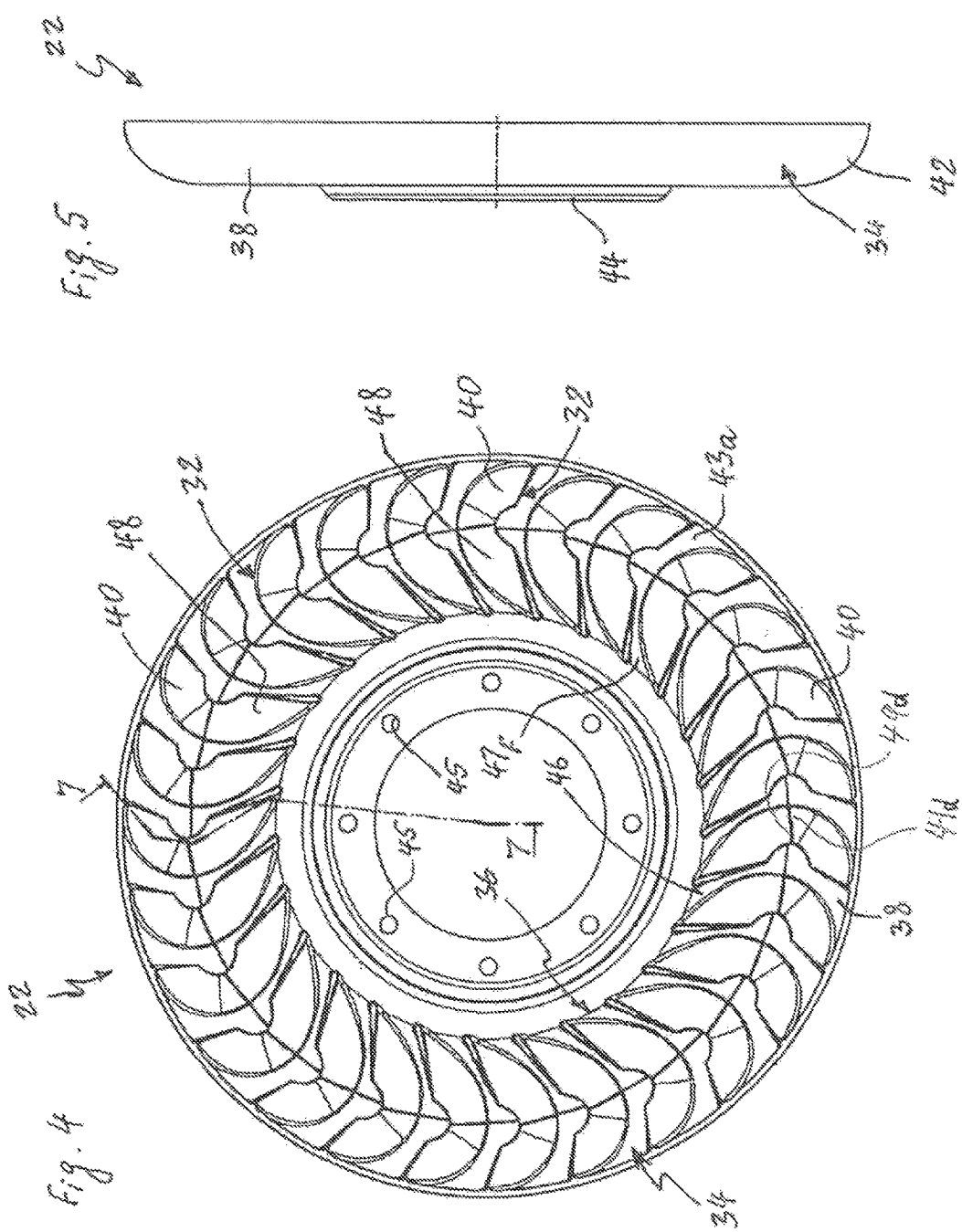

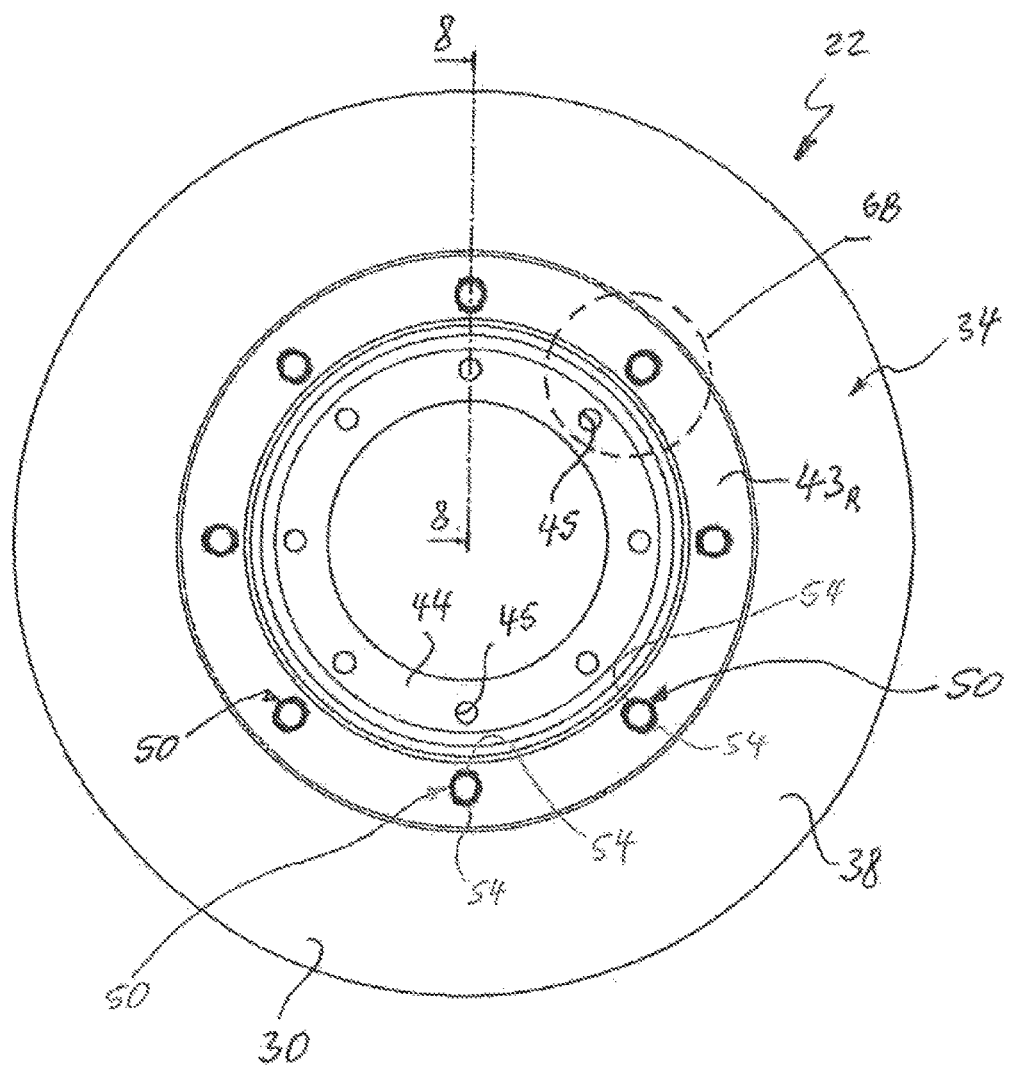

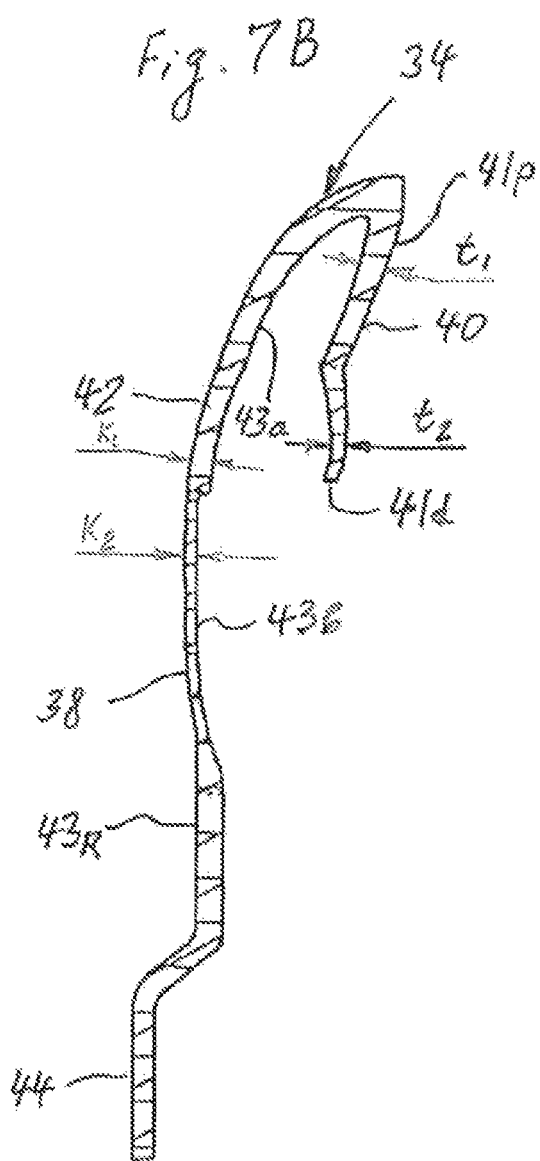

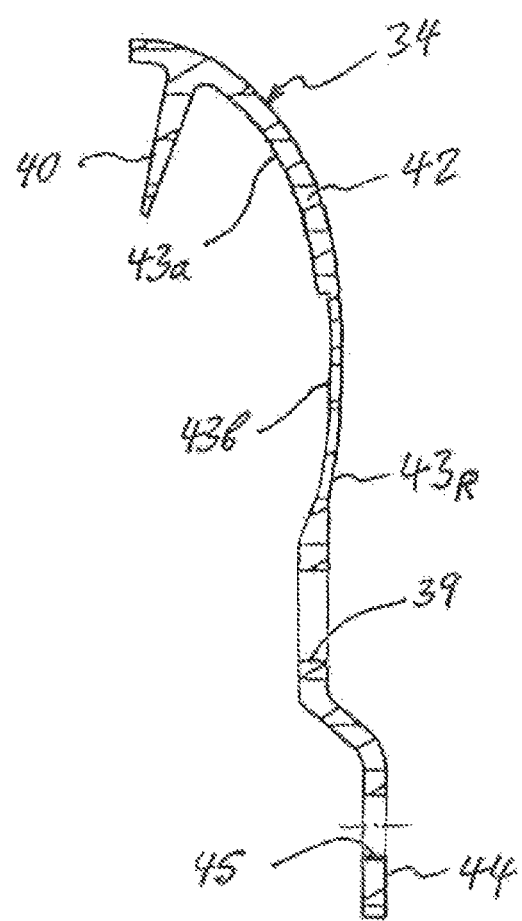

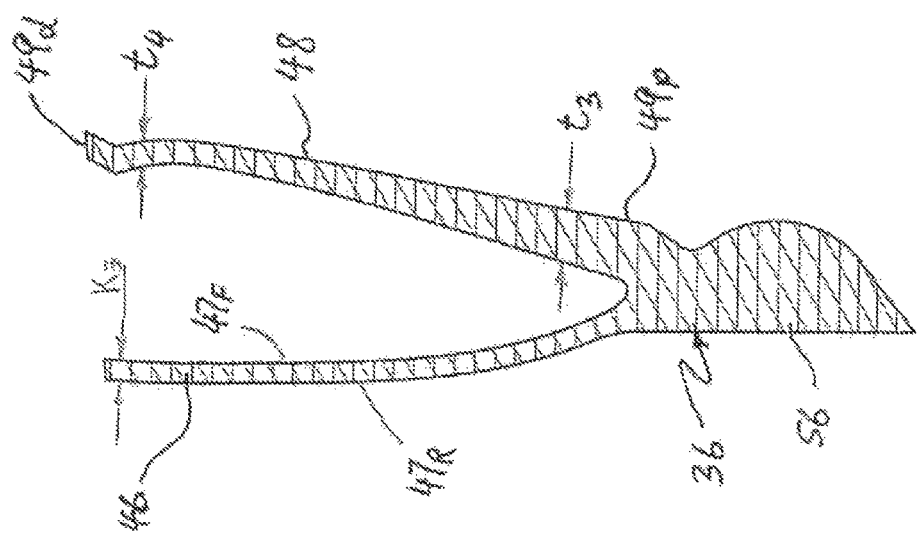
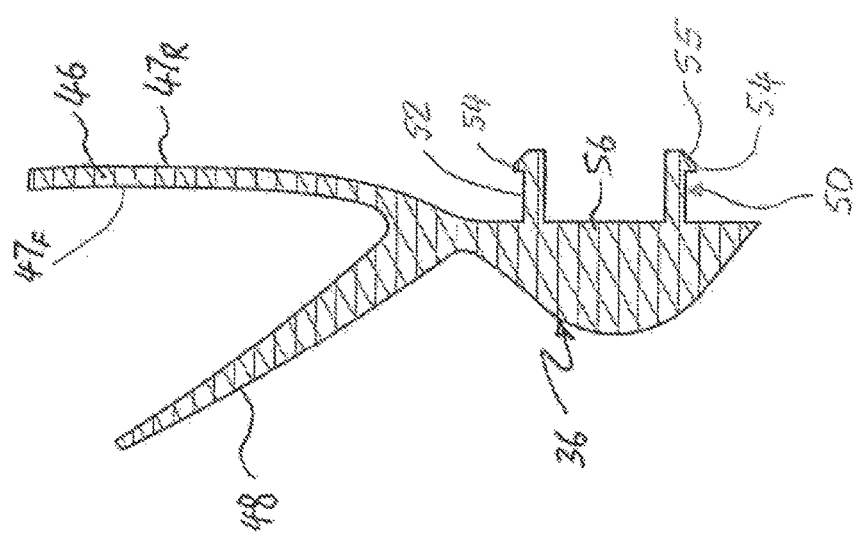

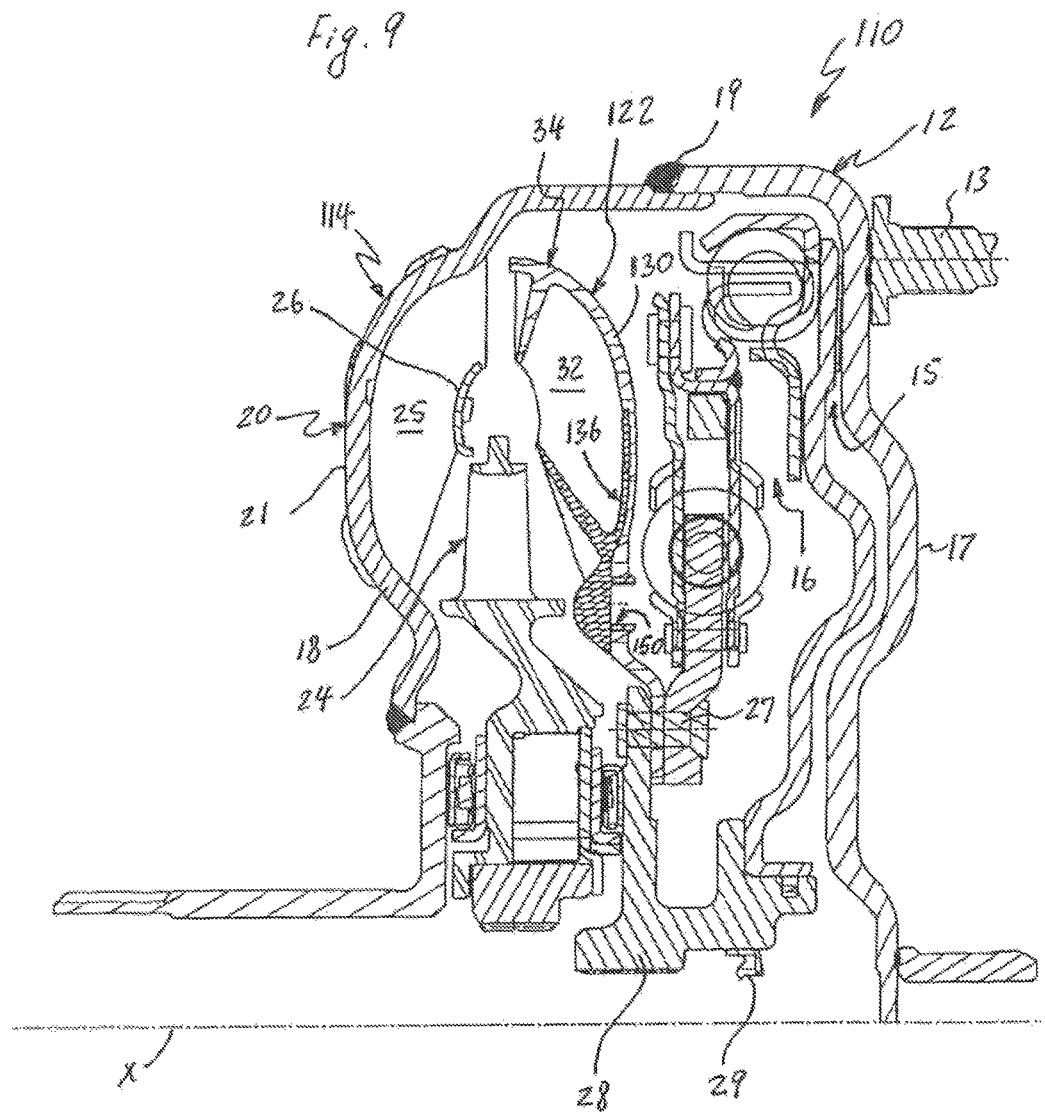

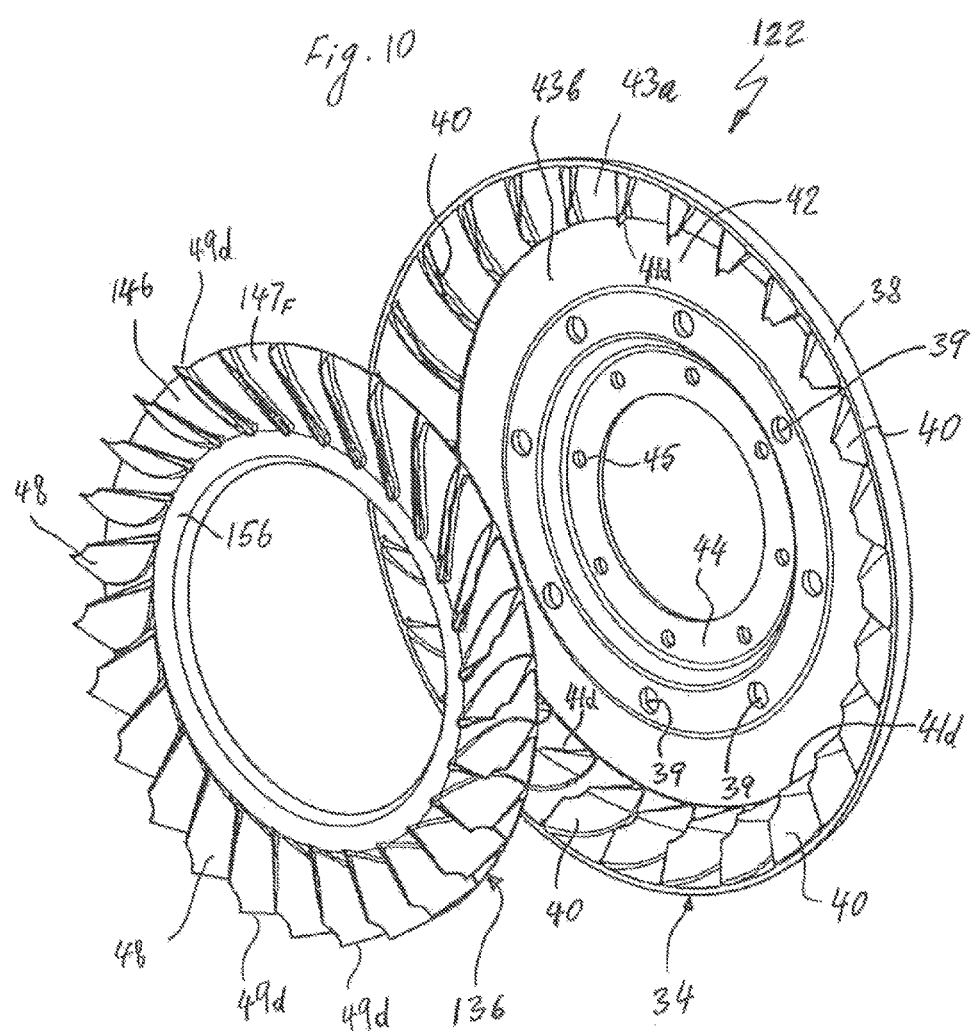

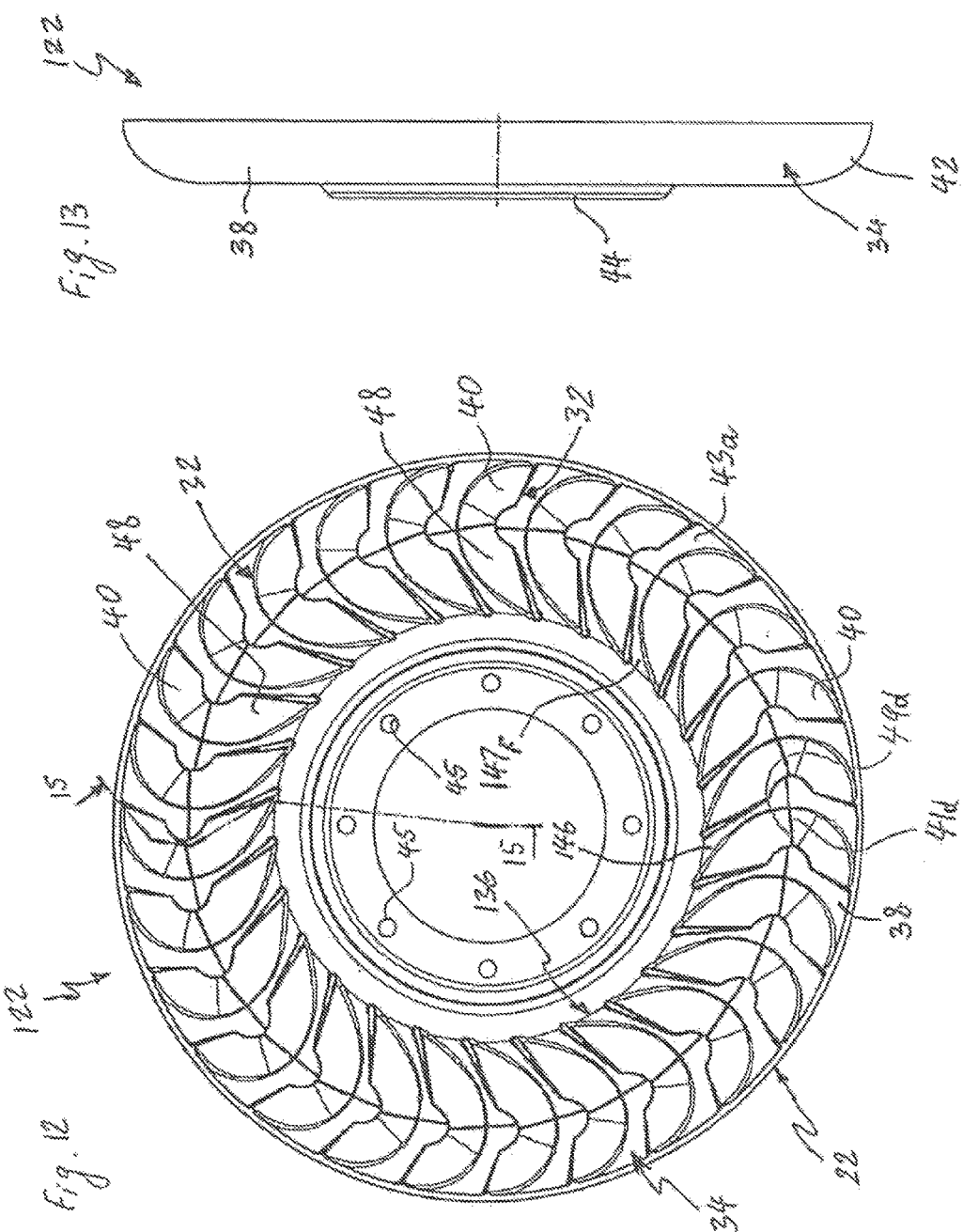

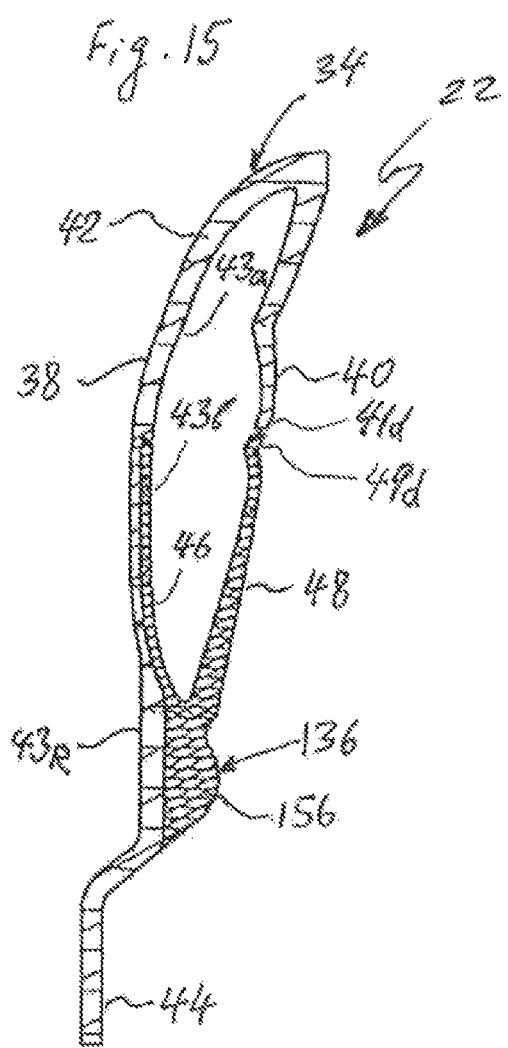

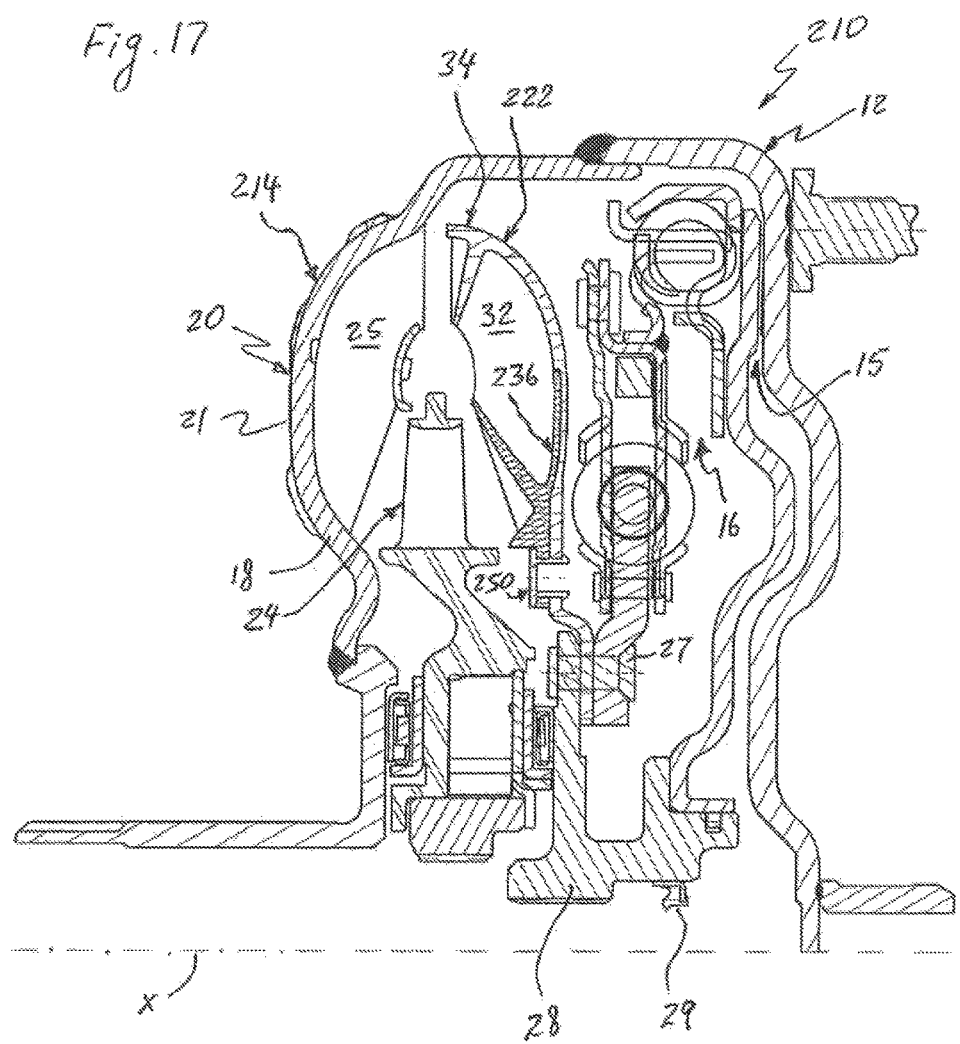

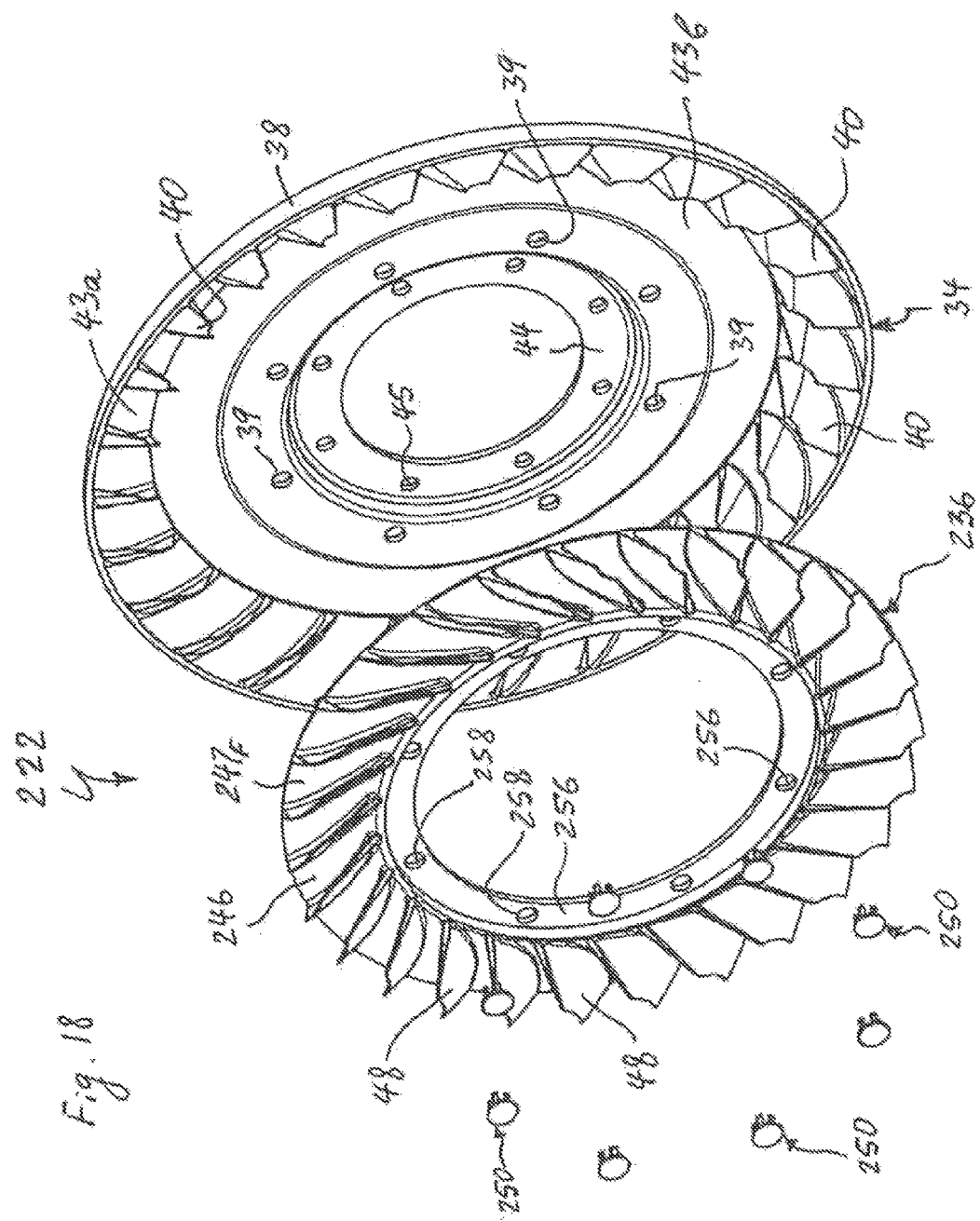

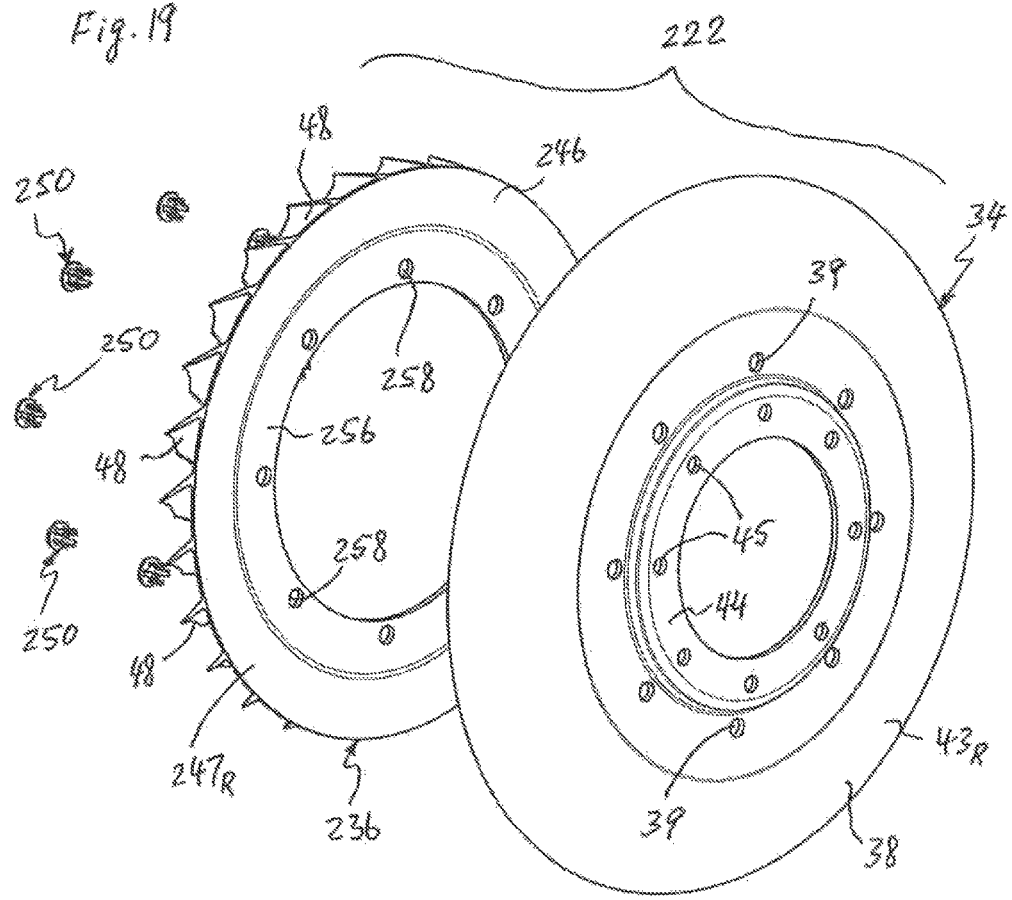
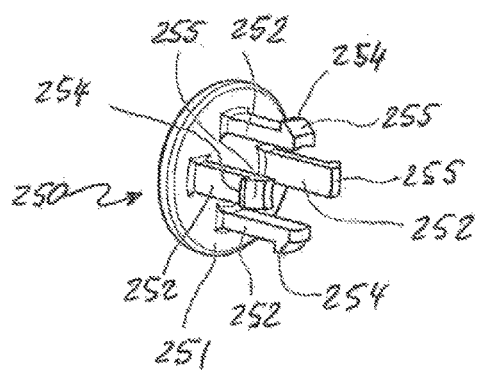

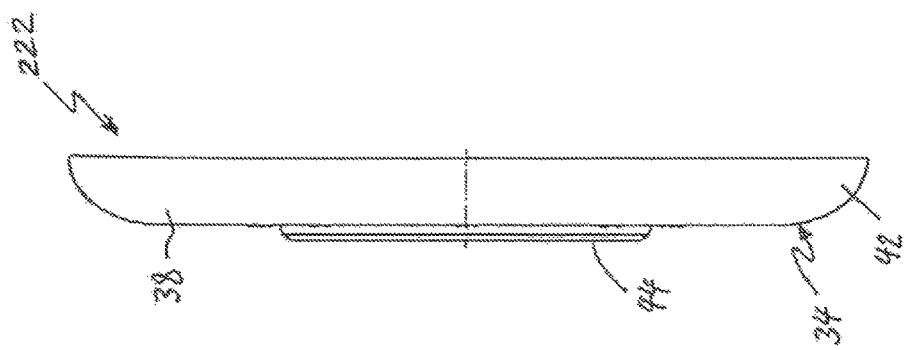
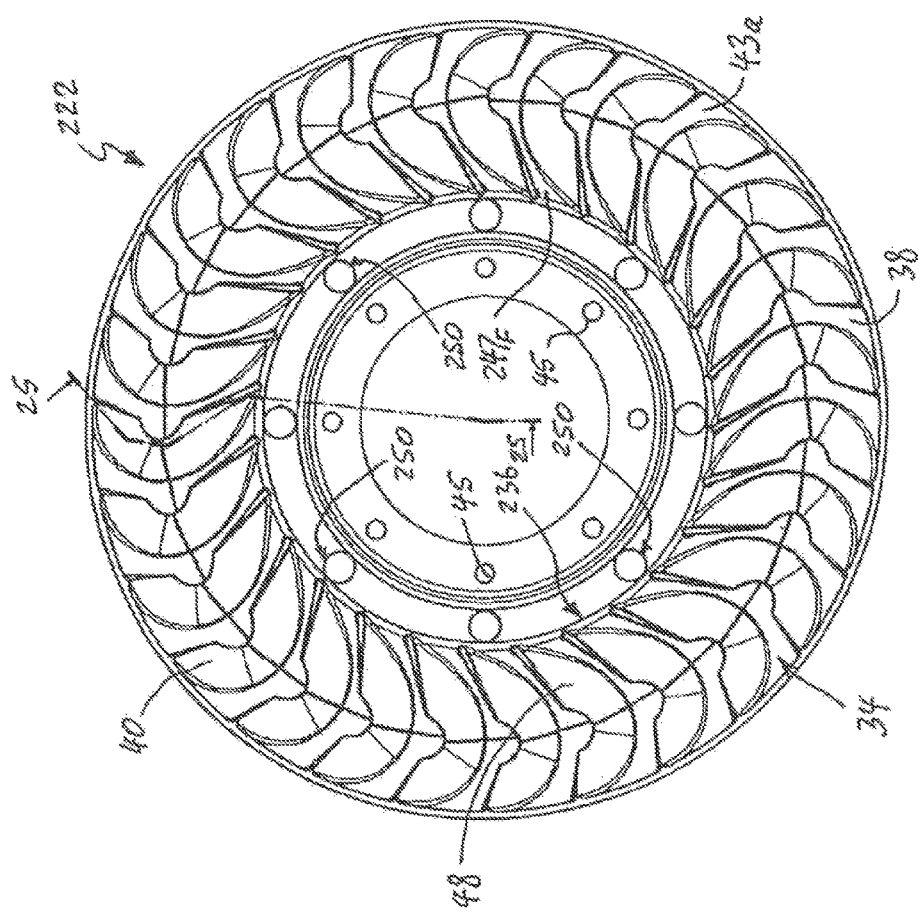

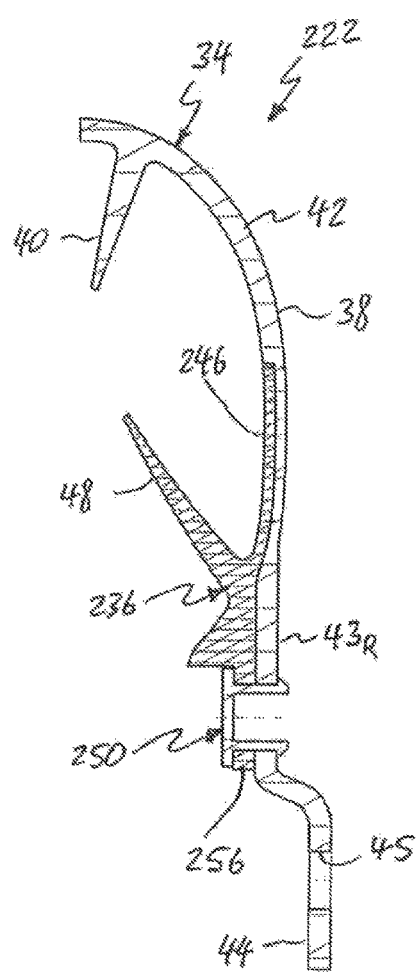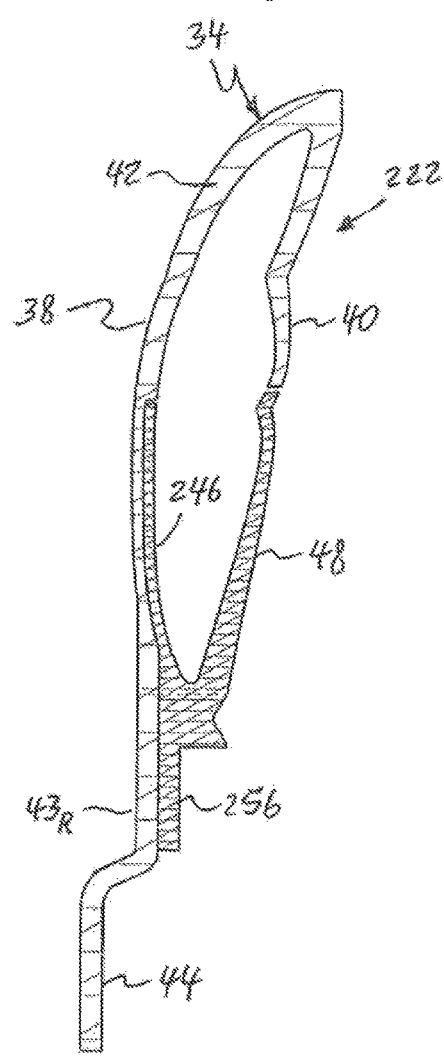

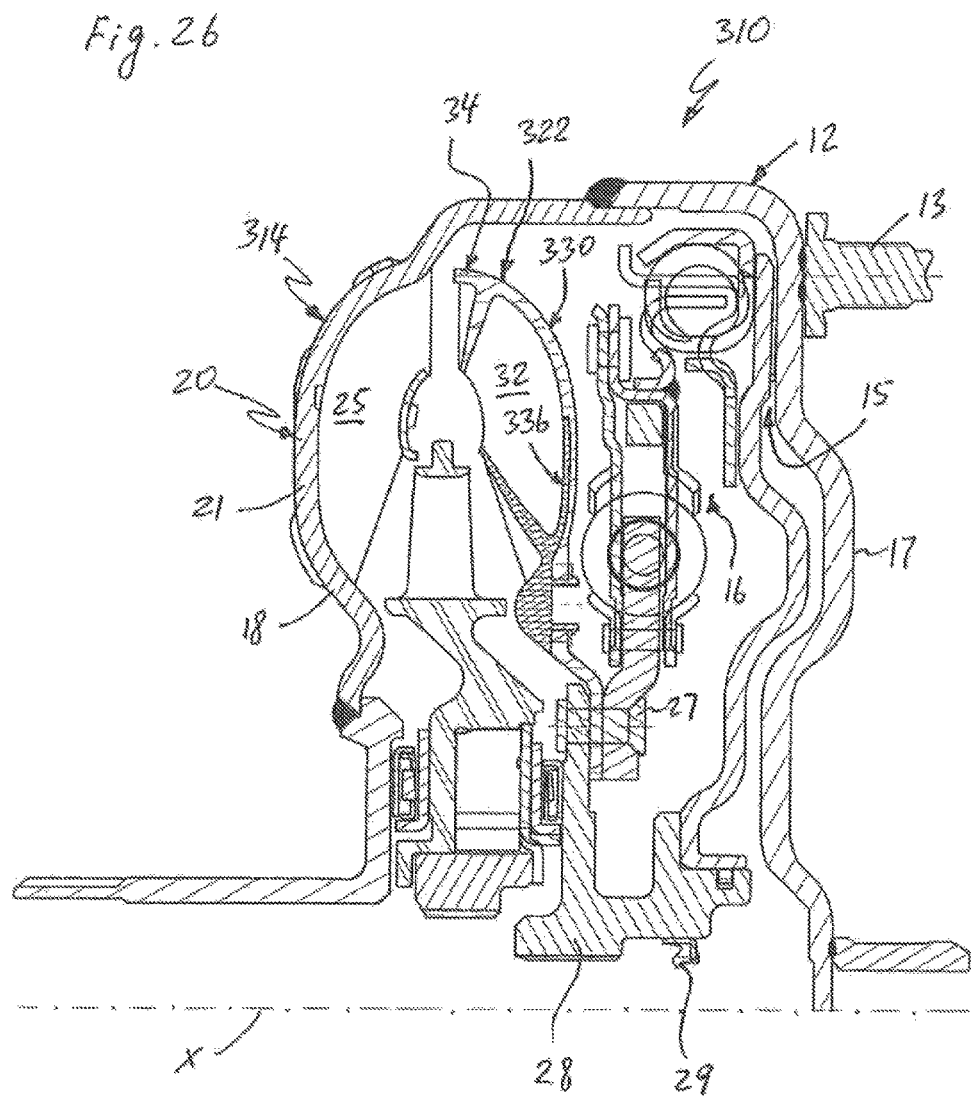

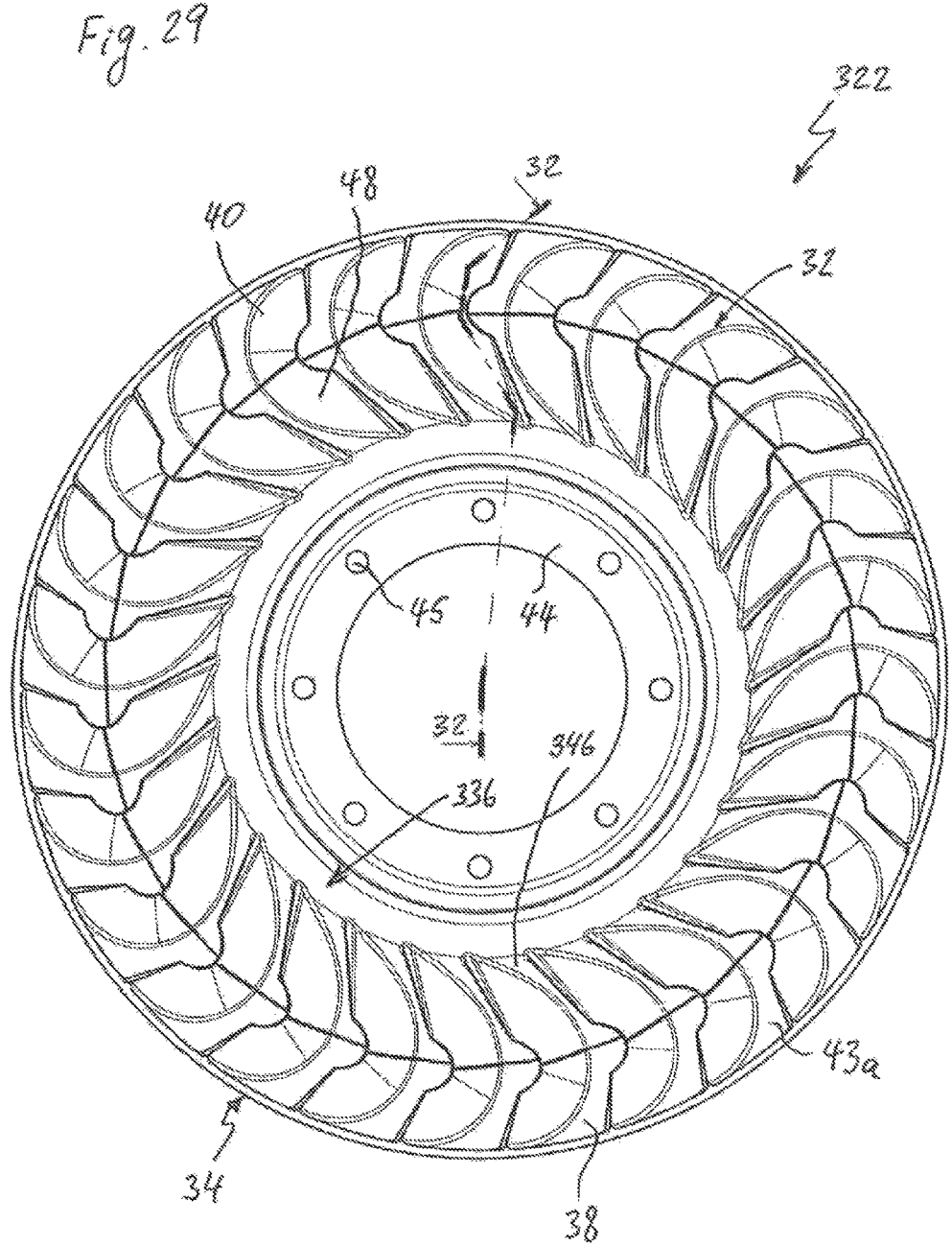

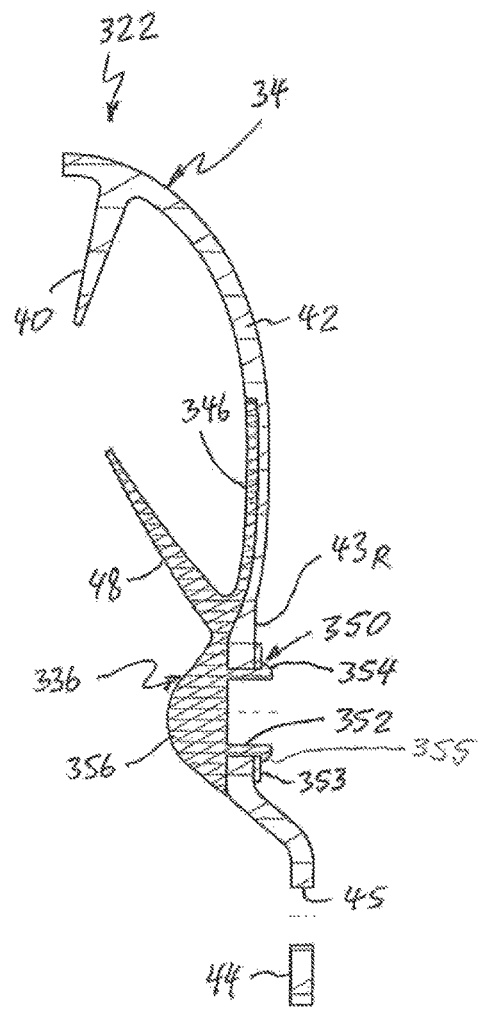
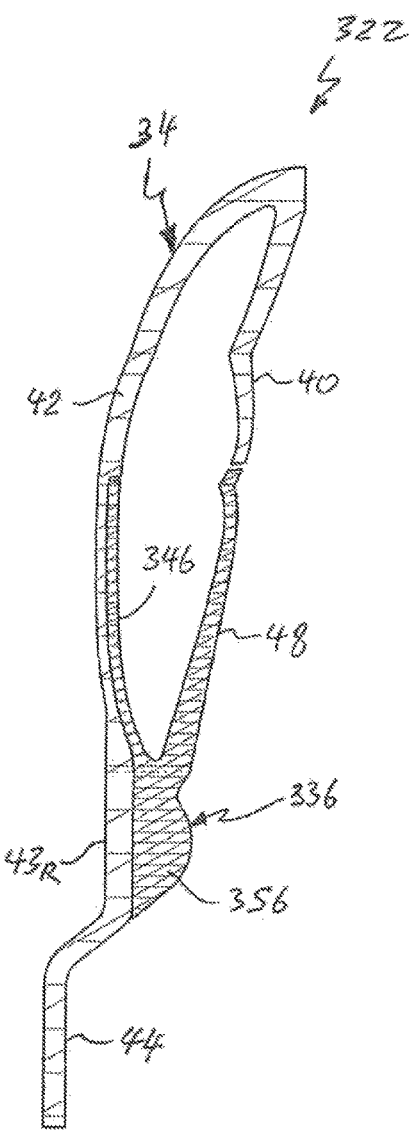
Fig. 33
Fig. 32

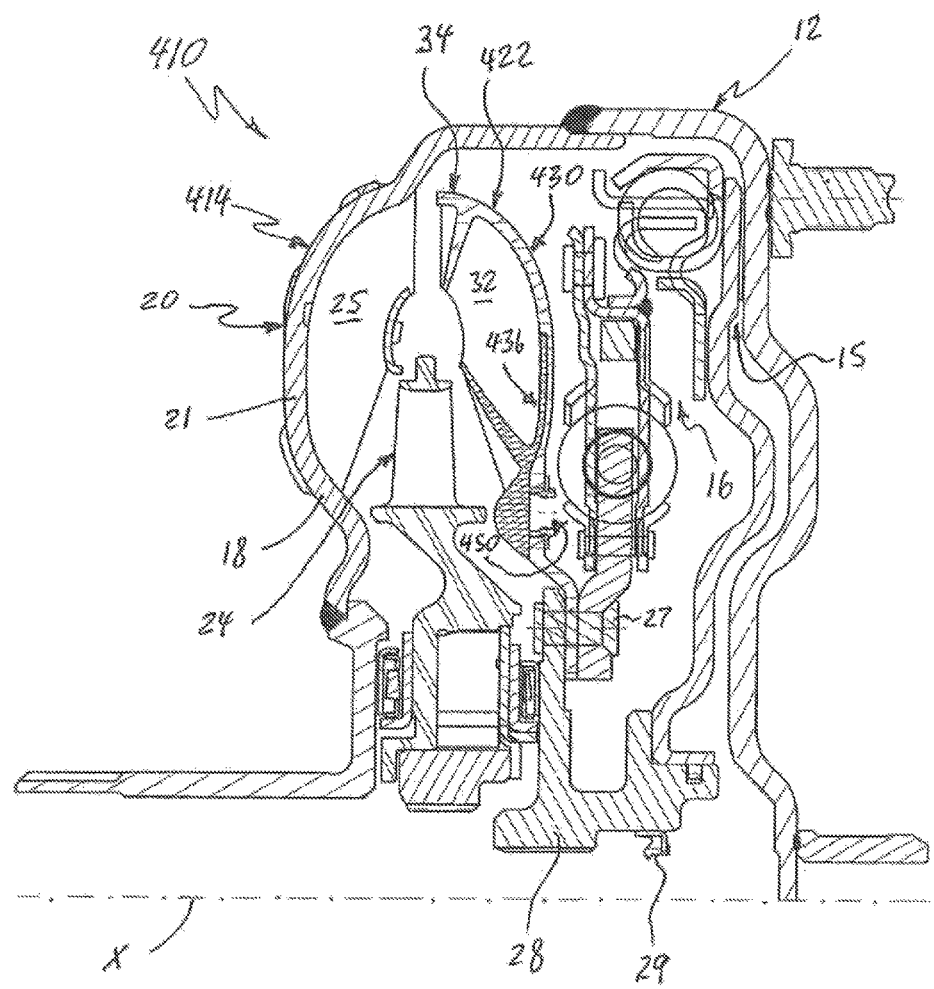

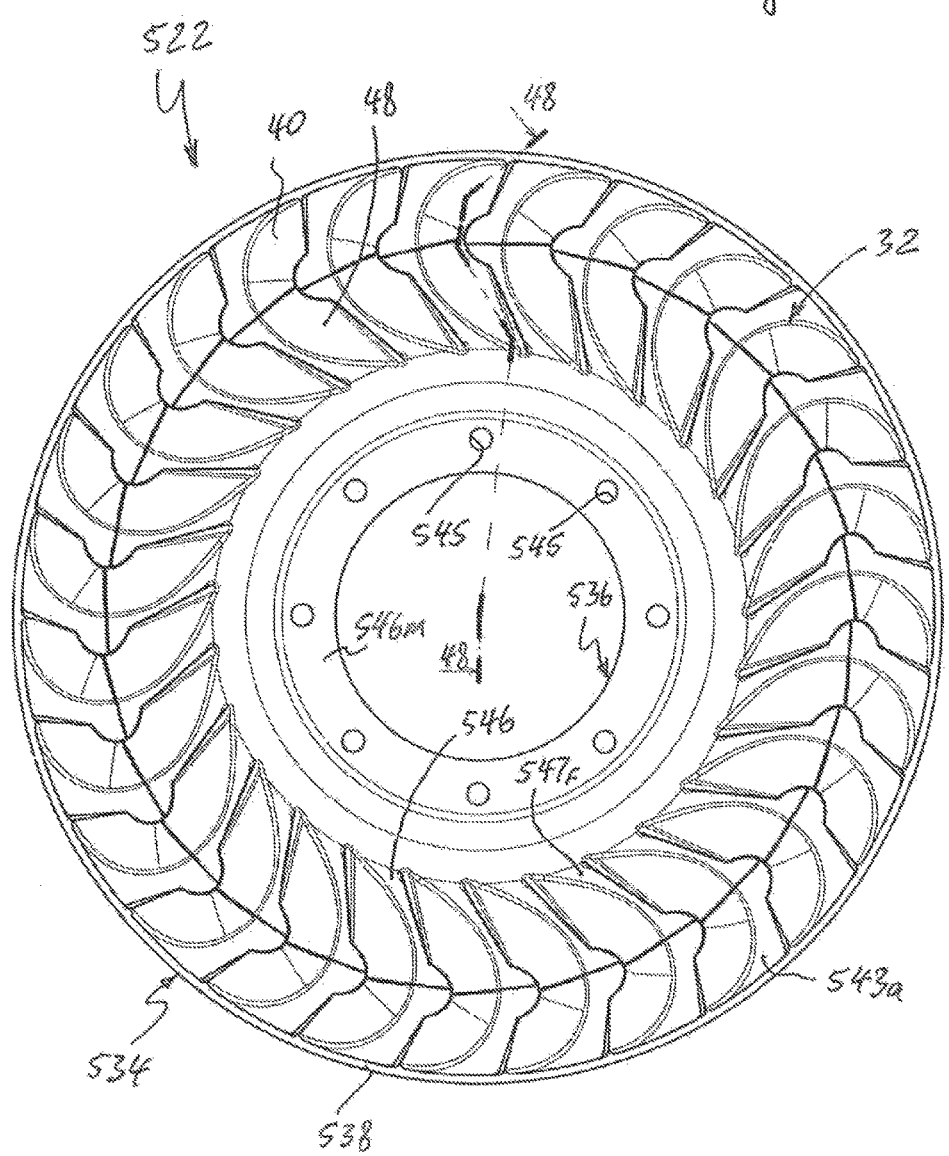

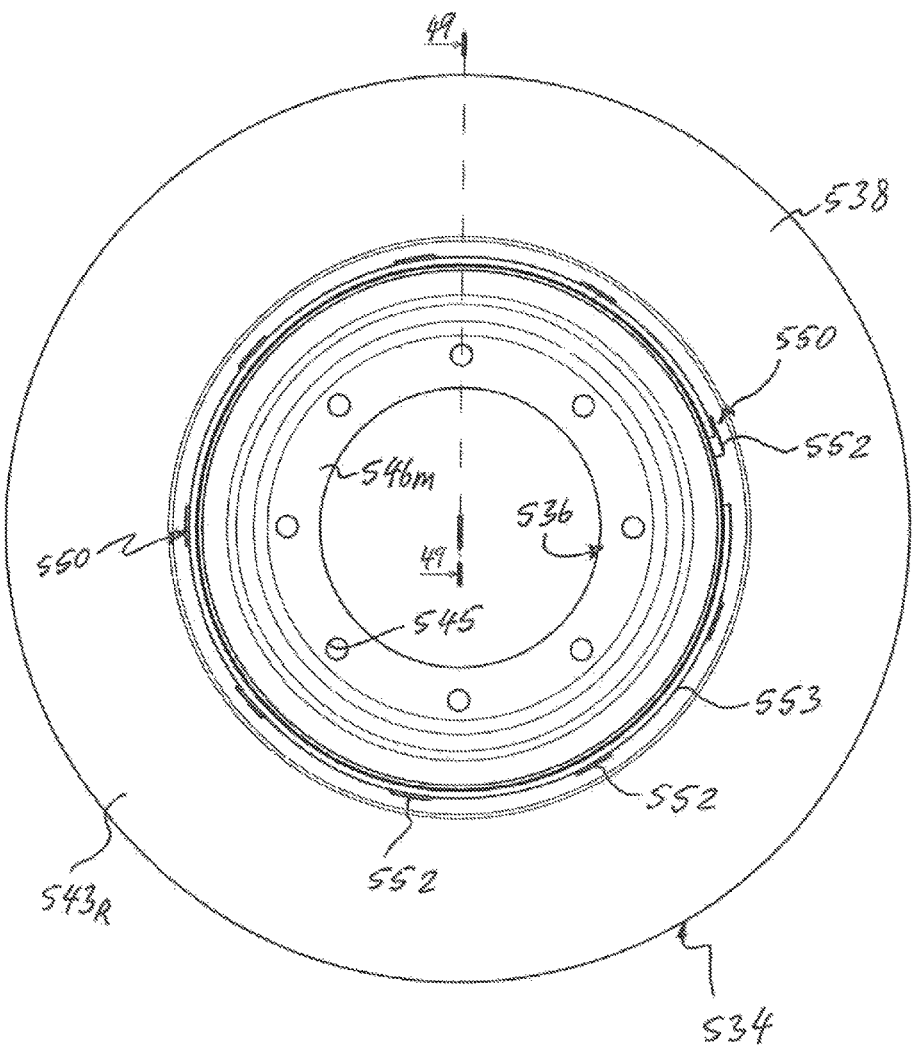

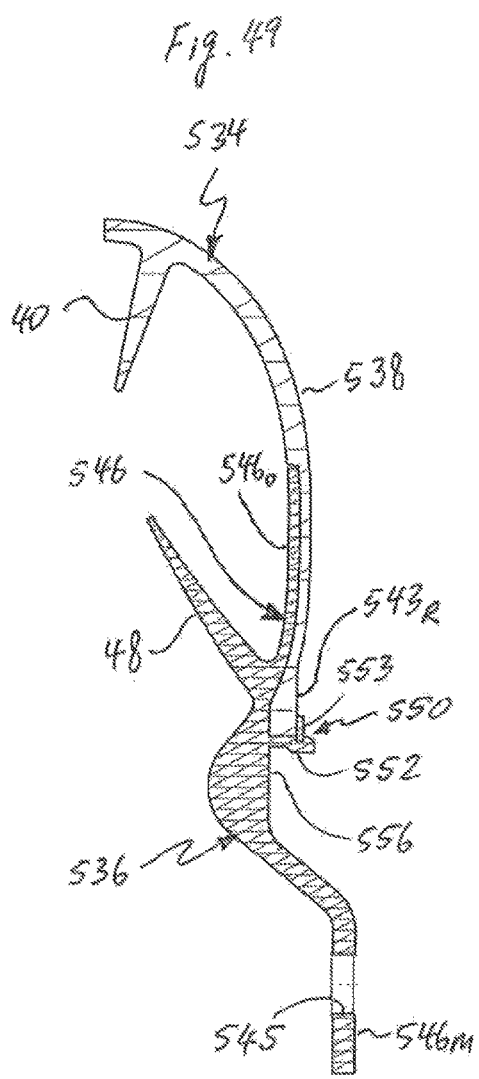
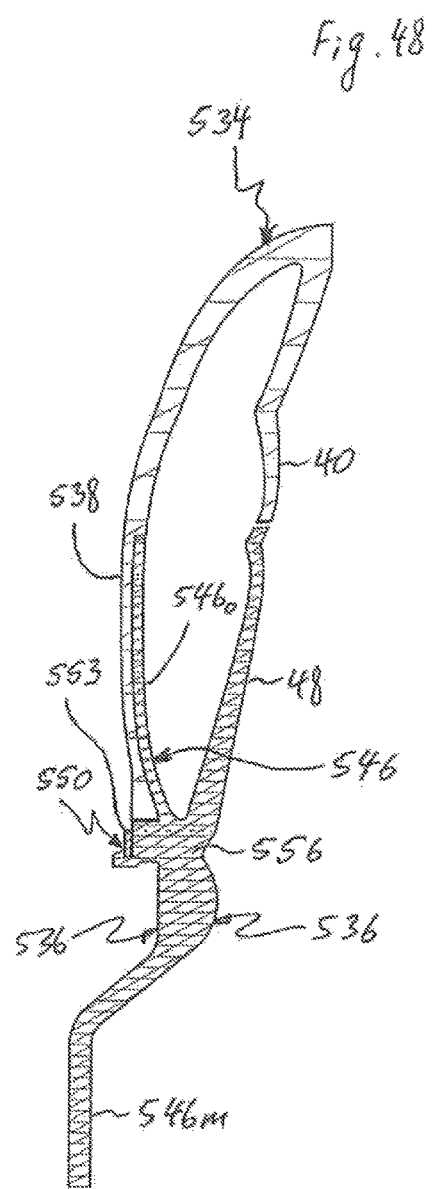

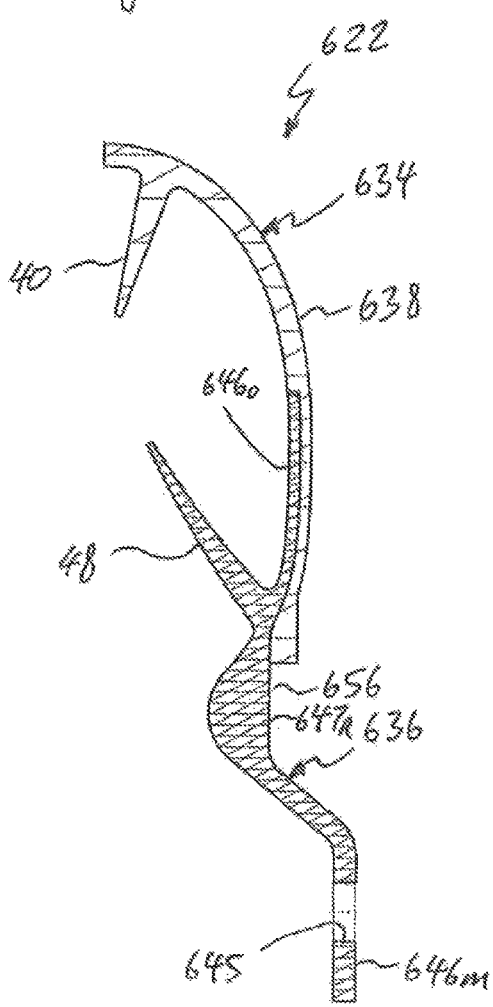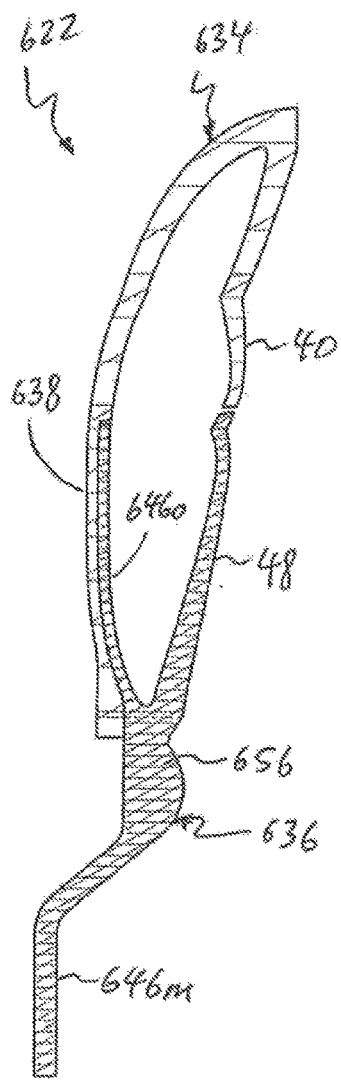

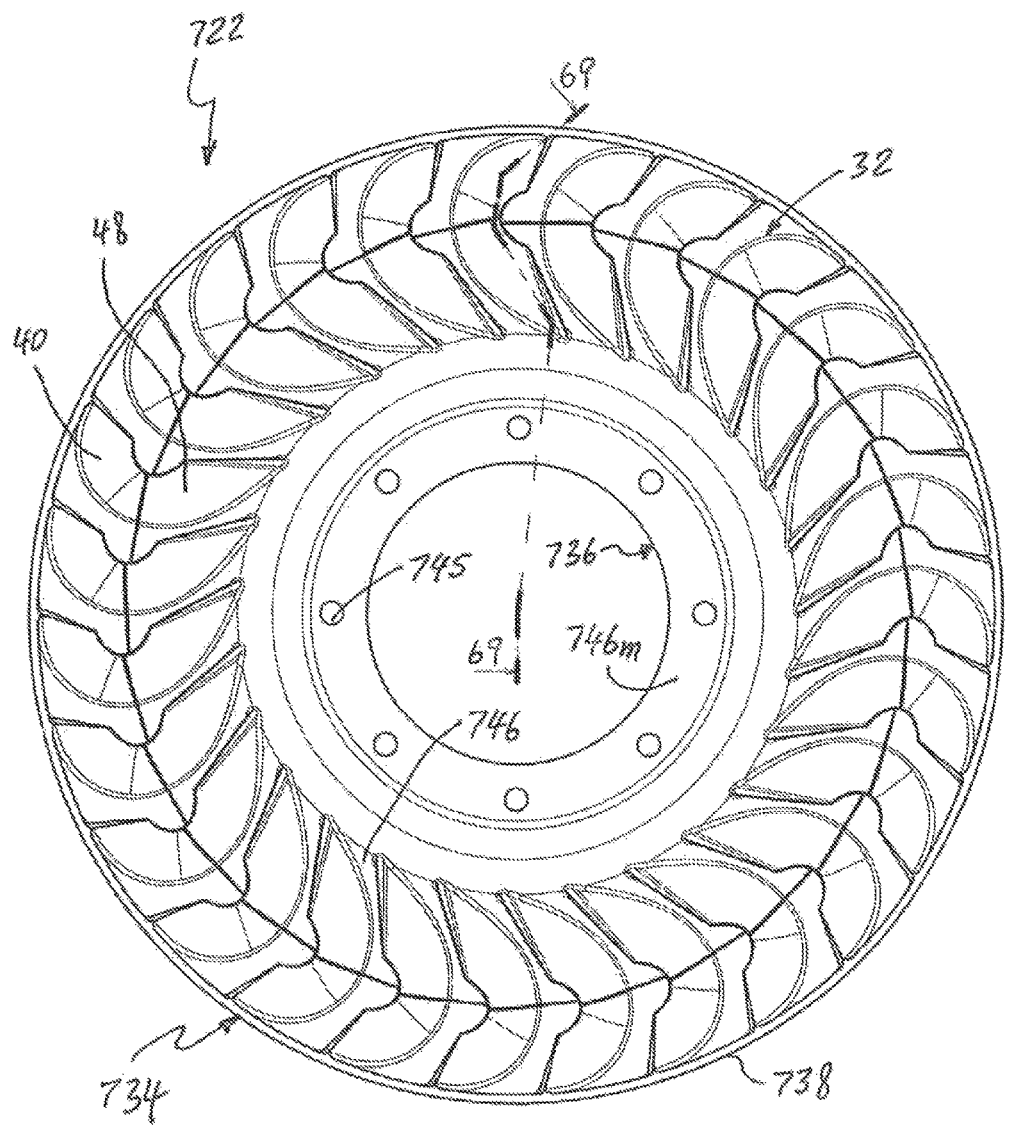

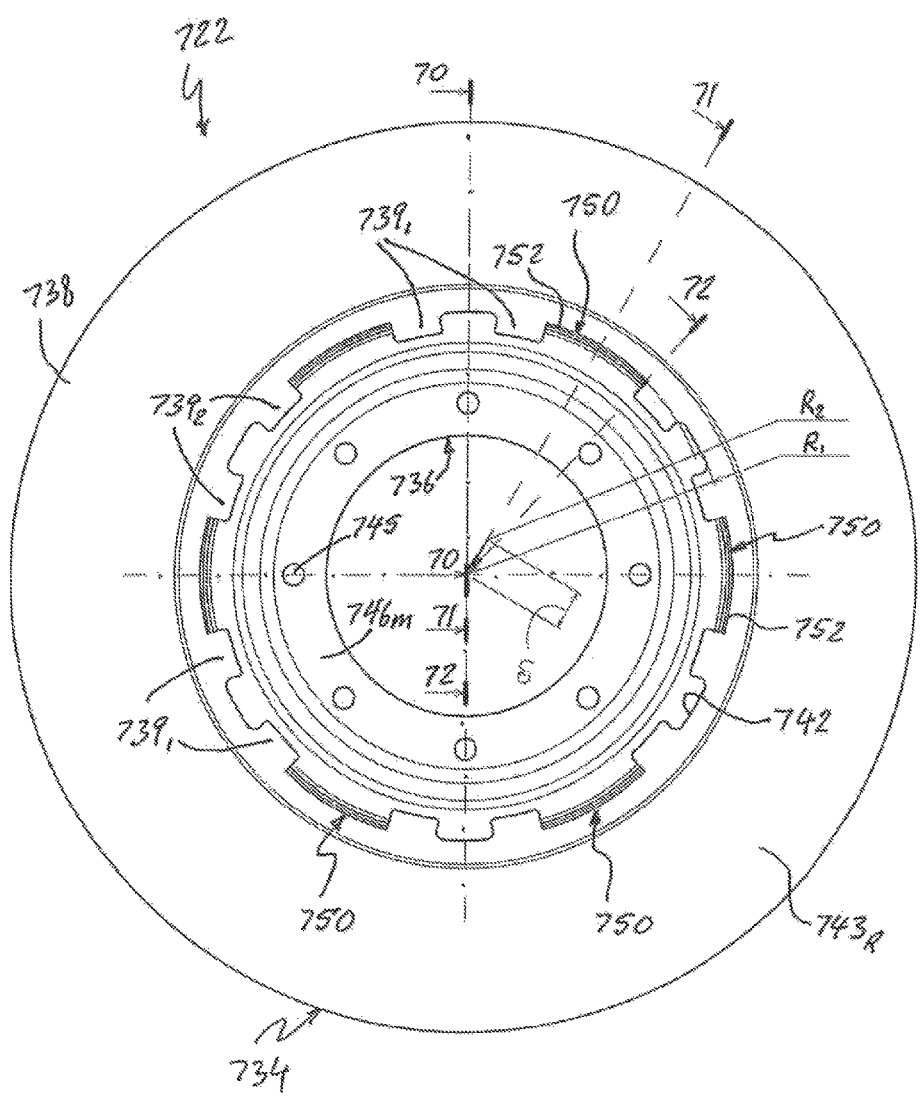

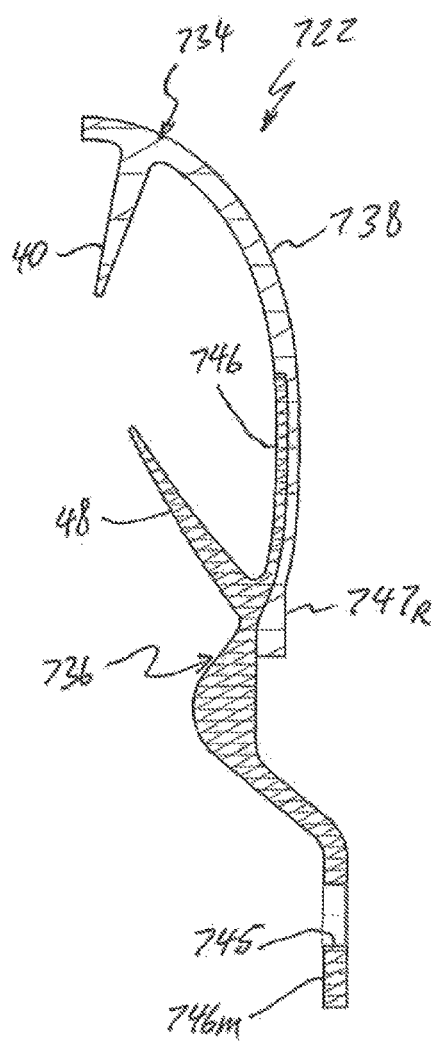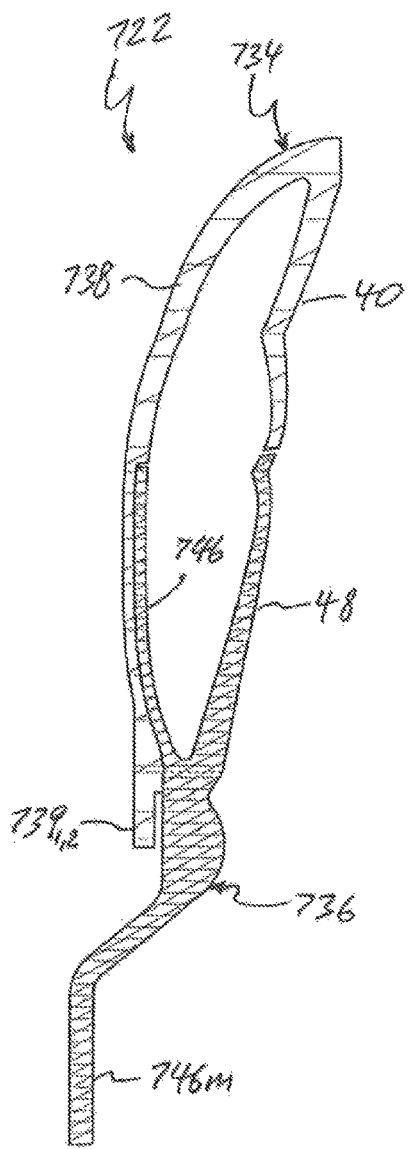
Fig. 70
Fig. 69

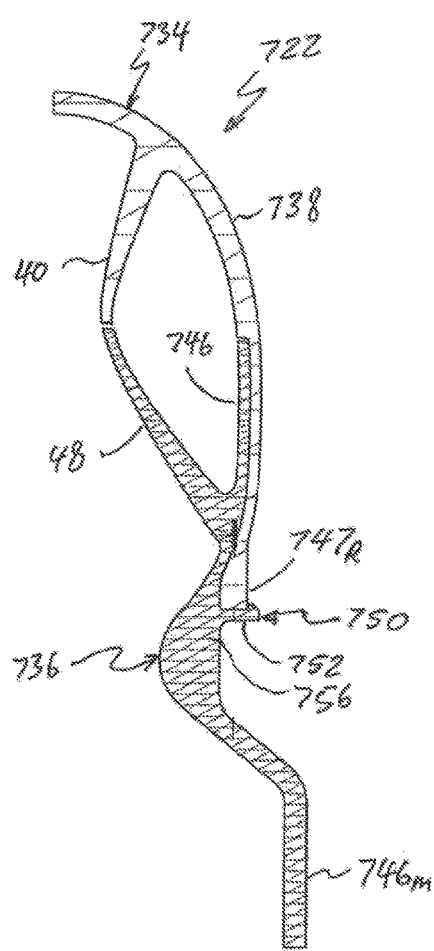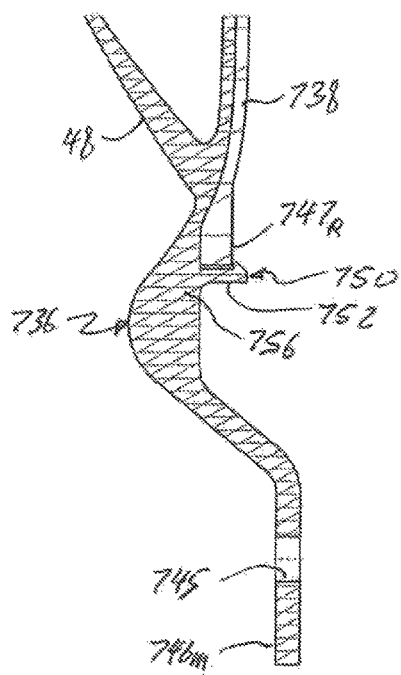

TURBINE ASSEMBLY FOR HYDROKINETIC TORQUE CONVERTER, AND METHOD FOR MAKING THE SAME

CROSS REFERENCE TO RELATED APPLICATIONS

The present application is a Continuation-in-Part of the commonly assigned U.S. patent application Ser. No. 15/051,018, filed Feb. 23, 2016, which is incorporated herein by reference in its entirety and to which priority is claimed.

BACKGROUND OF THE INVENTION

1. Field of the Invention

The present invention generally relates to fluid coupling devices, and more particularly to a turbine assembly for hydrokinetic torque converters, and a method for making the same.

2. Background of the Invention

Typically, a hydrokinetic torque converter includes an impeller assembly, a turbine assembly, a stator (or reactor) fixed to a casing of the torque converter, and a one-way clutch for restricting rotational direction of the stator to one direction. The turbine assembly is integrally or operatively connected with a hub linked in rotation to a driven shaft, which is itself linked to an input shaft of a transmission of a vehicle. The casing of the torque converter generally includes a front cover and an impeller shell which together define a fluid filled chamber. Impeller blades are fixed to an impeller shell within the fluid filled chamber to define the impeller assembly. The turbine assembly and the stator are also disposed within the chamber, with both the turbine assembly and the stator being relatively rotatable with respect to the front cover and the impeller shell. The turbine assembly includes a turbine shell with a plurality of turbine blades fixed to one side of the turbine shell facing the impeller blades of the impeller.

The turbine assembly works together with the impeller assembly, which is linked in rotation to the casing that is linked in rotation to a driving shaft driven by an internal combustion engine. The stator is interposed axially between the turbine assembly and the impeller assembly, and is mounted so as to rotate on the driven shaft with the interposition of the one-way clutch.

Conventionally, the turbine shell and the turbine blades are generally formed separately by stamping from steel blanks. The turbine shell is typically slotted to receive, through the slots, tabs formed on the turbine blades. After the turbine blades are located within the turbine shell, the tabs are bent or rolled over to form a mechanical attachment on the turbine shell that holds the turbine blades fixed in position.

Current hydrokinetic torque converters and methods for assembly thereof are quite complex, cumbersome and expensive. Therefore, while conventional hydrokinetic torque converters, including but not limited to those discussed above, have proven to be acceptable for vehicular driveline applications and conditions, improvements that may enhance their performance and cost are possible.

BRIEF SUMMARY OF THE INVENTION

According to a first aspect of the invention, there is provided a stator assembly for a hydrokinetic torque converter. The stator assembly comprises a stator rotatable about a rotational axis. The stator comprises an annular stator hub coaxial to the rotational axis, an annular stator core ring coaxial to the rotational axis, and a plurality of stator blades integral with and interconnecting the stator hub and the stator core ring.

According to a second aspect of the present invention, there is provided a hydrokinetic torque converter comprising an impeller assembly rotatable about a rotational axis, a turbine assembly rotatable about the rotational axis and disposed axially opposite to the impeller assembly, and a stator assembly comprising a stator rotatable about the rotational axis. The impeller assembly includes an impeller shell and a plurality of impeller blades outwardly extending from the impeller shell. The turbine assembly is coaxially aligned with and hydro-dynamically drivable by the impeller assembly. The stator comprises an annular stator hub coaxial to the rotational axis, an annular stator core ring coaxial to the rotational axis, and a plurality of stator blades integral with and interconnecting the stator hub and the stator core ring.

According to a third aspect of the present invention, there is provided a method for making a stator assembly of a hydrokinetic torque converter. The method involves the step of forming a stator including an annular stator hub coaxial to the rotational axis, an annular stator core ring coaxial to the rotational axis and a plurality of stator blades integral with and interconnecting the stator hub and the stator core ring. The stator being formed by molding from low friction plastic material.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 3A is a rear partial exploded perspective view of the turbine assembly in accordance with the first exemplary embodiment of the present invention;

FIG. 4 is a front elevational view of the turbine assembly in accordance with the first exemplary embodiment of the present invention;

FIG. 5 is a side elevational view of the turbine assembly in accordance with the first exemplary embodiment of the present invention;

FIG. 6A is a rear elevational view of the turbine assembly in accordance with the first exemplary embodiment of the present invention;

FIG. 7B is a partial sectional view of a first turbine component of the turbine assembly taken along the line 7-7 in FIG. 4;

FIG. 7C is a partial sectional view of a second turbine component of the turbine assembly taken along the line 7-7 in FIG. 4;

FIG. 8B is a partial sectional view of the first turbine component of the turbine assembly taken along the line 8-8 in FIG. 6;

FIG. 8C is a partial sectional view of the second turbine component of the turbine assembly taken along the line 8-8 in FIG. 6;

FIG. 9 is a fragmented half-view in axial section of a hydrokinetic torque coupling device with a turbine assembly in accordance with a second exemplary embodiment of the present invention;

FIG. 10 is a front partial exploded perspective view of the turbine assembly in accordance with the second exemplary embodiment of the present invention;

FIG. 12 is a front elevational view of the turbine assembly in accordance with the second exemplary embodiment of the present invention;

FIG. 13 is a side elevational view of the turbine assembly in accordance with the second exemplary embodiment of the present invention;

FIG. 15 is a partial sectional view the turbine assembly taken along the line 15-15 in FIG. 12;

FIG. 17 is a fragmented half-view in axial section of a hydrokinetic torque coupling device with a turbine assembly in accordance with a third exemplary embodiment of the present invention;

FIG. 18 is a front partial exploded perspective view of the turbine assembly in accordance with the third exemplary embodiment of the present invention;

FIG. 19 is a rear partial exploded perspective view of the turbine assembly in accordance with the third exemplary embodiment of the present invention;

FIG. 20 is a perspective view of a snap fastener of the turbine assembly in accordance with the third exemplary embodiment of the present invention;

FIG. 21 is a front elevational view of the turbine assembly in accordance with the third exemplary embodiment of the present invention;

FIG. 22 is a side elevational view of the turbine assembly in accordance with the third exemplary embodiment of the present invention;

FIG. 24 is a partial sectional view the turbine assembly taken along the line 24-24 in FIG. 23;

FIG. 25 is a partial sectional view of the turbine assembly taken along the line 25-25 in FIG. 21;

FIG. 26 is a fragmented half-view in axial section of a hydrokinetic torque coupling device with a turbine assembly in accordance with a fourth exemplary embodiment of the present invention;

FIG. 29 is a front elevational view of the turbine assembly in accordance with the fourth exemplary embodiment of the present invention;

FIG. 33 is a partial sectional view the turbine assembly taken along the line 33-33 in FIG. 31A;

FIG. 34 is a fragmented half-view in axial section of a hydrokinetic torque coupling device with a turbine assembly in accordance with a fifth exemplary embodiment of the present invention;

FIG. 46 is a front elevational view of the turbine assembly in accordance with the sixth exemplary embodiment of the present invention;

FIG. 47 is a rear elevational view of the turbine assembly in accordance with the sixth exemplary embodiment of the present invention;

FIG. 48 is a partial sectional view the turbine assembly taken along the line 48-48 in FIG. 46;

FIG. 49 is a partial sectional view the turbine assembly taken along the line 49-49 in FIG. 47;

FIG. 59 is a partial sectional view the turbine assembly taken along the line 59-59 in FIG. 57;

FIG. 60 is a partial sectional view the turbine assembly taken along the line 60-60 in FIG. 58;

FIG. 67 is a front elevational view of the turbine assembly in accordance with the eighth exemplary embodiment of the present invention;

FIG. 68 is a rear elevational view of the turbine assembly in accordance with the eighth exemplary embodiment of the present invention;

FIG. 69 is a partial sectional view the turbine assembly taken along the line 69-69 in FIG. 67;

FIG. 70 is a partial sectional view the turbine assembly taken along the line 70-70 in FIG. 68;

FIG. 71 is a partial sectional view the turbine assembly taken along the line 71-71 in FIG. 68;

FIG. 72 is a partial sectional view the turbine assembly taken along the line 72-72 in FIG. 68;

Figure 78:
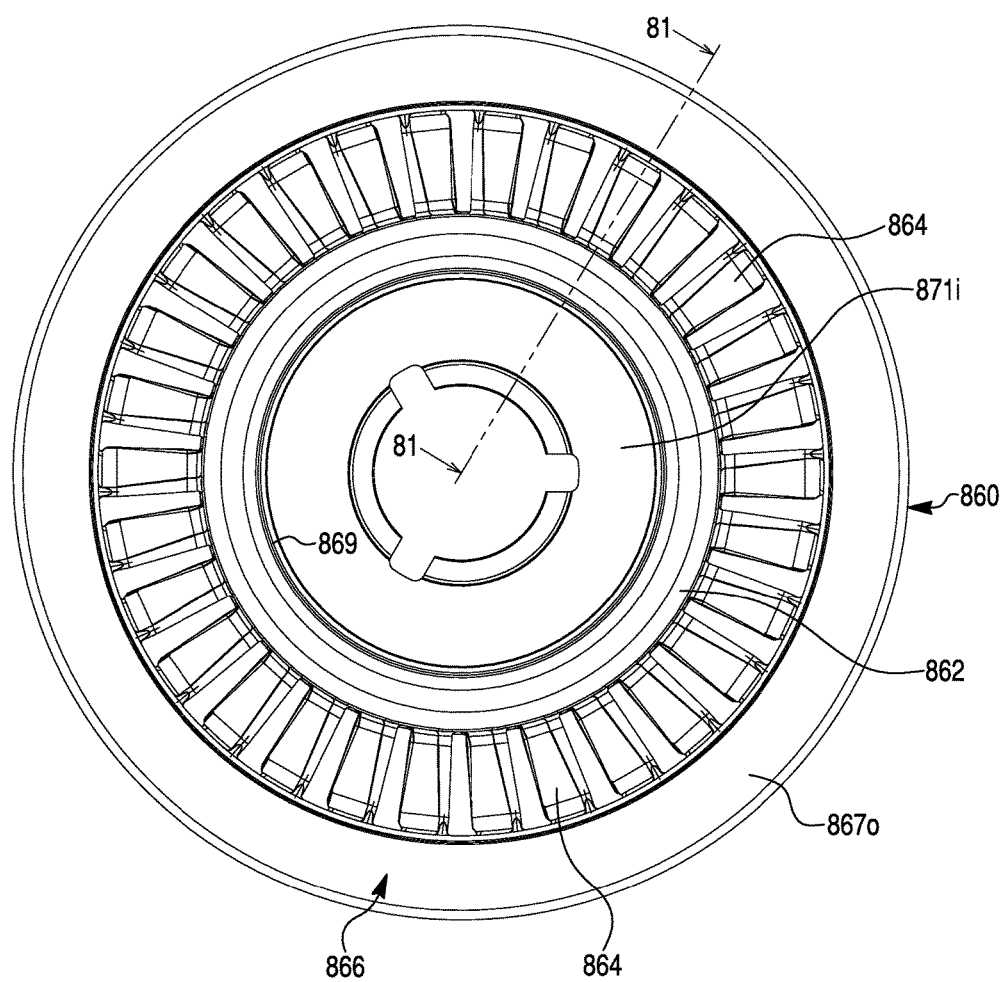
Figure 79:
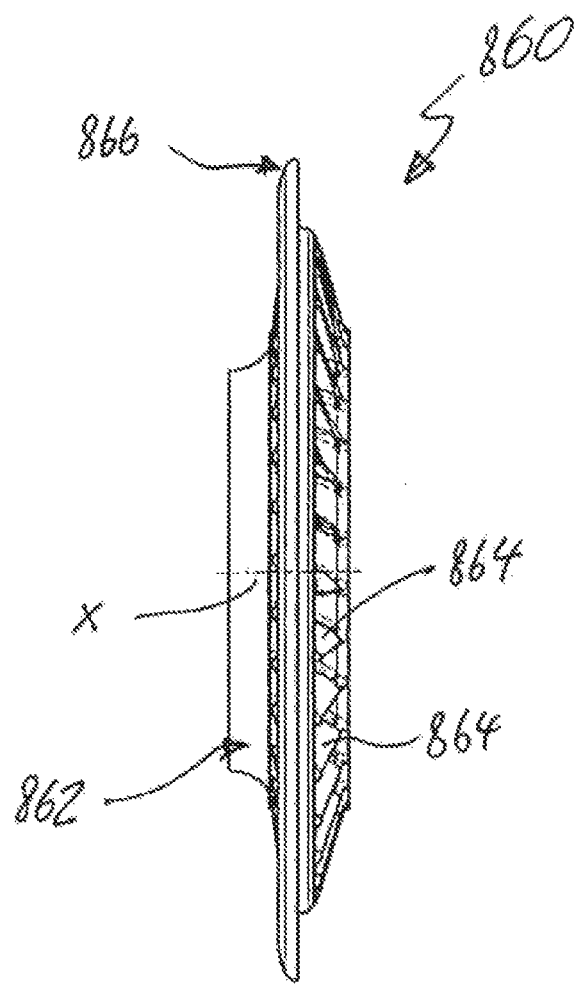
Figure 80:
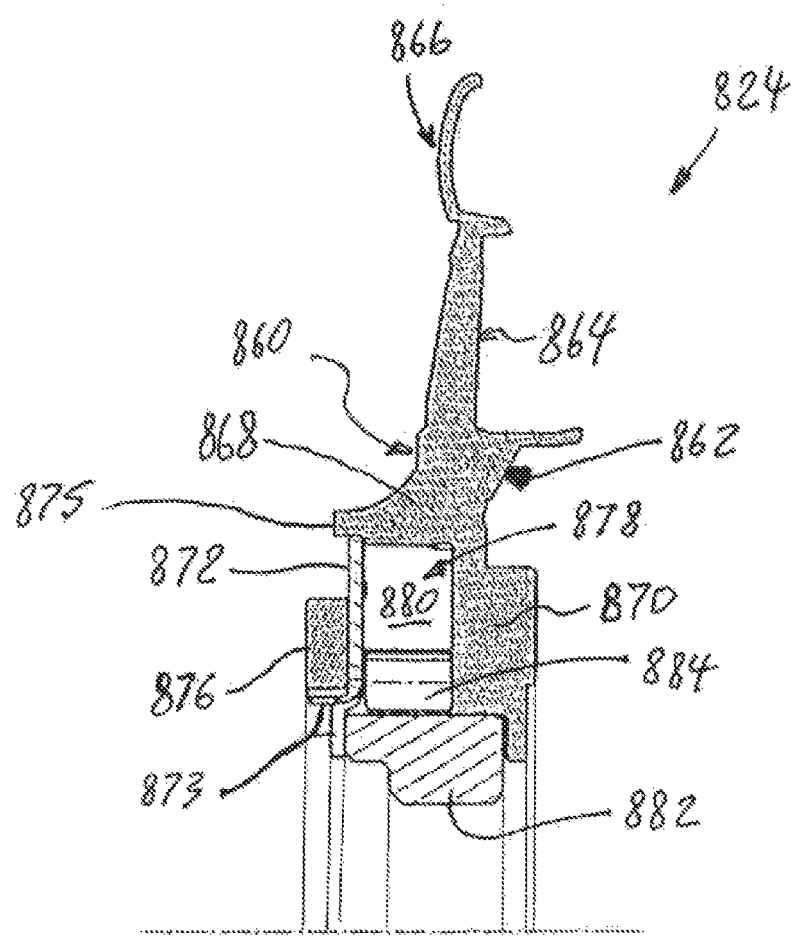
Figure 81:
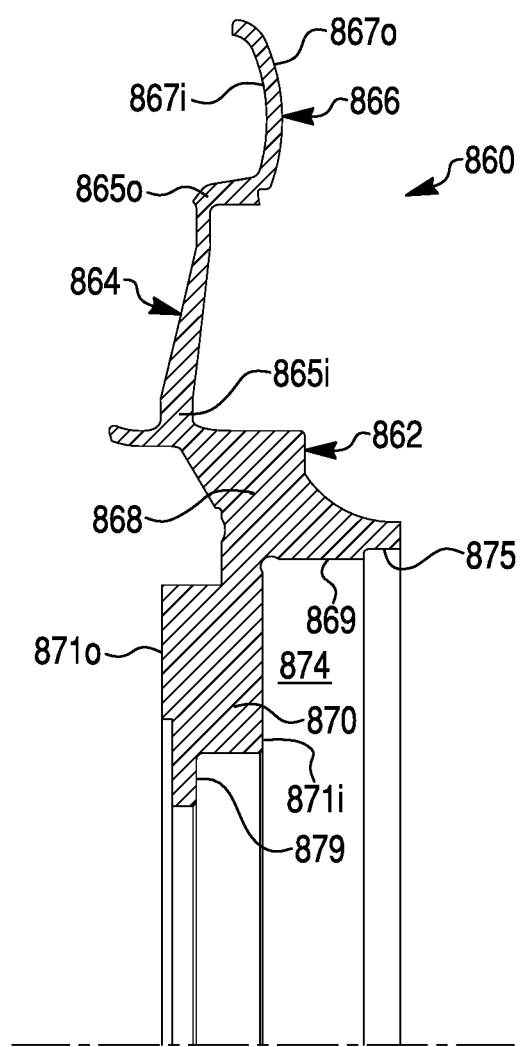

FIG. 78 a turbine side elevational view of the stator in accordance with the ninth exemplary embodiment of the present invention;

FIG. 79 a side view of the stator in accordance with the ninth exemplary embodiment of the present invention;

FIG. 80 is a fragmented half-view in axial section of the stator assembly in accordance with the ninth exemplary embodiment of the present invention; and FIG. 81 is a partial sectional view of the stator in accordance with the ninth exemplary embodiment taken along the line 81-81 in FIG. 78.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

Figure 1:
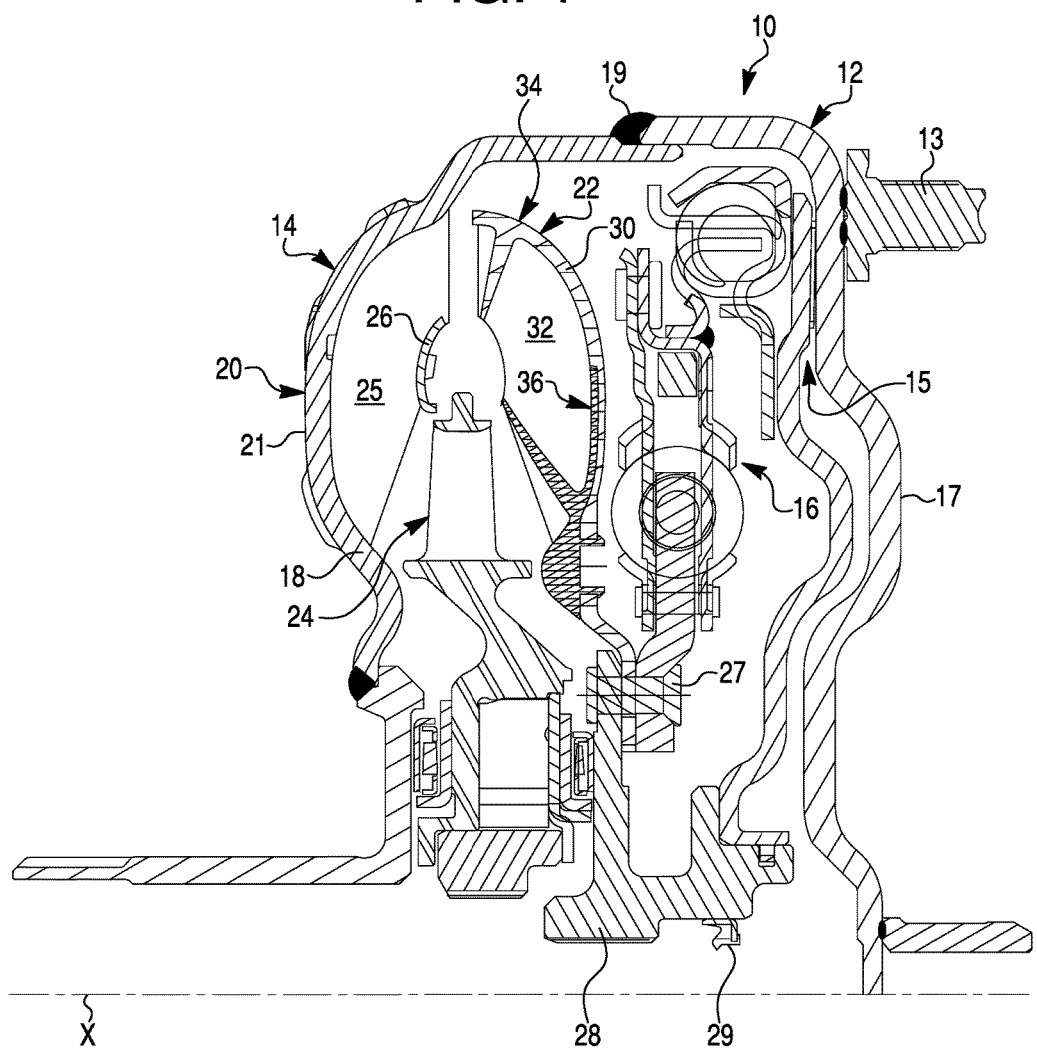
FIG. 1 is a fragmented half-view in axial section of a hydrokinetic torque coupling device with a turbine assembly in accordance with a first exemplary embodiment of the present invention.

A first exemplary embodiment of a hydrokinetic torque coupling device is generally represented in FIG. 1 by reference numeral 10. The hydrokinetic torque coupling device 10 is intended to couple driving and driven shafts, for example in a motor vehicle. In this case, the driving shaft is an output shaft of an internal combustion engine (not shown) of the motor vehicle and the driven shaft is connected to an automatic transmission (not shown) of the motor vehicle.

The hydrokinetic torque coupling device 10 comprises a sealed casing 12 filled with a fluid, such as oil or transmission fluid, and rotatable about a rotational axis X of rotation, a hydrokinetic torque converter 14 disposed in the casing 12, a lock-up clutch 15 and a torsional vibration damper (also referred to herein as a damper assembly) 16 also disposed in the casing 12. The torsional vibration damper assembly 16 is mounted to the torque converter 14. The sealed casing 12, the torque converter 14, the lock-up clutch 15 and the torsional vibration damper 16 are all rotatable about the rotational axis X. The drawings discussed herein show half-views, that is, a cross-section of the portion or fragment of the hydrokinetic torque coupling device 10 above rotational axis X. As is known in the art, the device 10 is symmetrical about the rotational axis X. Hereinafter the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 1 includes a first casing shell 17, and a second casing shell 18 disposed coaxially with and axially opposite to the first casing shell 17. The first and second casing shells 17, 18 are non-movably (i.e., fixedly) interconnected and sealed together about their outer peripheries, such as by weld 19. The second casing shell 18 is non-movably (i.e., fixedly) connected to the driving shaft, more typically to a flywheel (not shown) that is non-rotatably fixed to the driving shaft, so that the casing 12 turns at the same speed at which the engine operates for transmitting torque. Specifically, in the illustrated embodiment of FIG. 1 the casing 12 is rotatably driven by the internal combustion engine and is non-rotatably coupled to the flywheel thereof. Each of the first and second casing shells 17, 18 are integral or one-piece and may be made, for example, by press-forming one-piece metal sheets, such as steel.

The torque converter 14 comprises an impeller assembly (sometimes referred to as the pump or impeller wheel) 20, a turbine assembly (sometimes referred to as the turbine wheel) 22, and a stator assembly (sometimes referred to as the reactor) 24 interposed axially between the impeller assembly 20 and the turbine assembly 22. The impeller assembly 20, the turbine assembly 22, and the stator assembly 24 are coaxially aligned with one another and the rotational axis X. The impeller assembly 20, the turbine assembly 22, and the stator assembly 24 collectively form a torus. The impeller assembly 20 and the turbine assembly 22 may be fluidly coupled to one another in operation as known in the art. The torque coupling device 10 also includes a substantially annular turbine (or output) hub 28 (as best shown in FIG. 1) rotatable about the rotational axis X, which is arranged to non-rotatably couple together the driven shaft and the turbine assembly 22. A sealing member 29, mounted to a radially inner peripheral surface of the turbine hub 28, creates a seal at the interface of the transmission input shaft and the turbine hub 28.

The impeller assembly 20 includes a substantially annular, semi-toroidal (or concave) impeller shell 21, a substantially annular impeller core ring 26, and a plurality of impeller blades 25 fixedly (i.e., non-moveably) attached, such as by brazing, to the impeller shell 21 and the impeller core ring 26. Thus, a portion of the second casing shell 18 of the casing 12 also forms and serves as the impeller shell 21 of the impeller assembly 20. Accordingly, the impeller shell 21 sometimes is referred to as part of the casing 12. The impeller assembly 20, including the impeller shell 21, the impeller core ring 26 and the impeller blades 25, is non-rotatably secured to the first casing shell 18 and hence to the drive shaft (or flywheel) of the engine to rotate at the same speed as the engine output.

The turbine assembly 22, as best shown in FIGS. 1-4, comprises a substantially annular, semi-toroidal (or concave) turbine shell 30 rotatable about the rotational axis X, and a plurality of turbine blades 32 fixedly (i.e., non-moveably) secured to the turbine shell 30 and outwardly extending from the turbine shell 30 so as to face the impeller blades 25 of the impeller assembly 20. The turbine shell 30 of the turbine assembly 22 is non-movably (i.e., fixedly) secured to the turbine hub 28 by appropriate means, such as by rivets 27 or welding.

Furthermore, the turbine assembly 22 comprises a first turbine component 34 rotatable about the rotational axis X, and a second turbine component 36 formed separately from and non-moveably secured to the first turbine component 34 coaxially therewith, as best shown in FIGS. 2-4, 7 and 8. As illustrated in FIGS. 2-4, 7A and 8A, the first turbine component 34 includes a substantially annular first turbine shell member 38 and a plurality of first turbine blade members 40 integrally formed therewith and outwardly extending from the first turbine shell member 38 so as to face the impeller blades 25 of the impeller assembly 20. Preferably, the first turbine shell member 38 and the first turbine blade members 40 are made of a single or unitary (i.e., one-piece) component, but may be separate components fixedly (i.e., non-moveably) connected together. The first turbine shell member 38 has a substantially semi-toroidal radially outer portion 42 and a substantially annular mounting portion 44 located radially within the radially outer portion 42 of the first turbine shell member 38. The mounting portion 44 of the first turbine shell member 38 is provided with a plurality of equiangularly circumferentially spaced holes 45. The first turbine shell member 38 is fixedly secured to the turbine hub 28 by the rivets 27 extending through the holes 45 in the mounting portion 44 of the first turbine shell member 38.

Figure 2:
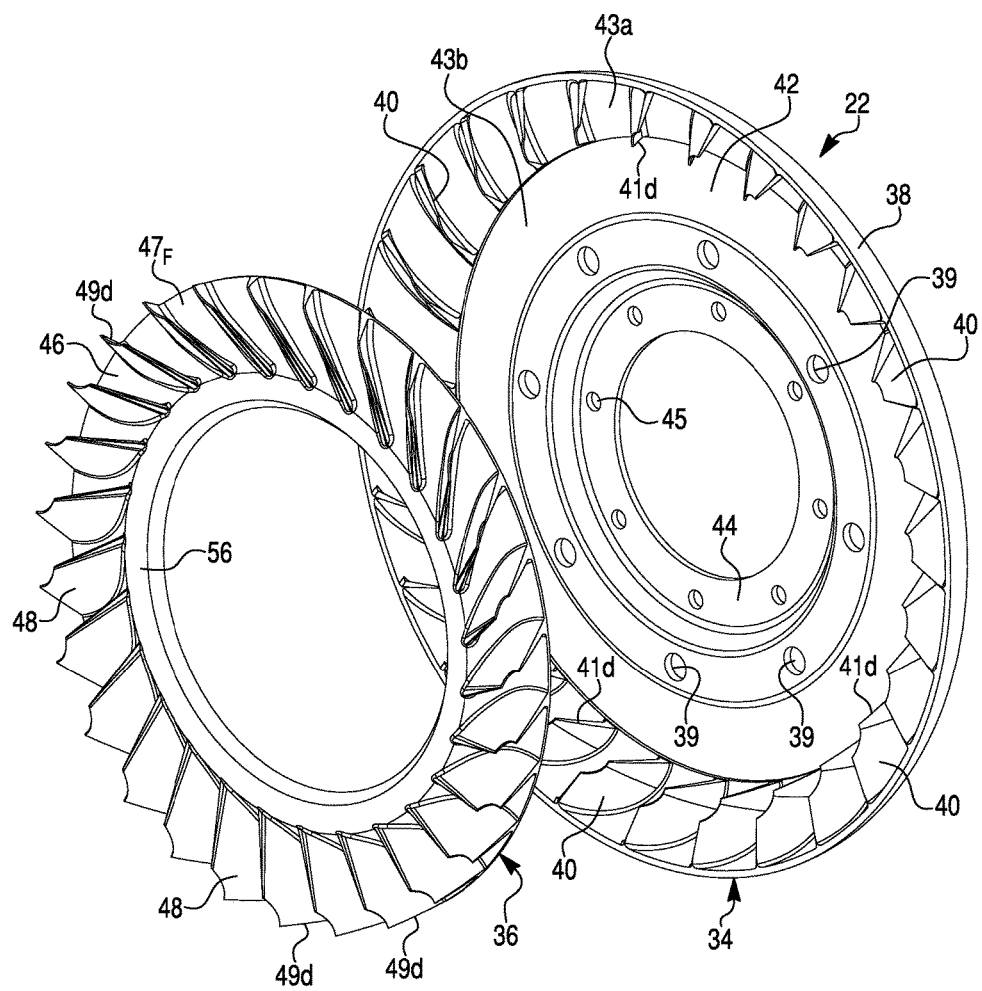
FIG. 2 is a front partial exploded perspective view of the turbine assembly in accordance with the first exemplary embodiment of the present invention.

The radially outer portion 42 of the first turbine shell member 38 has a substantially annular, semi-toroidal (i.e., concave) inner surface 43a and a substantially annular support surface 43b located radially within the inner surface 43a of the radially outer portion 42 of the first turbine shell member 38. Both the inner surface 43a and the support surface 43b of the radially outer portion 42 of the first turbine shell member 38 face the impeller assembly 20. As best shown in FIG. 2, the turbine blade members 40 are integrally formed on and outwardly extend from the inner surface 43a of the radially outer portion 42 of the first turbine shell member 38 of the first turbine component 34 of the turbine assembly 22. The radially outer portion 42 of the first turbine shell member 38 is also provided with a plurality of equiangularly circumferentially spaced holes 39, as best shown in FIGS. 2 and 3.

As further illustrated in FIGS. 2-4, 7 and 8, the second turbine component 36 is formed separately from the first turbine component 34 and includes a substantially annular second turbine shell member 46, and a plurality of second turbine blade members 48 integrally formed therewith and outwardly extending from an annular, substantially semi-toroidal (i.e., concave) inner surface $47_F$ of the second turbine shell member 46 so as to face the impeller blades 25 of the impeller assembly 20. Preferably, the second turbine shell member 46 and the second turbine blade members 48 are made of a single or unitary (i.e., one-piece) component, but may be separate components fixedly (i.e., non-moveably) connected together.

An annular outer surface $47_R$ of the second turbine shell member 46 of the second turbine component 36 non-moveably engages the support surface 43b of the radially outer portion 42 the first turbine component 34 by appropriate means known in the art, such as adhesive bonding, friction welding, snap-on connection, etc. The second turbine shell member 46 of the second turbine component 36 non-moveably engages the first turbine shell member 38 of the first turbine component 34 so as to define together the turbine shell 30 of the turbine assembly 22. An annular rear surface $43_R$ of the first turbine shell member 38 faces away from the annular outer surface $47_R$ of the second turbine shell member 46 of the second turbine component 36.

Figure 7A:
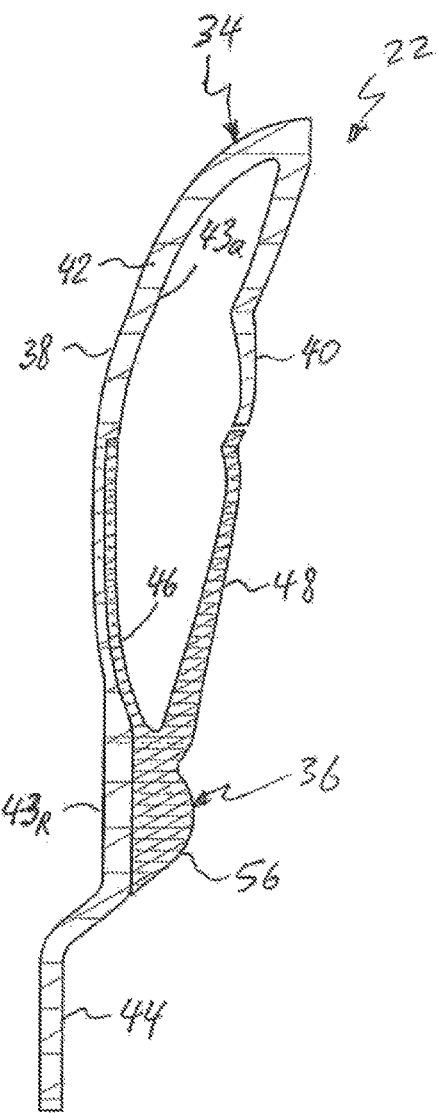
FIG. 7A is a partial sectional view the turbine assembly taken along the line 7-7 in FIG. 4.

The first turbine component 34 and the second turbine component 36 are formed separately, and then non-moveably, coaxially assembled together so as to form the turbine assembly 22. As best illustrated in FIGS. 4 and 7A, each of the first turbine blade members 40 is oriented adjacent to one of the second turbine blade members 48 so as to define together the turbine blade 32 of the turbine assembly 22. Specifically, radially inner distal ends 41d of the first turbine blade members 40 are disposed adjacent to or engaged with radially outer distal ends 49d of the second turbine blade members 48. Also, the second turbine shell member 46 of the second turbine component 36 non-moveably engages the first turbine shell member 38 of the first turbine component 34 so as to define together the turbine shell 30 of the turbine assembly 22.

According to the present invention, the first and second turbine components 34 and 36, respectively, are made by casting in aluminum or magnesium alloys or by molding in a thermoplastic or thermosetting plastic materials, or they may be formed by plastic deformation of a metallic material such as sheet steel. Preferably, the first turbine component 34 is made by casting of an aluminum or magnesium alloy, while the second turbine component 36 is made by injection molding of a thermoplastic polymer, such as a polyetheretherketone (PEEK) thermoplastic polymer, a polytetrafluoroethylene (PTFE) based material, or a thermosetting polymer. PEEK polymer provides fatigue and chemical resistance, can operate at high temperatures and retains outstanding mechanical properties at continuous-use temperatures up to 240° C. (464° F.), allowing it to replace metal even in the most severe end-use environments. Glass fiber-reinforced and carbon fiber-reinforced grades of PEEK provide a wide range of performance options. For example, the second turbine component 36 made be made of a glass fiber and carbon fiber reinforced PEEK, such as the KetaSpire® KT-880 CF30 polyetheretherketone, which is a high flow, 30% carbon fiber reinforced grade of polyetheretherketone. In other words, the first turbine component 34 and the second turbine component 36 could be made of the same or different materials having different mechanical characteristics, such as a specific strength, specific weight, density, modulus of elasticity, etc.

Moreover, as best shown in FIGS. 7B and 7C, the first turbine component 34 and the second turbine component 36 have a variable thickness. In fact, both the first turbine shell member 38 and the first turbine blade members 40 of the first turbine component 34 have a variable thickness, as best shown in FIGS. 7B and 8B. Similarly, both the second turbine shell member 46 and the second turbine blade members 48 of the second turbine component 36 have a variable thickness, as best shown in FIGS. 7B and 7C. For instance, an axial thickness $k_1$ of the radially outer portion 42 of the first turbine shell member 38 in a region of the inner surface 43a is larger than an axial thickness $k_2$ of the radially outer portion 42 of the first turbine shell member 38 in a region of the support surface 43b, as best shown in FIG. 7B.

Furthermore, as best illustrated in FIG. 7B, the axial thickness $k_1$ of the radially outer portion 42 of the first turbine shell member 38 in the region of the inner surface 43a substantially equals the sum of the axial thickness $k_2$ of the radially outer portion 42 in the region of the support surface 43b and an axial thickness $k_3$ of the second turbine shell member 46 (shown in FIG. 7C). Also, an axial thickness $t_1$ of a radially outer proximal end 41p of the first turbine blade members 40 is larger than an axial thickness $t_2$ of the radially inner distal ends 41d of the first turbine blade members 40, as best shown in FIG. 7B. Similarly, an axial thickness $t_3$ of a radially inner proximal end 49p of the second turbine blade members 48 is larger than an axial thickness $t_4$ of the radially outer distal ends 49d of the second turbine blade members 48, as best shown in FIG. 7C.

Accordingly, the molded turbine assembly 22 can have variation in thickness, and be formed in a very particular form and shape. Also, the molded turbine assembly can have reinforcing ribs. Thus, with the molded turbine assembly of the present invention there is a possibility for mass optimization by putting the thickness where it is needed for strength and reducing the thickness where it is not needed, where stress and deformation are low.

The second turbine component 36 further includes a plurality of circumferentially (or angularly) spaced snap fasteners 50, as best shown in FIGS. 3, 6, 8A and 8C. The snap fasteners 50 are configured to axially extend through the holes 39 in the radially outer portion 42 of the first turbine shell member 38 in order to fixedly (i.e., non-moveably) secured the second turbine shell member 46 to the first turbine shell member 38.

Figure 3B:
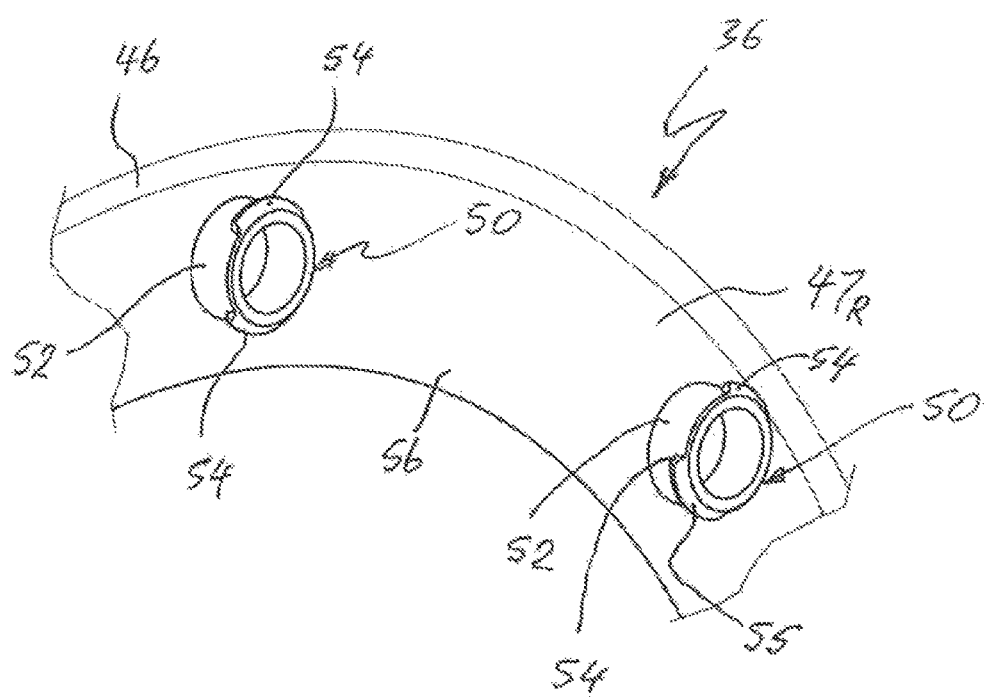
FIG. 3B is an enlarged view of a fragment of the turbine assembly shown in the circle "3B" of FIG. 3A.
Figure 6B:
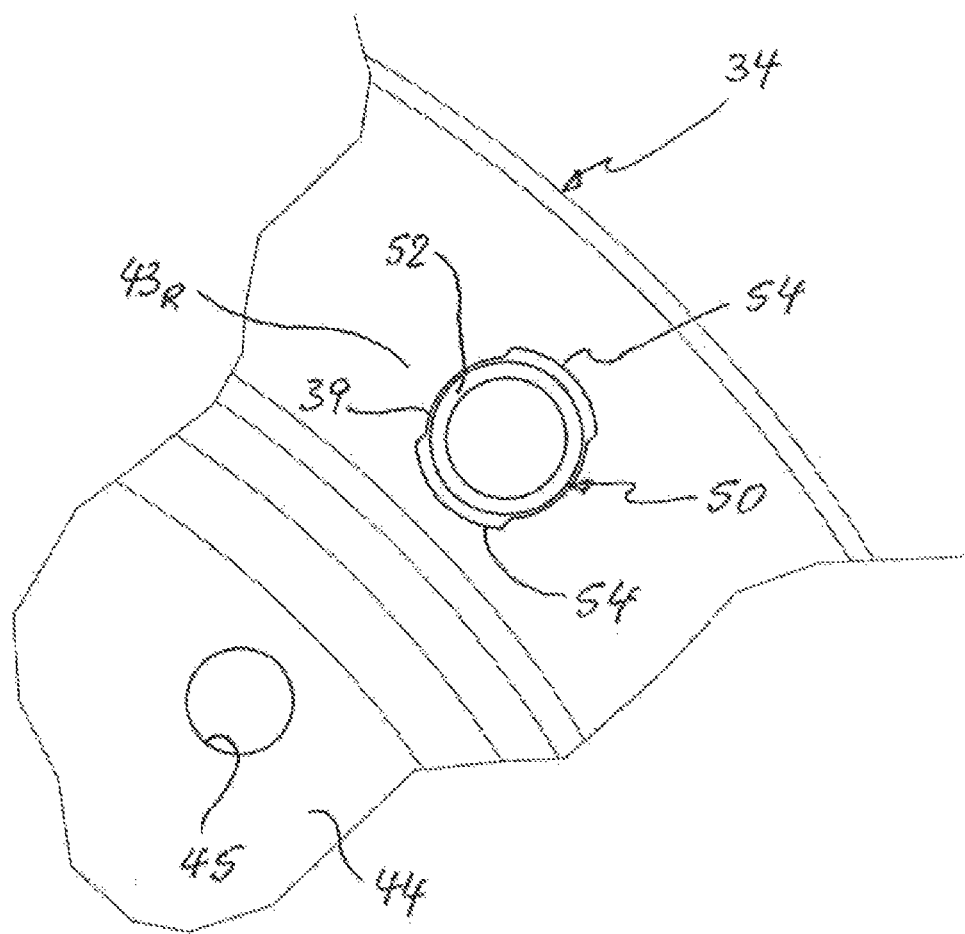
FIG. 6B is an enlarged view of a fragment of the turbine assembly shown in the circle "6B" of FIG. 6A.
Figure 8A:
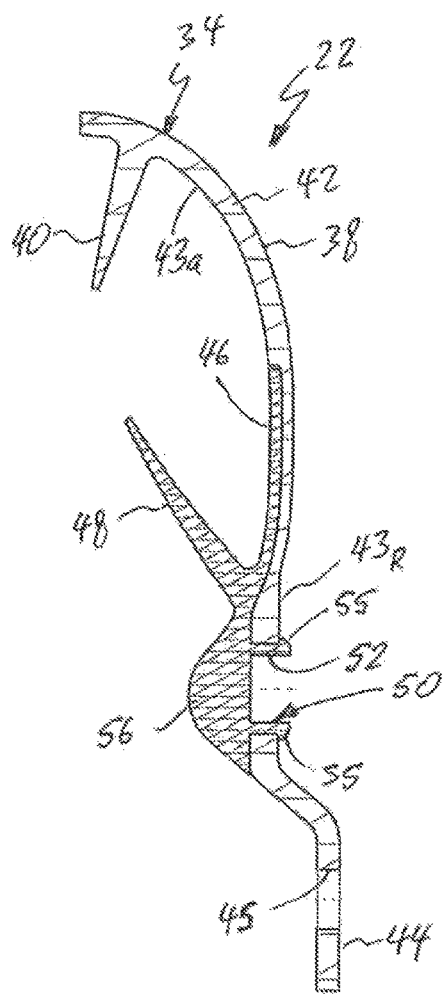
FIG. 8A is a partial sectional view of the turbine assembly taken along the line 8-8 in FIG. 6.

Each of the snap fasteners 50 according to the first exemplary embodiment of the present invention, as best shown in FIG. 6B, includes a resilient cylindrical, hollow snap arm (or fastener arm) 52 integrally formed with a base portion 56 of the second turbine shell member 46 on the annular outer surface $47_R$ thereof so as to extend axially outward from the outer surface $47_R$ of the second turbine shell member 46 toward the first turbine shell member 38 of the first turbine component 34. Preferably, the cylindrical snap arm 52 extends substantially perpendicularly to the outer surface $47_R$ of the second turbine shell member 46, or substantially parallel to the rotational axis X. An axially distal free end of the cylindrical snap arm 52 is formed with one or more arc-shaped barbs or ledges 54 extending radially outwardly from the axially distal end of the snap arm 52. According to the first exemplary embodiment of the present invention, each of the snap fasteners 50 has two radially opposite barbs 54, as best shown in FIGS. 3B and 6B. Moreover, as best shown in FIG. 8C, each of the barbs 54 has an outwardly tapered exterior end surface 55 forming a ramp surface. The opposite barbs 54 on the axially distal end of each of the snap arms 52 are similar but are oriented in opposite directions so as to face one another. The axially distal end of the cylindrical snap arm 52 is elastically deformable in the radial direction.

The second turbine shell member 46 is fixedly (i.e., non-moveably) secured to the first turbine shell member 38 by the male snap fasteners 50 extending through the holes 39 in the radially outer portion 42 of the first turbine shell member 38.

A method for assembling the turbine assembly 22 by securing the second turbine component 36 to the first turbine component 34 is as follows. First, the snap arms 52 of the snap fasteners 50 of the second turbine component 36 are inserted into the holes 39 of the first turbine component 34. Then, the snap fasteners 50 are pressed through or into the holes 39 (manually or by machine), causing the snap arms 52 of the snap fasteners 50 to resiliently deform inwardly as a result of the pressure applied by edges of the holes 39 against the tapered exterior end surfaces 55 of the opposite barbs 54. During insertion, the outwardly inclined tapered exterior end surfaces 55 of the opposite barbs 54 also act to guide the snap arms 52 into the holes 39. The snap arms 52 of the snap fasteners 50 advance through the holes 39 until the snap arms 52 spring back to their original position as soon as the opposite barbs 54 pass (or clear) the edges of the holes 39, i.e. until the barbs 54 of the snap fasteners 50 of the second turbine component 36 positively engage the annular rear surface $43_R$ of the first turbine shell member 38 so that the annular outer surface $47_R$ of the second turbine shell member 46 engages the annular support surface 43b of the radially outer portion 42 of the first turbine shell member 38.

Various modifications, changes, and alterations may be practiced with the above-described embodiment, including but not limited to the additional embodiments shown in FIGS. 9-30. In the interest of brevity, reference characters in FIGS. 9-30 that are discussed above in connection with Figs. FIGS. 1-8C are not further elaborated upon below, except to the extent necessary or useful to explain the additional embodiments of FIGS. 9-30. Modified components and parts are indicated by the addition of a hundred digits to the reference numerals of the components or parts.

In a hydrokinetic torque coupling device 110 of a second exemplary embodiment illustrated in FIGS. 9-16B, the second turbine component 36 of the turbine assembly 22 is replaced by a second turbine component 136 of a turbine assembly 122. The hydrokinetic torque coupling device 110 of FIGS. 9-16B corresponds substantially to the hydrokinetic torque coupling device 10 of FIGS. 1-8C, and only the portions of the second turbine component 136 which differ will therefore be explained in detail below. In the second exemplary embodiment of the present invention illustrated in FIGS. 9-16B, the second turbine component 136 includes two or more equiangularly circumferentially (or angularly) spaced snap fasteners 150, as best shown in FIGS. 11, 14, 16A and 16B. The second turbine shell member 146 of the second turbine component 136 non-moveably engages first turbine shell member 38 of a first turbine component 34 so as to define together a turbine shell 130 of the turbine assembly 122.

The snap fasteners 150 are configured to axially extend through the holes 39 in the radially outer portion 42 of the first turbine shell member 38 in order to fixedly (i.e., non-moveably) secure the second turbine shell member 146 to the first turbine shell member 38.

Figure 11A:
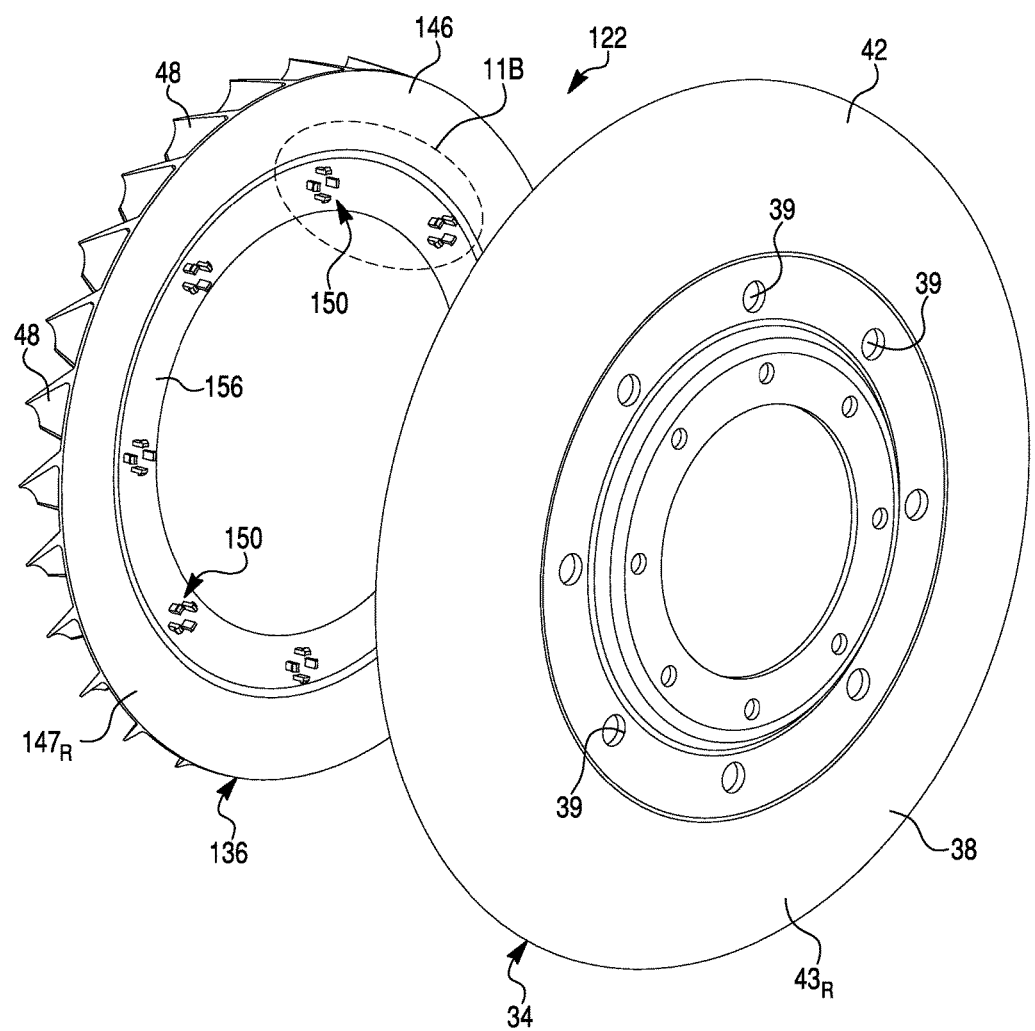
FIG. 11A is a rear partial exploded perspective view of the turbine assembly in accordance with the second exemplary embodiment of the present invention.
Figure 11B:
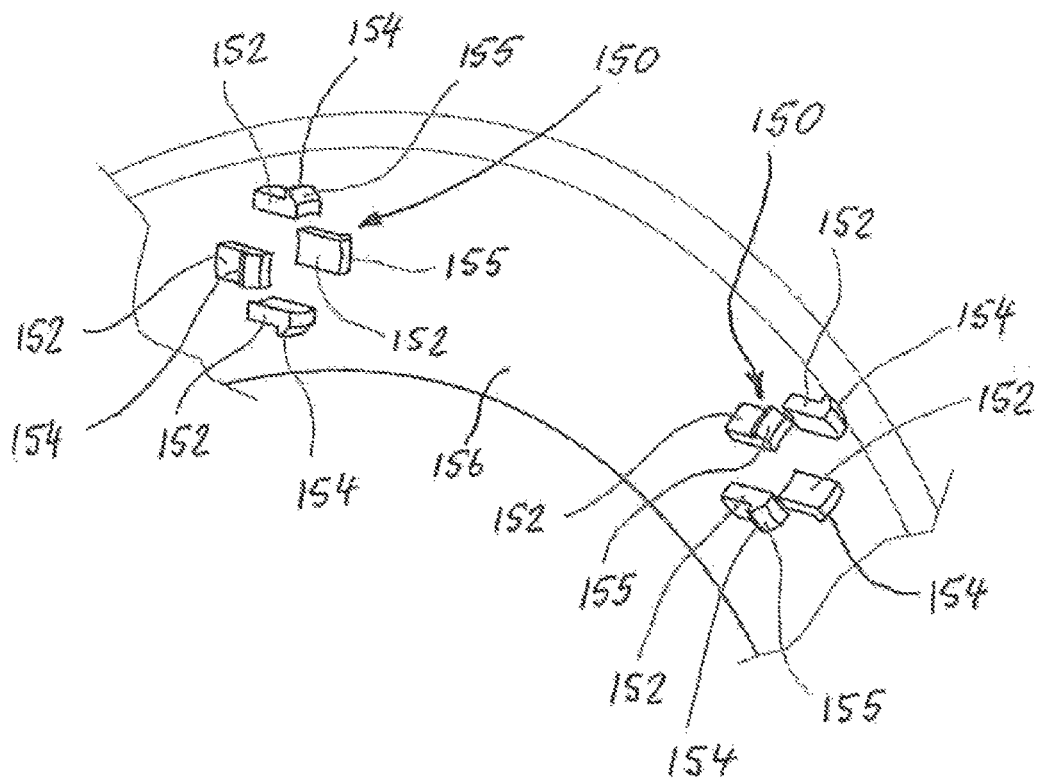
FIG. 11B is an enlarged view of a fragment of the turbine assembly shown in the circle "11B" of FIG. 11A.
Figure 14:
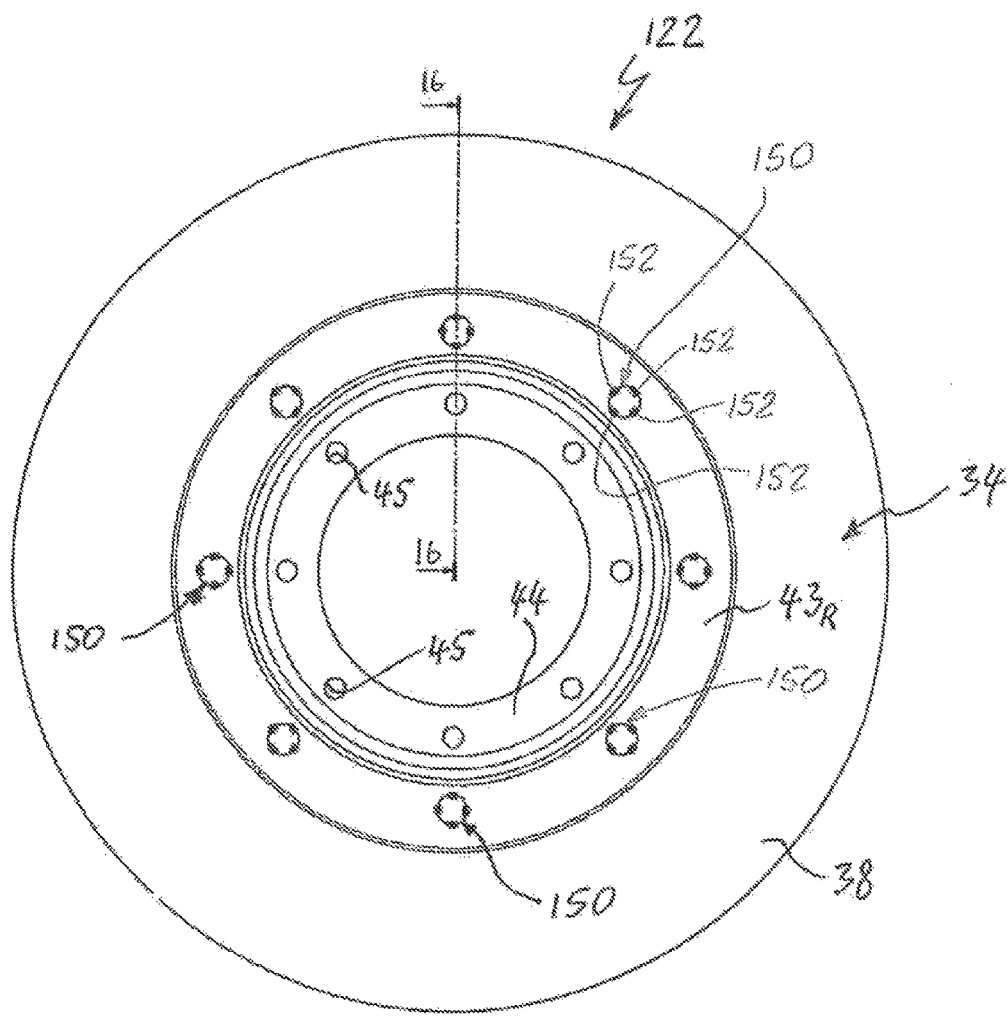
FIG. 14 is a rear elevational view of the turbine assembly in accordance with the second exemplary embodiment of the present invention.

Each of the snap fasteners 150 according to the second exemplary embodiment of the present invention includes one or more resilient snap arms 152 integrally formed with a base portion 156 of a second turbine shell member 146 on an annular outer surface $147_R$ thereof so as to extend axially outwardly from the outer surface $147_R$ of the second turbine shell member 146 toward the first turbine shell member 38 of the first turbine component 34. Preferably, the snap arms 152 extend substantially perpendicular to the outer surface $147_R$ of the second turbine shell member 146, or substantially parallel to the rotational axis X. According to the second exemplary embodiment of the present invention, the snap fastener 150 includes four snap arms 152 oriented diagonally opposite to one another, as best shown in FIGS. 11A and 14. However, the snap fastener 150 may include more or fewer than four snap arms 152.

Figure 16A:
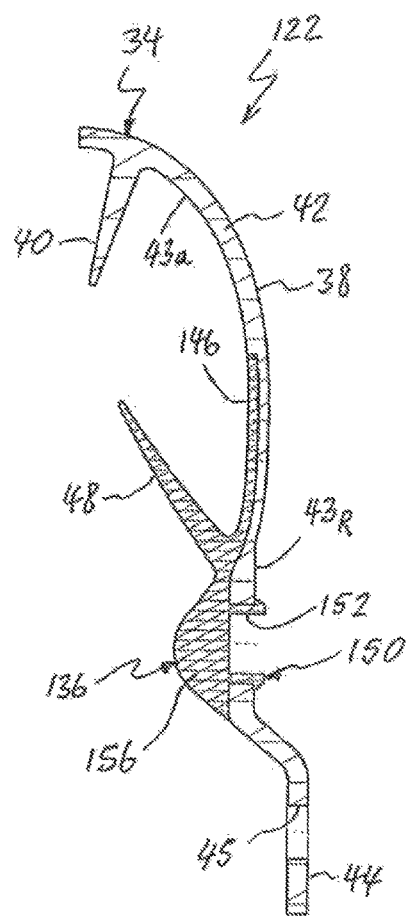
FIG. 16A is a partial sectional view of the turbine assembly taken along the line 16-16 in FIG. 14.
Figure 16B:
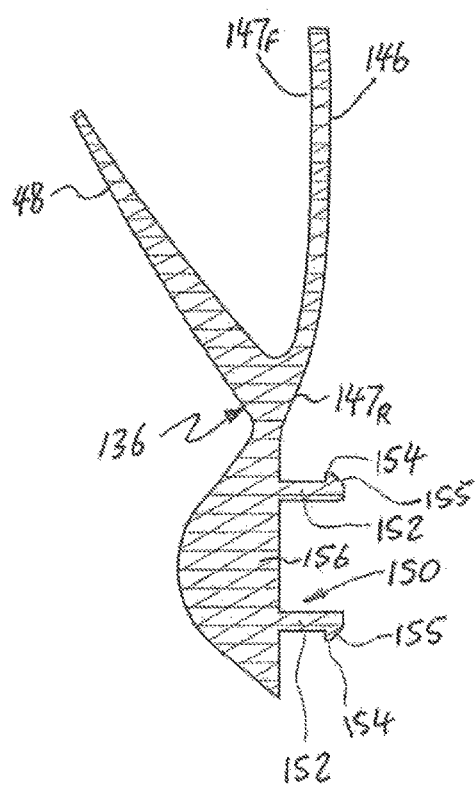
FIG. 16B is a partial sectional view of a second turbine component of the turbine assembly only taken along the line 16-16 in FIG. 14.

An axially distal free end of each of the snap arms 152 is formed with a barb or ledge 154 extending radially outwardly from the axially distal end of the snap arm 152. Moreover, as best shown in FIGS. 16A and 16B, each of the barbs 154 has an outwardly tapered exterior end surface 155 forming a ramp surface. The barbs 154 on the axially distal ends of the snap arms 152 are similar to but oriented in opposite directions so as to face one another. The snap arms 152 are elastically deformable in the radial direction.

The second turbine shell member 146 of the second turbine component 136 is fixedly (i.e., non-moveably) secured to the first turbine shell member 38 of the first turbine component 34 by the snap fasteners 150 extending through the holes 39 in the radially outer portion 42 of the first turbine shell member 38.

A method of securing the second turbine component 136 to the first turbine component 34 is as follows. First, the snap arms 152 of the snap fasteners 150 of the second turbine component 136 are inserted into the holes 39 of the first turbine component 34. Then, the snap fasteners 150 are pressed into the holes 39 (by applying an axial force to the second turbine component 136 toward the first turbine component 34 or to the first turbine component 34 toward the second turbine component 136), causing the snap arms 152 of the snap fasteners 150 to resiliently deform inwardly as a result of the pressure applied by edges of the holes 39 against the tapered exterior end surfaces 155 of the barbs 154. This force can be applied either manually or using a machine. During insertion, the outwardly inclined tapered exterior end surfaces 155 of the barbs 154 also act to guide the snap arms 152 into the holes 39. The snap arms 152 of the snap fasteners 150 advance through the holes 39 until the snap arms 152 spring back to their original or undeformed position as soon as the barbs 154 pass (or clear) the edges of the holes 39, i.e. until the barbs 154 of the snap fasteners 150 of the second turbine component 136 positively engage an annular rear surface $43_R$ of the first turbine shell member 38 so that the annular outer surface $147_R$ of the second turbine shell member 146 engages the annular support surface 43b of the radially outer portion 42 of the first turbine shell member 38.

In a hydrokinetic torque coupling device 210 of a third exemplary embodiment illustrated in FIGS. 17-26, the second turbine component 36 of the turbine assembly 22 is replaced by a second turbine component 236 of a turbine assembly 222, and further comprises two or more of snap fasteners 250. The hydrokinetic torque coupling device 210 of FIGS. 17-26 corresponds substantially to the hydrokinetic torque coupling device 10 of FIGS. 1-8C, and only the portions of the second turbine component 236 and the snap fasteners 250, which differ, will therefore be explained in detail below. In the third exemplary embodiment of the present invention illustrated in FIGS. 17-26, a base portion 256 of a second turbine shell member 246 of the second turbine component 236 includes a plurality of circumferentially (or angularly) mounting holes 258 complementary to and having substantially the same diameter as holes 39 of a first turbine component 34.

Figure 23:
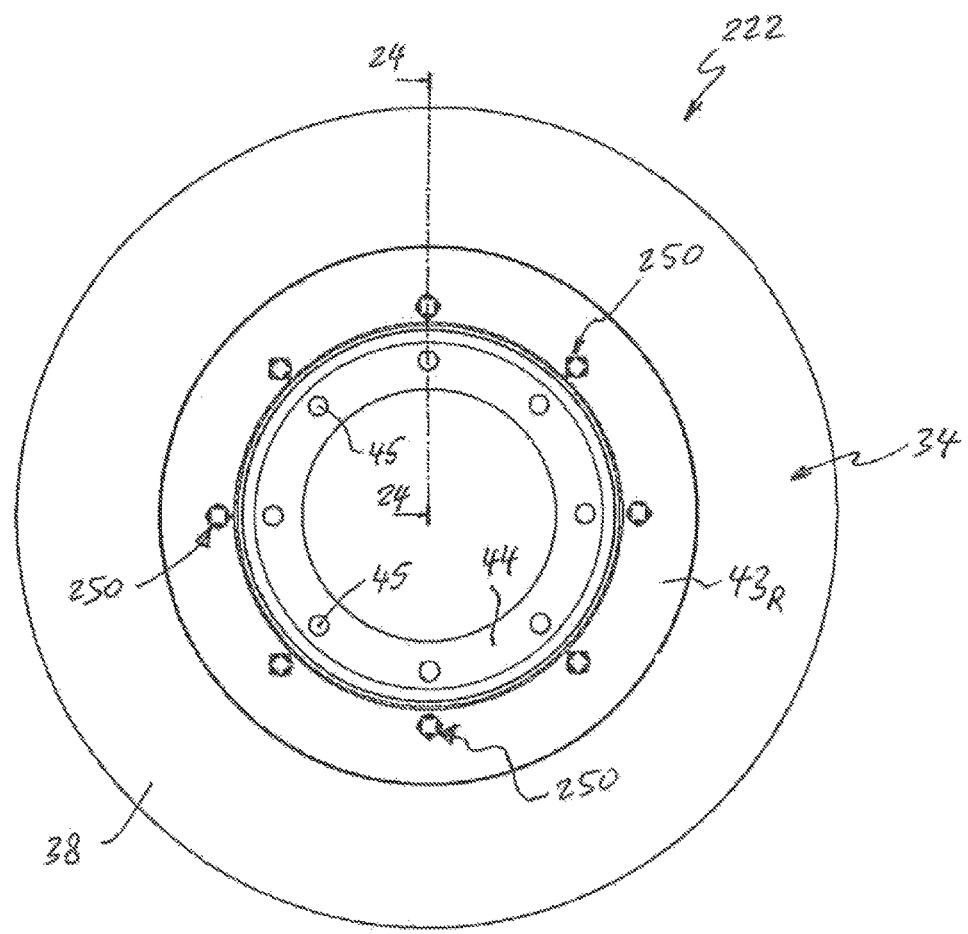
FIG. 23 is a rear elevational view of the turbine assembly in accordance with the third exemplary embodiment of the present invention.
Figure 27:
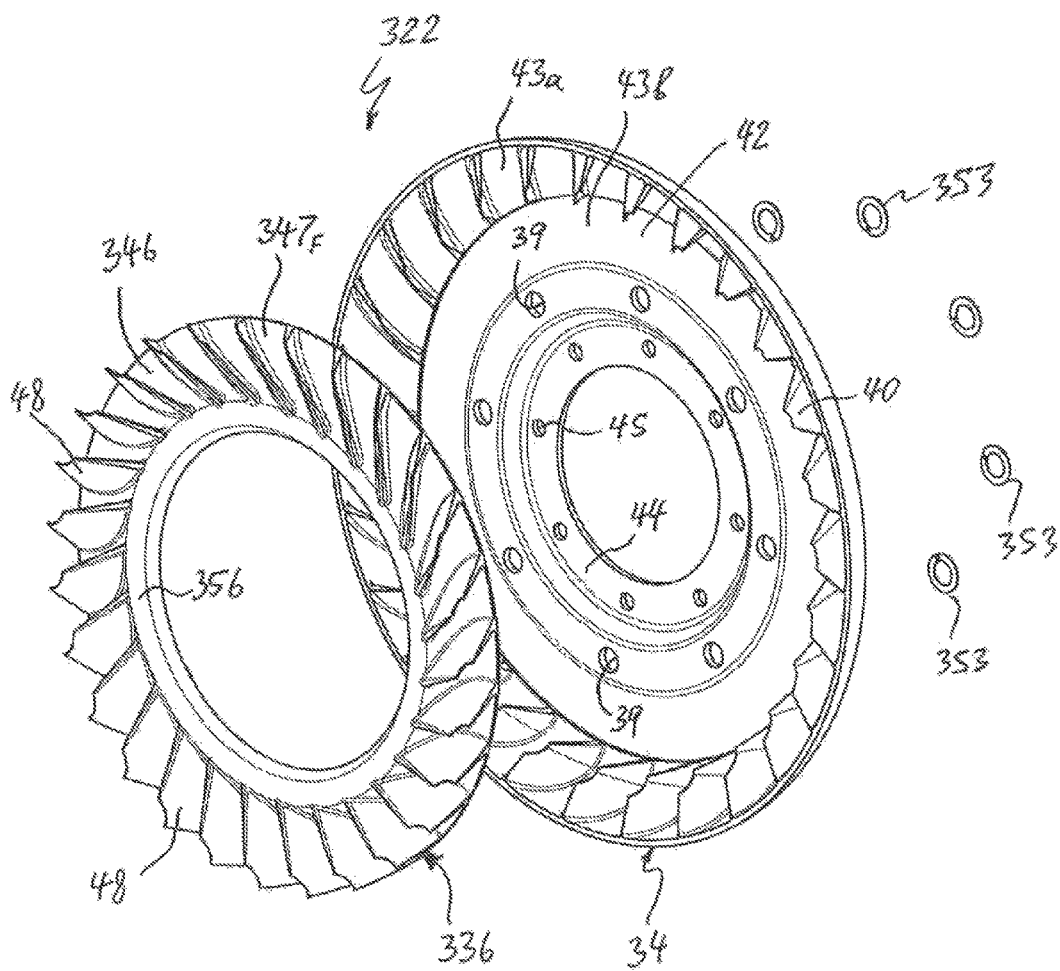
FIG. 27 is a front partial exploded perspective view of the turbine assembly in accordance with the fourth exemplary embodiment of the present invention.

The snap fasteners 250, as best shown in FIG. 20, are formed separately from the first and second turbine components 34 and 236, respectively. Accordingly, the snap fasteners 250 may be made of a material different from the material(s) of the first and second turbine components 34 and 236, respectively. Each of the snap fasteners 250 according to the third exemplary embodiment of the present invention includes a circular base 251, and one or more resilient snap arms 252 which extend axially outward from the base 251, as best shown in FIG. 20. The one or more resilient snap arms 252 of each of the snap fasteners 250 are configured to axially extend through the holes 39 in the radially outer portion 42 of the first turbine shell member 38 and the mounting holes 258 in the second turbine shell member 246 in order to fixedly (i.e., non-moveably) secure the second turbine shell member 246 to the first turbine shell member 38. In an assembled condition, the snap arms 252 extend axially from the second turbine shell member 146 toward the first turbine shell member 38. Preferably, the snap arms 252 extend substantially perpendicularly to the base 251 and an outer surface $247_R$ of the second turbine shell member 246, or substantially parallel to the rotational axis X. According to the third exemplary embodiment of the present invention, each of the snap fasteners 250 includes four snap arms 252 oriented diagonally opposite to one another, as best shown in FIGS. 20 and 23. However, the snap fastener 250 may include more or fewer than four snap arms 252.

An axially distal free end of each of the snap arms 252 is formed with a barb or ledge 254 extending radially outwardly from the axially distal end of the snap arm 252. Moreover, as best shown in FIG. 20, each of the barbs 254 has an outwardly tapered exterior end surface 255 forming a ramp surface. The barbs 254 on the axially distal ends of the snap arms 252 are similar to but are oriented in opposite directions so as to face one another. The snap arms 252 are elastically deformable in the radial direction.

The second turbine shell member 246 of the second turbine component 236 is fixedly (i.e., non-moveably) secured to the first turbine shell member 38 of the first turbine component 34 by the snap fasteners 250 extending through the holes 39 in the radially outer portion 42 of the first turbine shell member 38 and the mounting holes 258 in the second turbine shell member 246.

A method of securing the second turbine component 236 to the first turbine component 34 is as follows. First, the second turbine shell member 246 of the second turbine component 236 is brought in contact with the first turbine shell member 38 of the first turbine component 34 so that the mounting holes 258 in the second turbine shell member 246 are aligned with the holes 39 in the radially outer portion 42 of the first turbine shell member 38. Then the snap arms 252 of the snap fasteners 250 are inserted into the mounting holes 258 of the second turbine component 236. Then, the snap fasteners 250 are pressed into the mounting holes 258 (by applying an axial force to the bases 251 of the snap fasteners 250 toward the holes 39 of the first turbine component 34), causing the snap arms 252 of the snap fasteners 250 to resiliently deform inwardly as a result of the pressure applied by edges of the mounting holes 258 and the holes 39 against the tapered exterior end surfaces 255 of the barbs 254. This force can be applied either manually or using a machine. During insertion, the outwardly inclined tapered exterior end surfaces 255 of the barbs 254 also act to guide the snap arms 252 into the mounting holes 258 and the holes 39. The snap arms 252 of the snap fasteners 250 advance through the mounting holes 258 and the holes 39 until the snap arms 252 spring back to their original or undeformed position as soon as the barbs 254 pass (or clear) the edges of the holes 39, i.e. until the barbs 254 of the snap fasteners 250 of the second turbine component 236 positively engage an annular rear surface $43_R$ of the first turbine shell member 38 so that the annular outer surface $247_R$ of the second turbine shell member 246 engages the annular support surface 43b of the radially outer portion 42 of the first turbine shell member 38.

In a hydrokinetic torque coupling device 310 of a fourth exemplary embodiment illustrated in FIGS. 26-33, the second turbine component 36 of the turbine assembly 22 is replaced by a second turbine component 336 of a turbine assembly 322. The hydrokinetic torque coupling device 310 of FIGS. 26-33 corresponds substantially to the hydrokinetic torque coupling device 10 of FIGS. 1-8C, and only the portions of the second turbine component 336, which differ, will therefore be explained in detail below. In the fourth exemplary embodiment of the present invention illustrated in FIGS. 26-33, the second turbine component 336 includes two or more of circumferentially (or angularly) spaced snap fasteners 350, as best shown in FIGS. 26, 28A, 28B and 33. The snap fasteners 350 are configured to fixedly (i.e., non-moveably) secure the first turbine component 34 of the turbine assembly 322 to the second turbine component 336 thereof. The second turbine shell member 346 of the second turbine component 336 non-moveably engages first turbine shell member 38 of a first turbine component 34 so as to define together a turbine shell 330 of the turbine assembly 322. Moreover, the snap fasteners 350 are configured to axially extend through the holes 39 in the radially outer portion 42 of the first turbine shell member 38 in order to fixedly (i.e., non-moveably) secure the second turbine shell member 346 to the first turbine shell member 38.

Figure 28A:
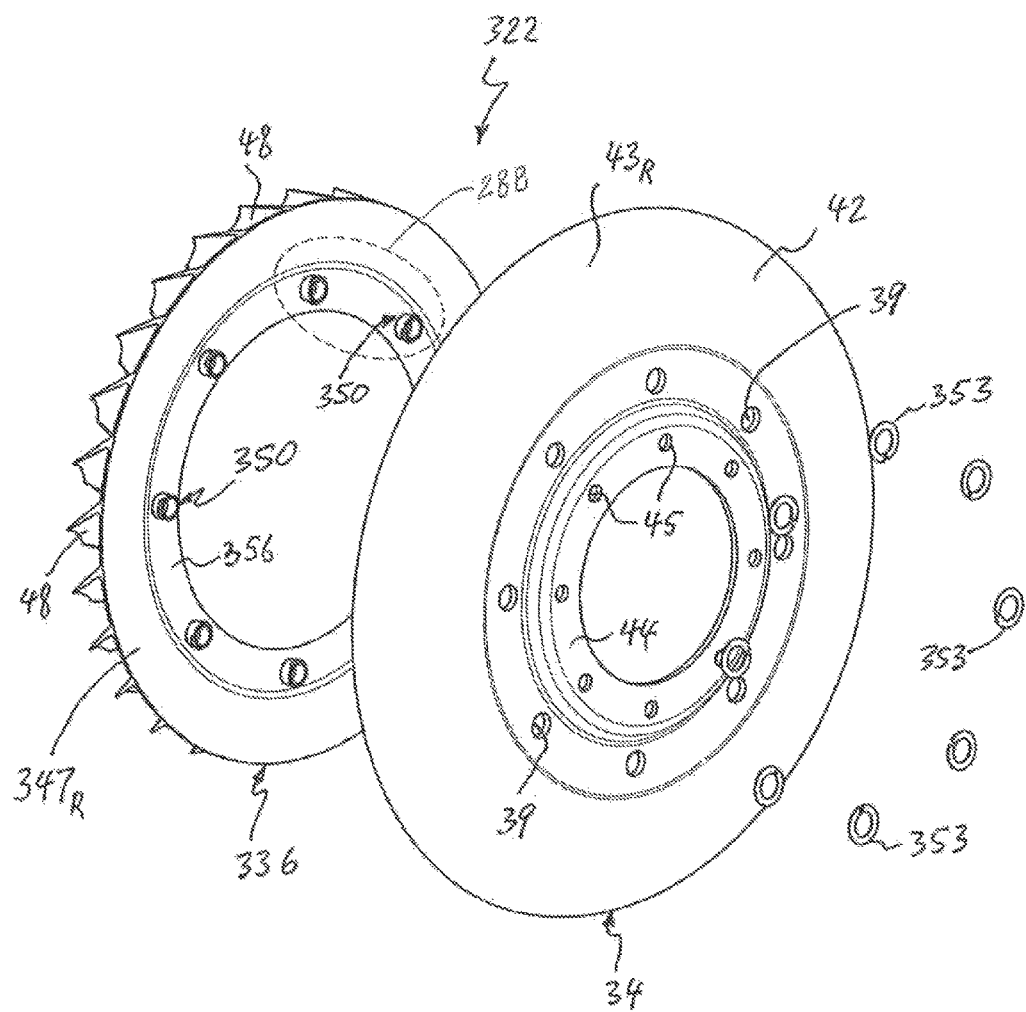
FIG. 28A is a rear partial exploded perspective view of the turbine assembly in accordance with the fourth exemplary embodiment of the present invention.
Figure 28B:
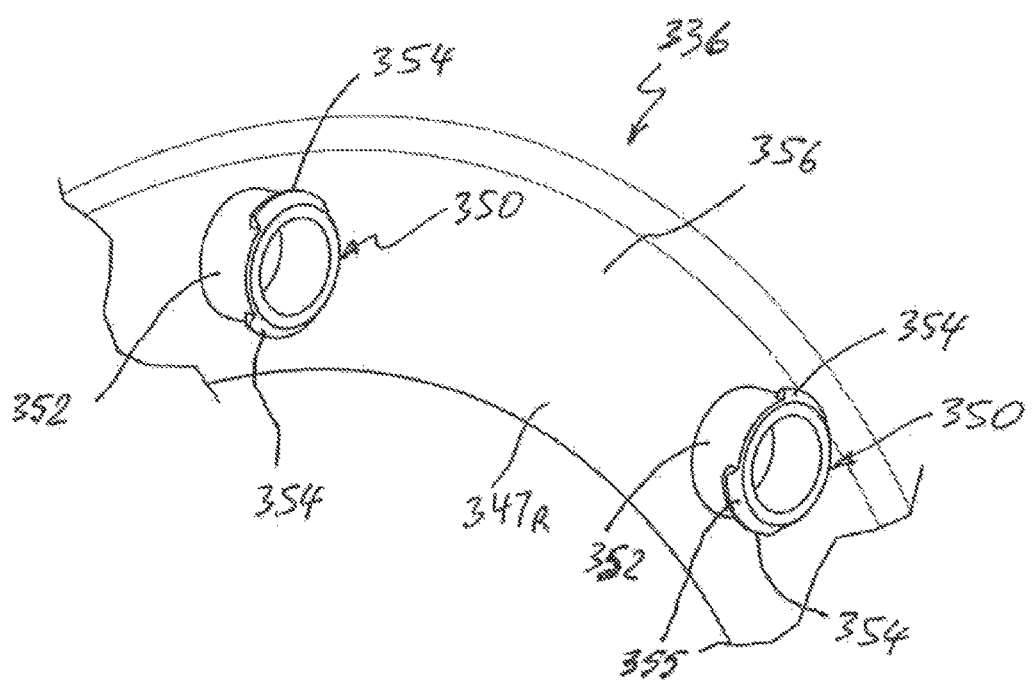
FIG. 28B is an enlarged view of a fragment of the turbine assembly shown in the circle "28B" of FIG. 28A.
Figure 30:
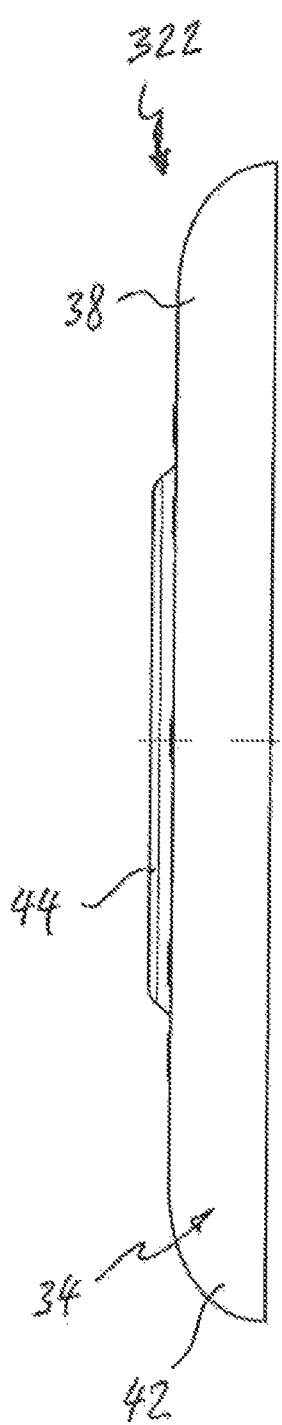
FIG. 30 is a side elevational view of the turbine assembly in accordance with the fourth exemplary embodiment of the present invention.
Figure 31:
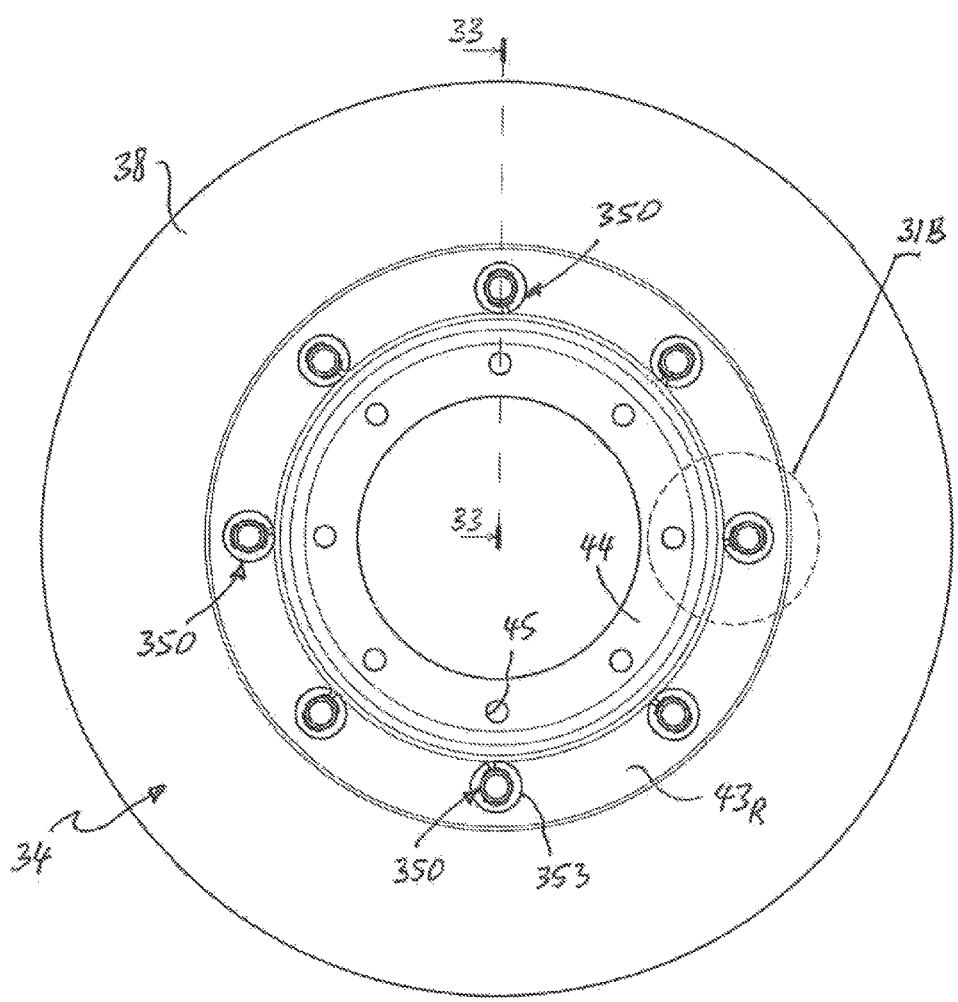
FIG. 31A is a rear elevational view of the turbine assembly in accordance with the fourth exemplary embodiment of the present invention.
FIG. 31B is an enlarged view of a fragment of the turbine assembly shown in the circle "31B" of FIG. 31A.
Figure 32:
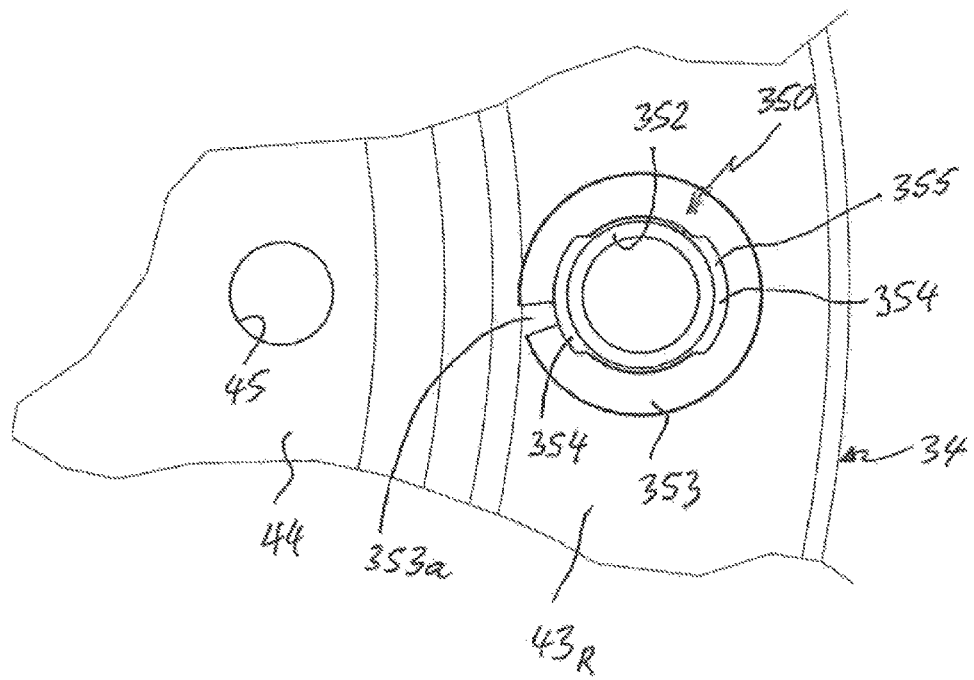
FIG. 32 is a partial sectional view the turbine assembly taken along the line 32-32 in FIG. 29.
Figure 35:
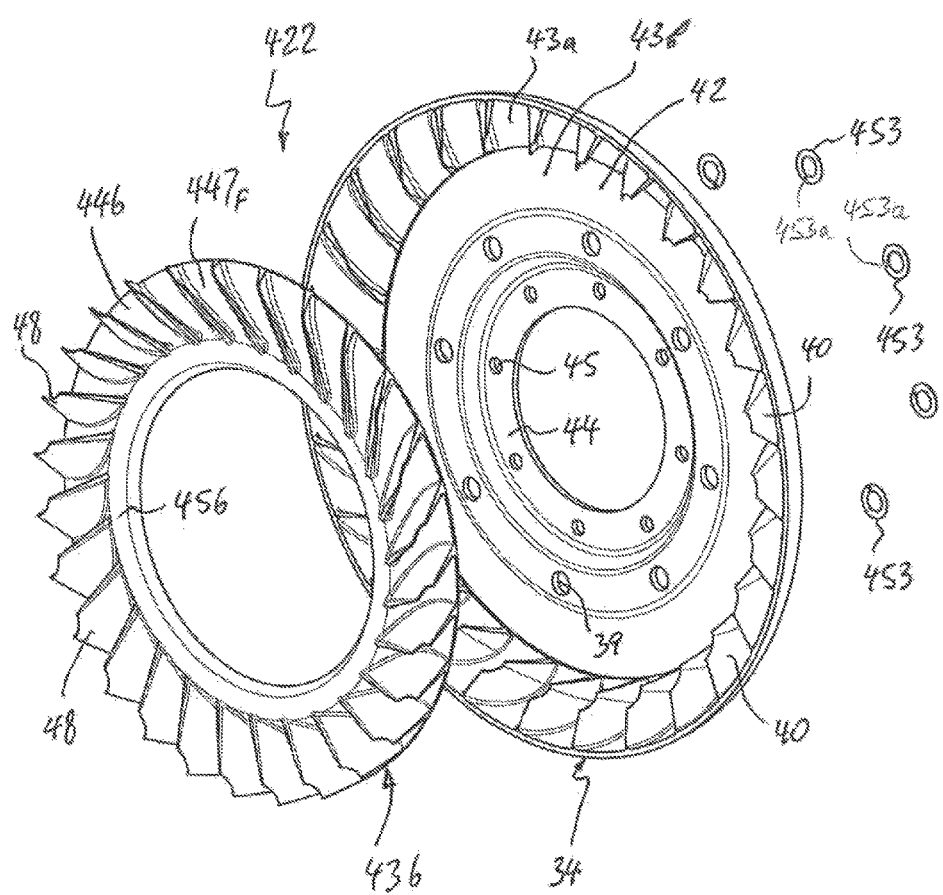
FIG. 35 is a front partial exploded perspective view of the turbine assembly in accordance with the fifth exemplary embodiment of the present invention.

Each of the snap fasteners 350 according to the fourth exemplary embodiment of the present invention includes a resilient hollow cylindrical snap arm 352 and a slotted ring 353. The cylindrical snap arm 352 is integrally formed with a base portion 356 of a second turbine shell member 346 on an annular outer surface $347_R$ thereof so as to extend axially outward from the outer surface $347_R$ of the second turbine shell member 346 toward the first turbine shell member 38 of the first turbine component 34. Preferably, the cylindrical snap arm 352 extends substantially perpendicularly to the outer surface $347_R$ of the second turbine shell member 346, or substantially parallel to the rotational axis X. An axially distal free end of the cylindrical snap arm 352 is formed with one or more arc-shaped barbs or ledges 354 extending radially outwardly from the axially distal end of the snap arm 352. According to the fourth exemplary embodiment of the present invention, each of the snap fasteners 350 has two radially opposite barbs 354, as best shown in FIGS. 28B, 31B and 33. Moreover, as best shown in FIG. 33, each of the barbs 354 has an outwardly tapered exterior end surface 355 forming a ramp surface. The opposite barbs 354 on the axially distal end of each of the snap arms 352 are similar but are oriented in opposite directions so as to face one another. The axially distal end of the cylindrical snap arm 352 is elastically deformable in the radial direction.

Each of the slotted rings 353 is a radially expandable slotted ring (i.e., formed with a slot 353a shown in FIG. 31B), such as a conventional snap ring or C-ring well known to those skilled in the art, and has axially opposite flat surfaces. As best shown in FIG. 33, each of the slotted rings 353 is maintained radially over and around the cylindrical snap arm 352 within the barbs 354 and seated upon and around the cylindrical snap arm 352 of the snap fastener 350. As illustrated, the slotted rings 353 are disposed between the rear surface $43_R$ of the first turbine shell member 38 and the barbs 354 of the snap arms 352. The slotted rings 353 increase the contact surface for axial retention. The slotted rings 353 can also be "load" snap rings configured to exert an axial load (or force) to stack (or press) the first and second turbine components 34 and 336, respectively, together.

A method of securing the second turbine component 336 to the first turbine component 34 is as follows. First, the snap arms 352 of the snap fasteners 350 on the second turbine component 336 are inserted into the holes 39 of the first turbine component 34. Then, the snap arms 352 are pressed over the holes 39 (manually or by machine), causing the snap arms 352 of the snap fasteners 350 to resiliently deform inwardly as a result of the pressure applied by edges of the holes 39 against the tapered exterior end surfaces 355 of the opposite barbs 354. During insertion, the outwardly inclined tapered exterior end surfaces 355 of the opposite barbs 354 also act to guide the snap arms 352 into the holes 39. The snap arms 352 of the snap fasteners 350 advance through the holes 39 until the snap arms 352 spring back to their original or undeformed position as soon as the opposite barbs 354 pass (or clear) the edges of the holes 39. Next, the slotted rings 353 are mounted over and around the cylindrical snap arm 352 between the rear surface $43_R$ of the first turbine shell member 38 and the barbs 354 of the snap arms 352. In this position, the barbs 354 of the snap fasteners 350 of the second turbine component 336 positively engage the flat surfaces of the slotted rings 353, while the opposite flat surfaces of the slotted rings 353 engage the annular rear surface $43_R$ of the first turbine shell member 38 so that the annular outer surface $347_R$ of the second turbine shell member 346 engages the annular support surface 43b of the radially outer portion 42 of the first turbine shell member 38.

Figure 39:
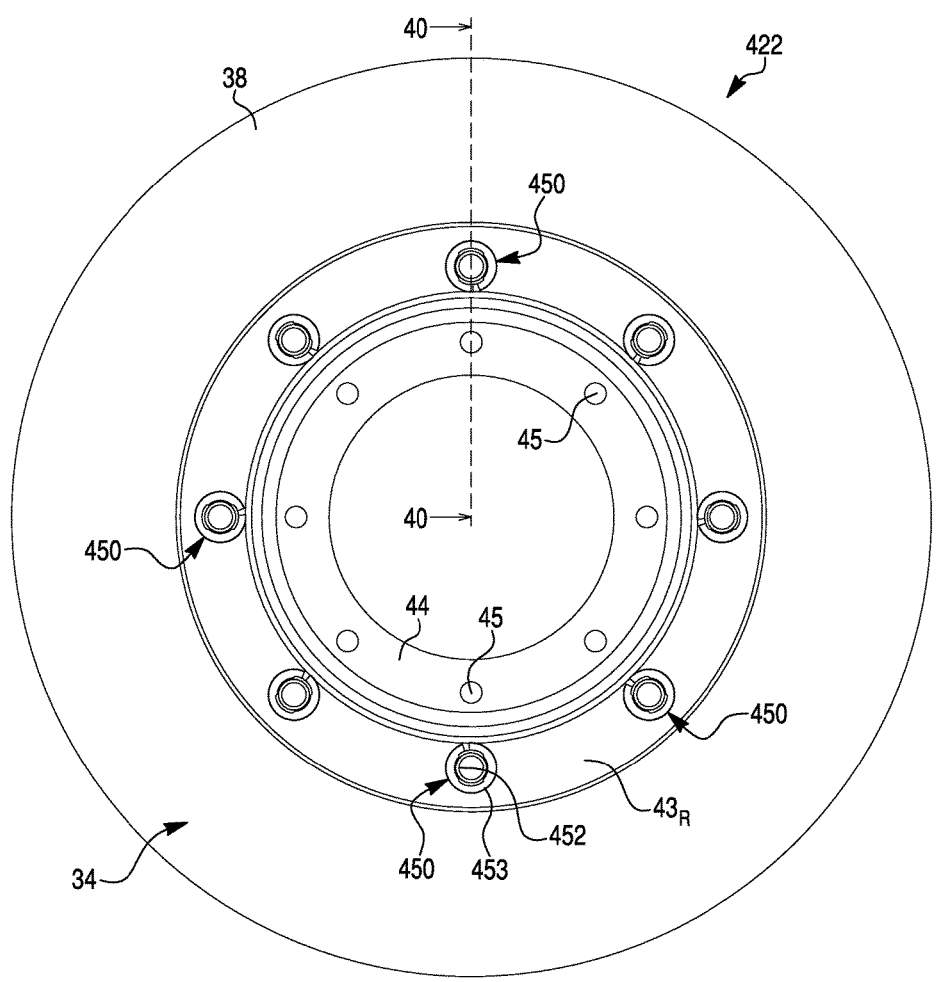
FIG. 39 is a rear elevational view of the turbine assembly in accordance with the fifth exemplary embodiment of the present invention.
Figure 40:
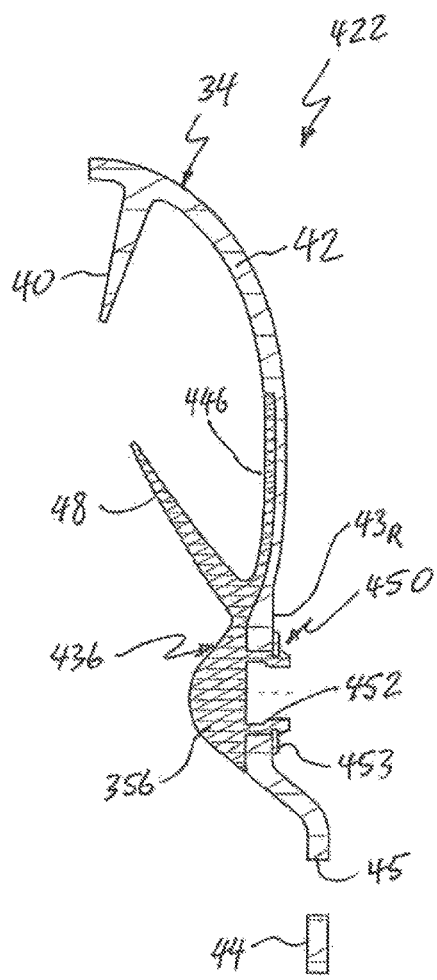
FIG. 40 is a partial sectional view the turbine assembly taken along the line 40-40 in FIG. 39.
Figure 41:
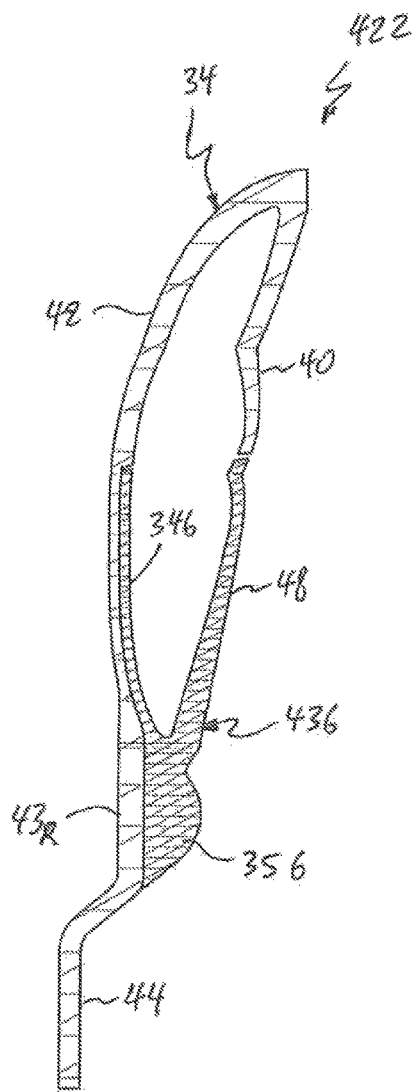
FIG. 41 is a partial sectional view the turbine assembly taken along the line 41-41 in FIG. 37.

In a hydrokinetic torque coupling device 410 of a fifth exemplary embodiment illustrated in FIGS. 34-42, the second turbine component 36 of the turbine assembly 22 is replaced by a second turbine component 436 of a turbine assembly 422. The hydrokinetic torque coupling device 410 of FIGS. 34-42 corresponds substantially to the hydrokinetic torque coupling device 10 of FIGS. 1-8C, and only the portions of the second turbine component 436, which differ, will therefore be explained in detail below. In the fourth exemplary embodiment of the present invention illustrated in FIGS. 34-42, the second turbine component 436 includes two or more of circumferentially (or angularly) spaced fasteners 450, as best shown in FIGS. 34, 39 and 40. The fasteners 450 are configured to fixedly (i.e., non-moveably) secure a first turbine component 34 of the turbine assembly 422 to the second turbine component 436 thereof. The second turbine shell member 446 of the second turbine component 436 non-moveably engages a first turbine shell member 38 of the first turbine component 34 so as to define together a turbine shell 430 of the turbine assembly 422. Moreover, the fasteners 450 axially extend through the holes 39 in the radially outer portion 42 of the first turbine shell member 38 in order to fixedly (i.e., non-moveably) secure the second turbine shell member 446 to the first turbine shell member 38.

Figure 36A:
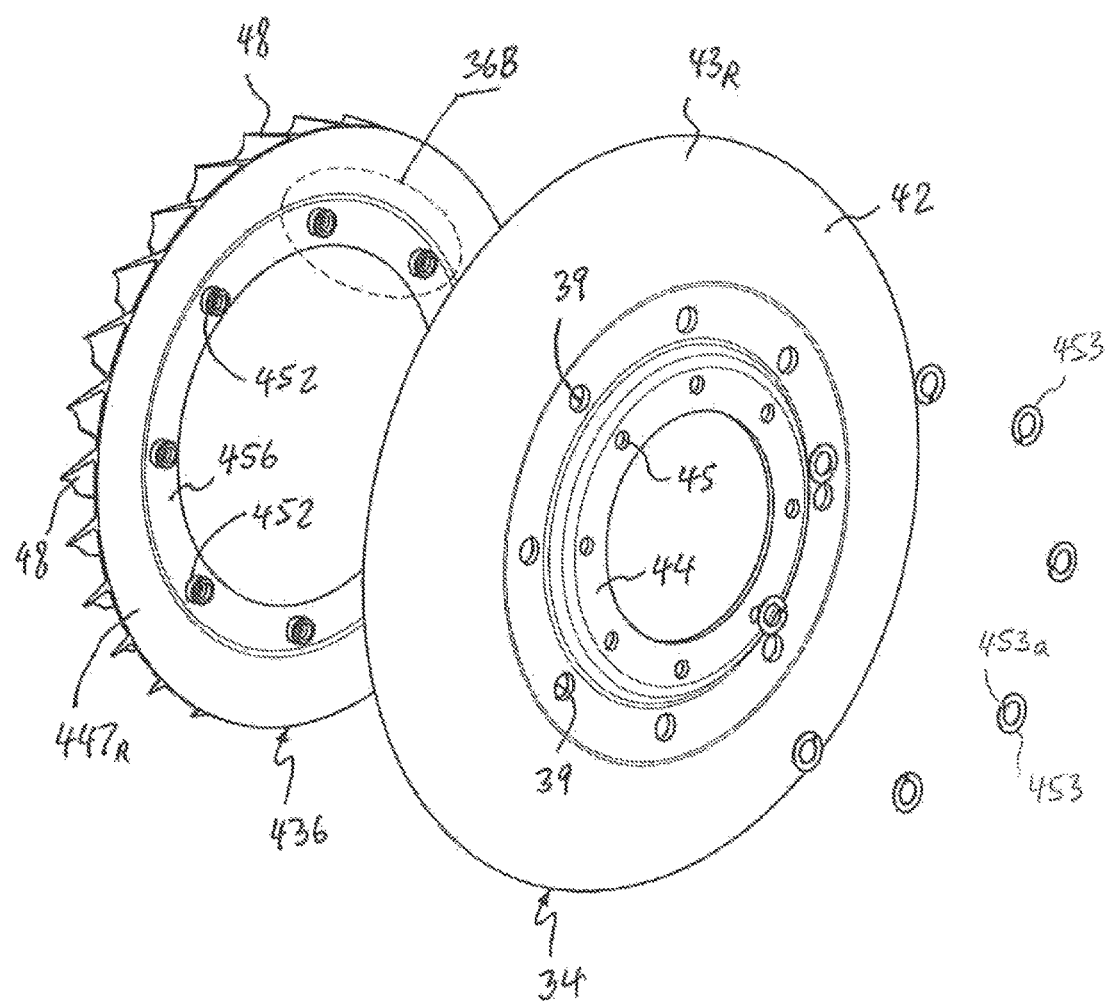
FIG. 36A is a rear partial exploded perspective view of the turbine assembly in accordance with the fifth exemplary embodiment of the present invention.
Figure 36B:
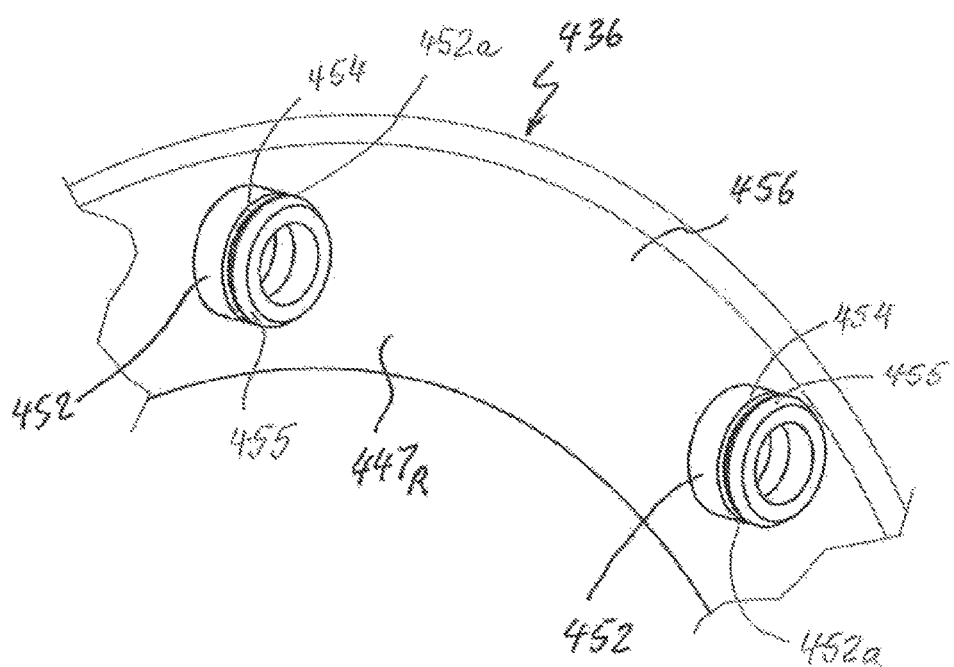
FIG. 36B is an enlarged view of a fragment of the turbine assembly shown in the circle "36B" of FIG. 36A.
Figure 37:
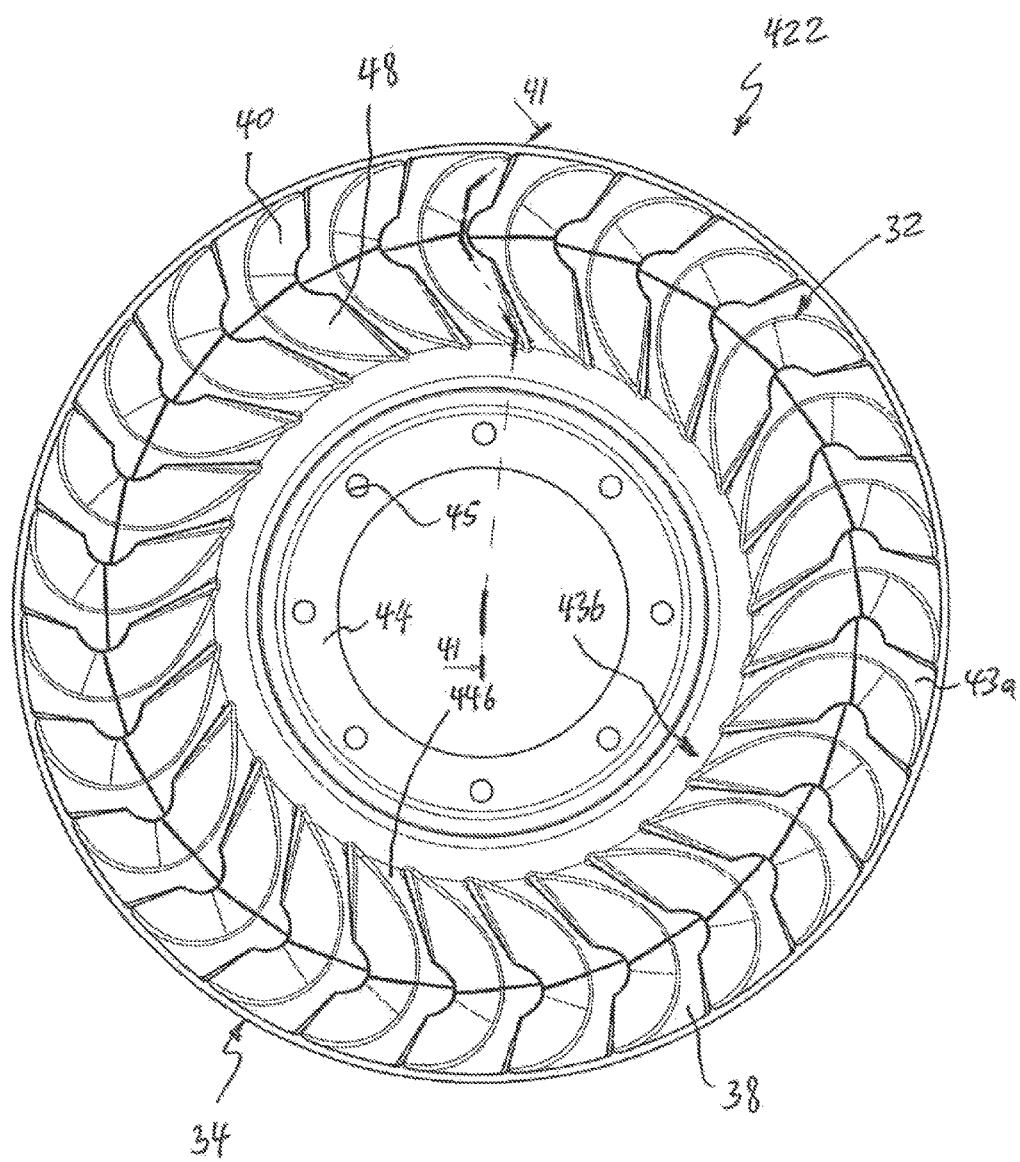
FIG. 37 is a front elevational view of the turbine assembly in accordance with the fifth exemplary embodiment of the present invention.
Figure 38:
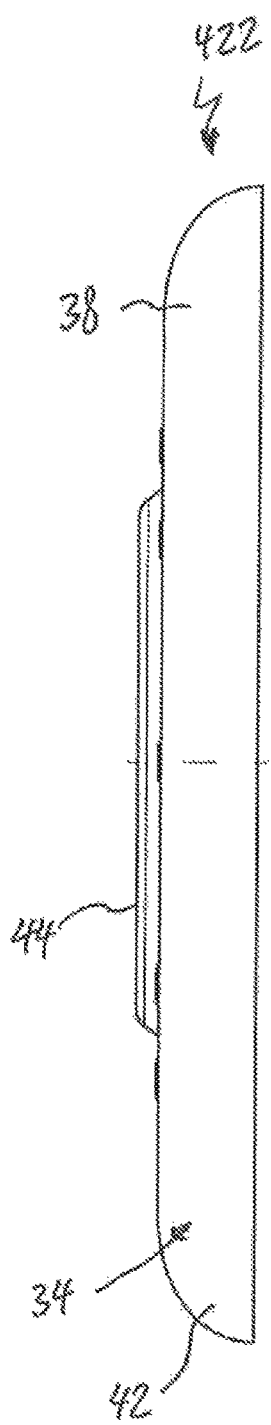
FIG. 38 is a side elevational view of the turbine assembly in accordance with the fifth exemplary embodiment of the present invention.
Figure 42:
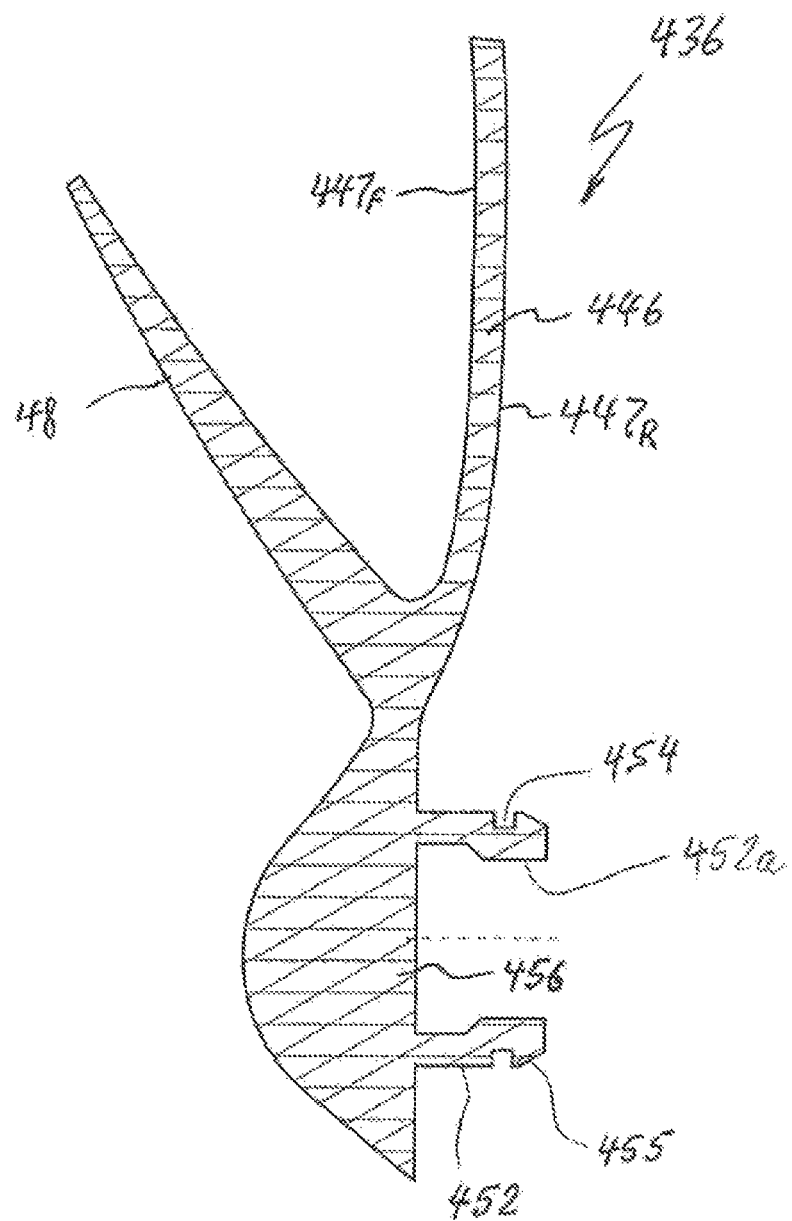
FIG. 42 is a partial sectional view of the second turbine component only of the turbine assembly taken along the line 40-40 in FIG. 39.
Figure 43:
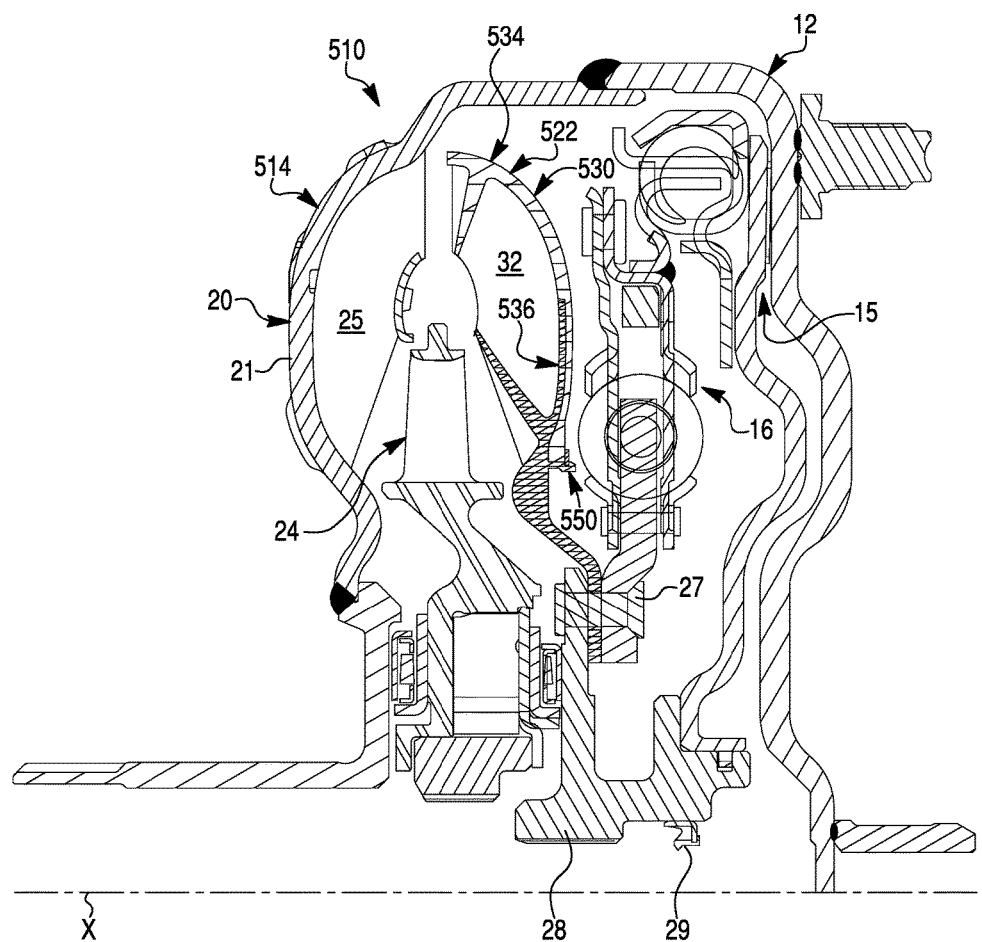
FIG. 43 is a fragmented half-view in axial section of a hydrokinetic torque coupling device with a turbine assembly in accordance with a sixth exemplary embodiment of the present invention.

Each of the fasteners 450 according to the fifth exemplary embodiment of the present invention includes a hollow cylindrical fastener arm 452 and a slotted ring 453. The cylindrical fastener arm 452 is integrally formed with a base portion 456 of a second turbine shell member 446 on an annular outer surface $447_R$ thereof so as to extend axially outward from the outer surface $447_R$ of the second turbine shell member 446 toward the first turbine shell member 38 of the first turbine component 34. Preferably, the cylindrical fastener arm 452 extends substantially perpendicular to the outer surface $447_R$ of the second turbine shell member 446, or substantially parallel to the rotational axis X. An axially distal free end 452a of the cylindrical fastener arm 452 is formed with an annular groove 454, as best shown in FIGS. 36B and 42. Moreover, as best shown in FIG. 42, the axially distal free end 452a of the cylindrical fastener arms 452 has an outwardly tapered exterior end surface 455.

Each of the slotted rings 453 is a radially expandable slotted ring (i.e., formed with a slot 453a shown in FIGS. 35 and 36A), such as a conventional snap ring or C-ring well known to those skilled in the art, and has axially opposite flat surfaces. As best shown in FIG. 40, each of the slotted rings 453 is maintained radially over and around one of the cylindrical fastener arms 452 and at least partially seated (disposed) in the annular groove 454 of the fastener 450. As illustrated, the slotted rings 453 are disposed between the rear surface $43_R$ of the first turbine shell member 38 and the axially distal free ends 452a of the cylindrical fastener arms 452. The slotted rings 453 are provided to retain axially the first and second turbine components 34 and 436, respectively, together. The slotted rings 453 can also be a "load" snap rings configured to exert an axial load (or force) to stack (or press) the first and second turbine components 34 and 436, respectively, together.

A method of securing the second turbine component 436 to the first turbine component 34 is as follows. First, the fastener arms 452 of the fasteners 450 on the second turbine component 436 are inserted into the holes 39 of the first turbine component 34. Then, the fastener arms 452 are pressed over the holes 39 (manually or by machine), until the axially distal free ends 452a of the fastener arms 452 pass (or clear) the edges of the holes 39. Next, the slotted snap rings 453 are mounted into the annular groove 454 of the fastener arms 452. In this position, the slotted snap rings 453 of the fasteners 450 positively engage the annular rear surface $43_R$ of the first turbine shell member 38 so that the annular outer surface $447_R$ of the second turbine shell member 446 engages the annular support surface 43b of the radially outer portion 42 of the first turbine shell member 38.

In a hydrokinetic torque coupling device 510 of a sixth exemplary embodiment illustrated in FIGS. 43-51, the turbine assembly 22 is replaced by a turbine assembly 522. The hydrokinetic torque coupling device 510 of FIGS. 43-51 corresponds substantially to the hydrokinetic torque coupling device 10 of FIGS. 1-8C, and only the portions of the turbine assembly 522, which differ, will therefore be explained in detail below.

The turbine assembly 522 of the sixth exemplary embodiment comprises a first turbine component 534 rotatable about the rotational axis X, and a second turbine component 536 non-moveably secured to the first turbine component 534 coaxially therewith, as best shown in FIGS. 43-45, 48 and 49. As illustrated, the first turbine component 534 includes a substantially annular first turbine shell member 538 and a plurality of first turbine blade members 40 integrally formed therewith and outwardly extending from the first turbine shell member 538 so as to face the impeller blades 25 of the impeller assembly 20. Preferably, the first turbine shell member 538 and the first turbine blade members 40 are made of a single or unitary component, but may be separate components fixedly (i.e., non-moveably) connected together.

Figure 44:
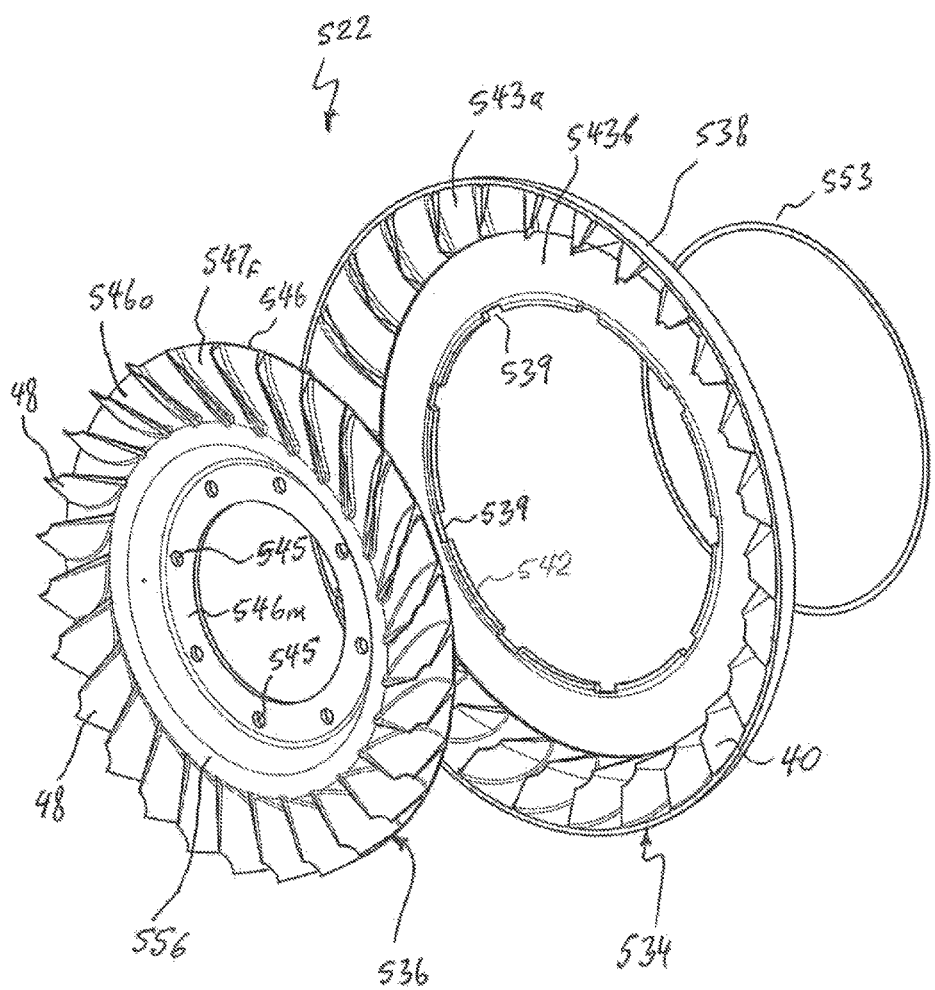
FIG. 44 is a front partial exploded perspective view of the turbine assembly in accordance with the sixth exemplary embodiment of the present invention.

The first turbine shell member 538 has a substantially annular, semi-toroidal (i.e., concave) inner surface 543a and a substantially annular support surface 543b located radially within the inner surface 543a of the first turbine shell member 538. Both the inner surface 543a and the support surface 543b of the first turbine shell member 538 are facing the impeller assembly 20. As best shown in FIG. 44, the turbine blade members 40 are integrally formed on and outwardly extend from the inner surface 543a of the first turbine shell member 538 of the first turbine component 534 of the turbine assembly 522. A radially inner peripheral edge 542 of the first turbine shell member 538 is provided with a plurality of circumferentially spaced, generally U-shaped cut-outs 539, as best shown in FIGS. 44 and 45.

Figure 45:
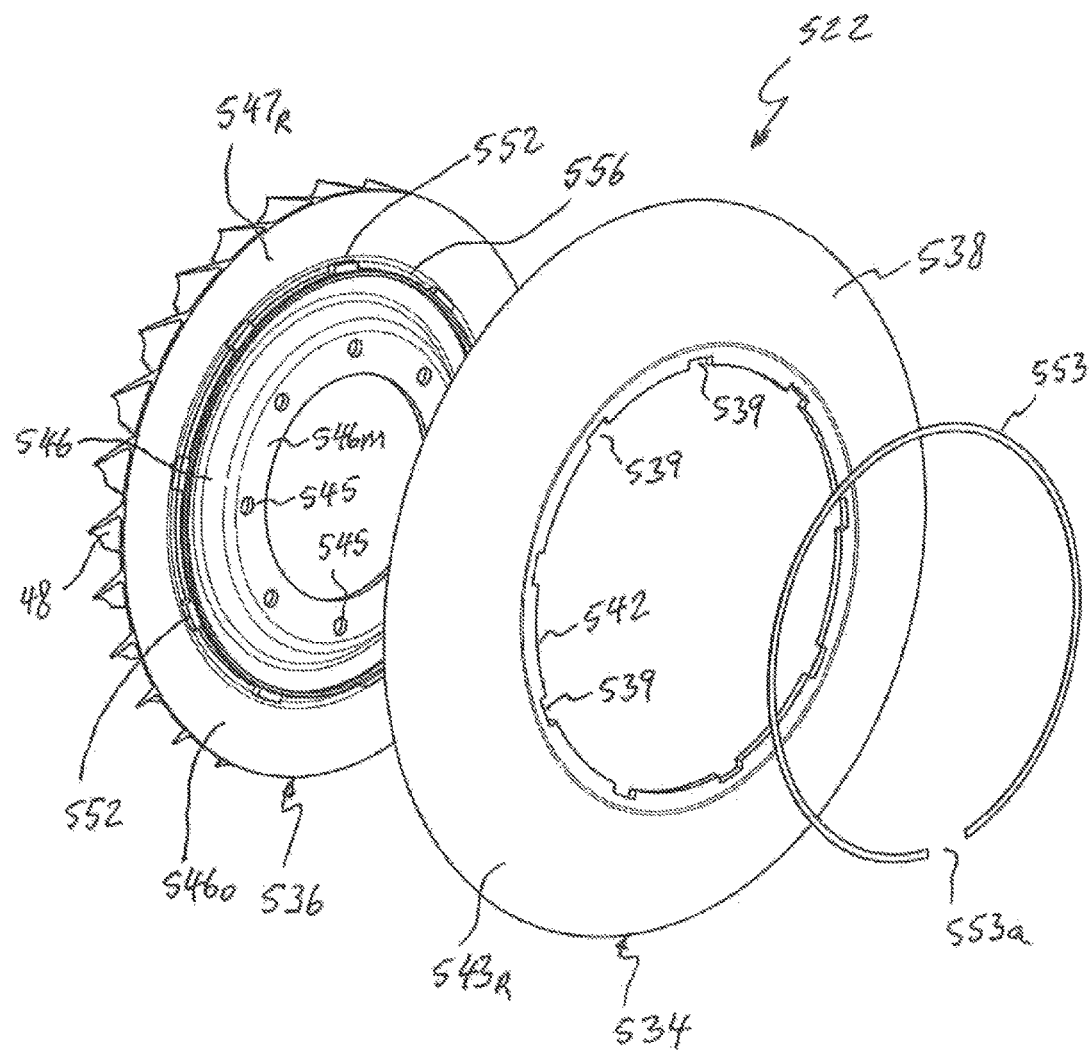
FIG. 45 is a rear partial exploded perspective view of the turbine assembly in accordance with the sixth exemplary embodiment of the present invention.
Figure 50:
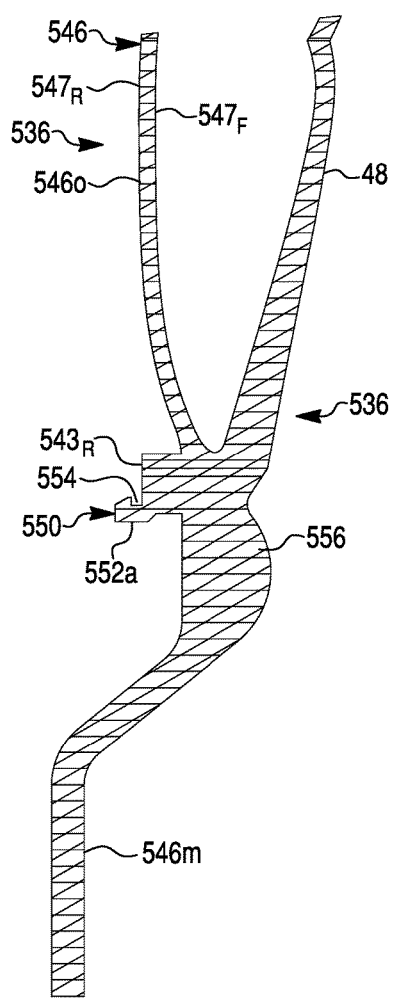
FIG. 50 is a partial sectional view of the second turbine component only of the turbine assembly taken along the line 48-48 in FIG. 46.

As further illustrated in FIGS. 44 and 45, the second turbine component 536 includes a substantially annular second turbine shell member 546 and a plurality of second turbine blade members 48 integrally formed therewith and outwardly extending from the second turbine shell member 546 so as to face the impeller blades 25 of the impeller assembly 20. Preferably, the second turbine shell member 546 and the second turbine blade members 48 are made of a single or unitary component, but may be separate components fixedly (i.e., non-moveably) connected together.

The second turbine shell member 546 has a substantially annular, semi-toroidal radially outer portion 546o, a substantially annular base portion 556 located radially within the radially outer portion 546o, and a substantially annular mounting portion 546m located radially within the base portion 556 and the radially outer portion 546o of the second turbine shell member 546. The second turbine blade members 48 are integrally formed with the radially outer portion 546o of the second turbine shell member 546 and outwardly extend from an annular, substantially semi-toroidal (i.e., concave) inner surface $547_F$ of the second turbine shell member 546. The mounting portion 546m of the second turbine shell member 546 is provided with a plurality of circumferentially spaced holes 545. The second turbine shell member 546 is fixedly secured to the turbine hub 28 by the rivets 27 extending through the holes 545 in the mounting portion 546m of the second turbine shell member 546.

In the sixth exemplary embodiment of the present invention illustrated in FIGS. 43-51, the second turbine component 536 includes two or more of equiangulrly circumferentially (or angularly) spaced fasteners 550, as best shown in FIGS. 43, 47, 48 and 49. The fasteners 550 are configured to fixedly (i.e., non-moveably) secure the first turbine component 534 of the turbine assembly 522 to the second turbine component 536 thereof. A second turbine shell member 546 of the second turbine component 536 non-moveably engages a first turbine shell member 538 of the first turbine component 534 so as to define together a turbine shell 530 of the turbine assembly 522.

Each of the fasteners 550 according to the sixth exemplary embodiment of the present invention includes a fastener arm 552 integrally formed with the base portion 556 of the second turbine shell member 546 on an annular outer surface $547_R$ thereof so as to extend axially outward from the outer surface $547_R$ of the second turbine shell member 546 toward the first turbine shell member 538 of the first turbine component 534. Preferably, the fastener arm 552 extends substantially perpendicular to the outer surface $547_R$ of the second turbine shell member 546, or substantially parallel to the rotational axis X. Moreover, the fastener arms 552 are configured to axially extend through equiangularly disposed U-shaped cut-outs 539 formed in the radially inner peripheral edge 542 of the first turbine shell member 538 in order to non-rotatably secure the second turbine component 536 relative to the first turbine component 534. Specifically, a circumferential length of each of the fastener arms 552 substantially equals the circumferential length of each of the U-shaped cut-outs 539. Accordingly, as the fastener arms 552 of the second turbine component 536 extend through the U-shaped cut-outs 539 in the first turbine component 534, the relative angular movement between the first turbine component 534 and the second turbine component 536 is blocked.

Figure 51:
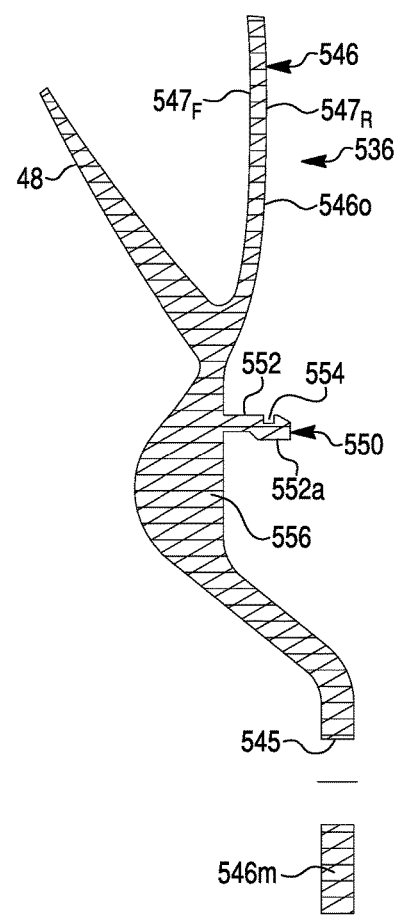
FIG. 51 is a partial sectional view of the second turbine component only of the turbine assembly taken along the line 49-49 in FIG. 47.
Figure 52:
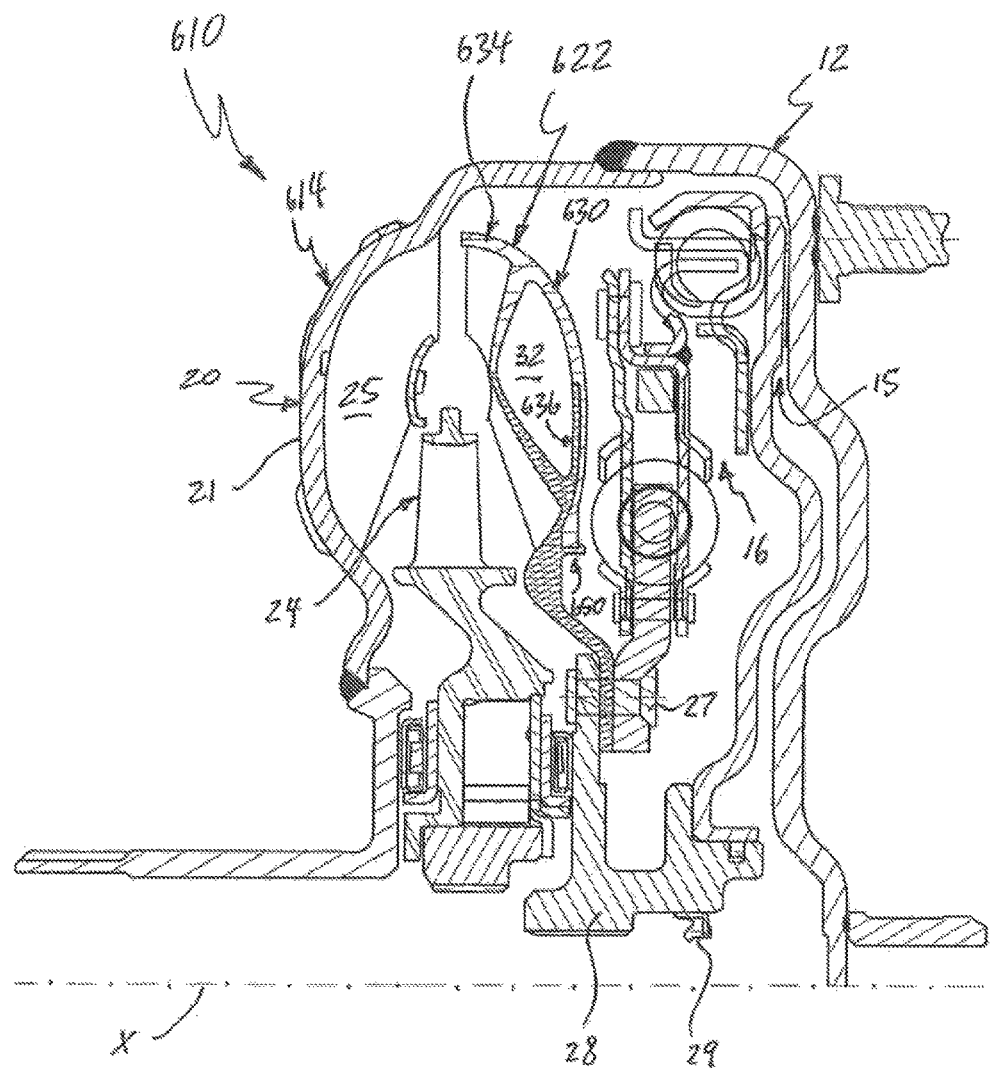
FIG. 52 is a fragmented half-view in axial section of a hydrokinetic torque coupling device with a turbine assembly in accordance with a seventh exemplary embodiment of the present invention.

Furthermore, an axially distal free end 552a of each of the fastener arms 552 is formed with a circumferentially extending groove 554 open radially outwardly from the rotational axis X, as best shown in FIGS. 51 and 52.

The turbine assembly 522 according to the sixth exemplary embodiment of the present invention further comprises a single slotted (or snap) ring 553 substantially coaxial (or concentric) with the rotational axis X. The slotted ring 553 is a radially expandable slotted ring (i.e., formed with a slot 553a shown in FIG. 45), such as a conventional snap ring or C-ring well known to those skilled in the art, and has axially opposite flat surfaces. As best shown in FIGS. 43, 48, 49 and 50, the slotted ring 553 is maintained radially over the fastener arms 552 and at least partially seated (disposed) in the grooves 554 of the fastener arms 552. As illustrated, the snap ring 553 is disposed between the rear surface $543_R$ of the first turbine shell member 538 and the axially distal free ends 552a of the fastener arms 552. The snap ring 553 is provided to retain axially the first and second turbine components 534 and 536, respectively, together. Thus, the first turbine component 534 and the second turbine component 536 are fixedly (i.e., non-moveably) secured one to another. The snap ring 553 can also be a "load" snap rings configured to exert an axial load (or force) to stack (or press) the first and second turbine components 534 and 536, respectively, together.

A method of securing the second turbine component 536 to the first turbine component 534 is as follows. First, the fastener arms 552 of the fasteners 550 on the second turbine component 536 are inserted into the cut-outs 539 of the first turbine component 534 until the axially distal free ends 552a of the fastener arms 552 with the grooves 554 pass (or clear) the edges of the cut-outs 539. Next, the slotted snap ring 553 is mounted into the grooves 554 of fastener arms 552. In this position, the slotted snap ring 553 positively engage the annular rear surface $543_R$ of the first turbine shell member 538 so that the annular outer surface $547_R$ of the second turbine shell member 546 engages the annular support surface 543b of the radially outer portion 542 of the first turbine shell member 538.

In a hydrokinetic torque coupling device 610 of a seventh exemplary embodiment illustrated in FIGS. 52-62, the turbine assembly 522 is replaced by a turbine assembly 622. The hydrokinetic torque coupling device 610 of FIGS. 52-62 corresponds substantially to the hydrokinetic torque coupling device 510 of FIGS. 43-51, and only the portions of the turbine assembly 622, which differ, will therefore be explained in detail below.

Figure 53:
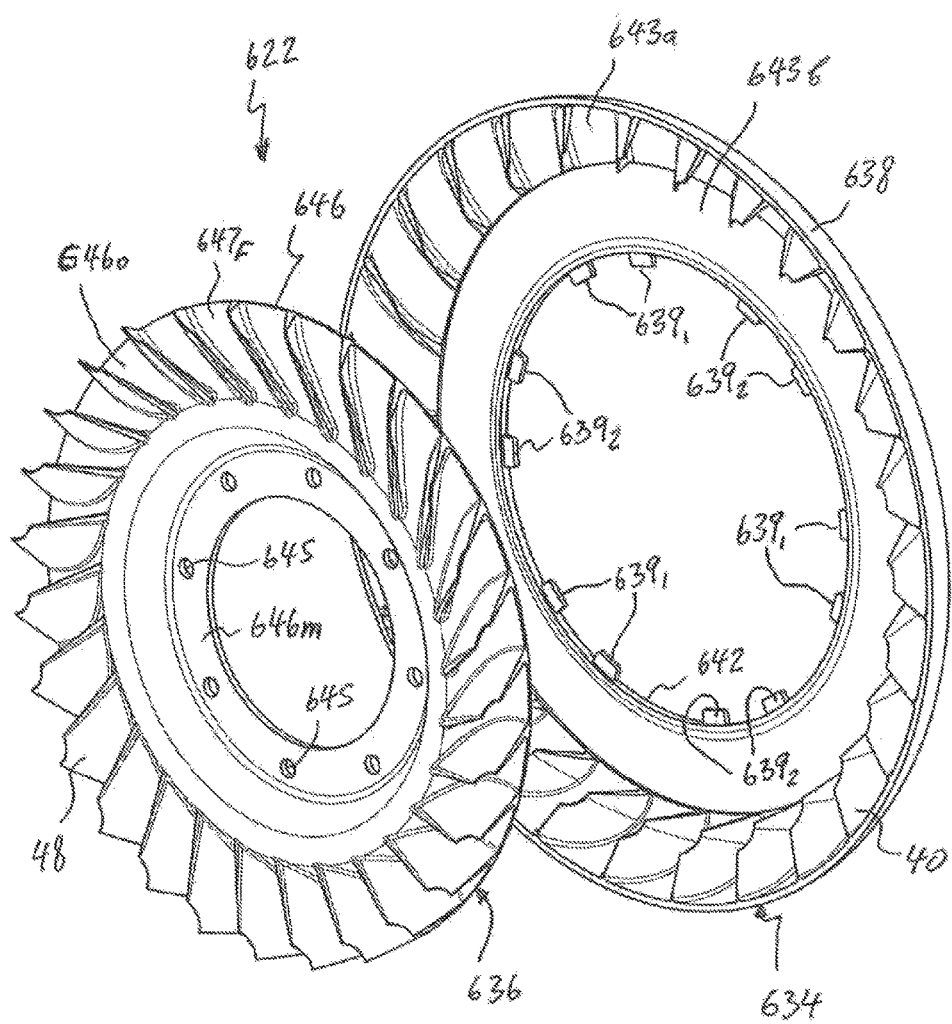
FIG. 53 is a front partial exploded perspective view of the turbine assembly in accordance with the seventh exemplary embodiment of the present invention.
Figure 54:
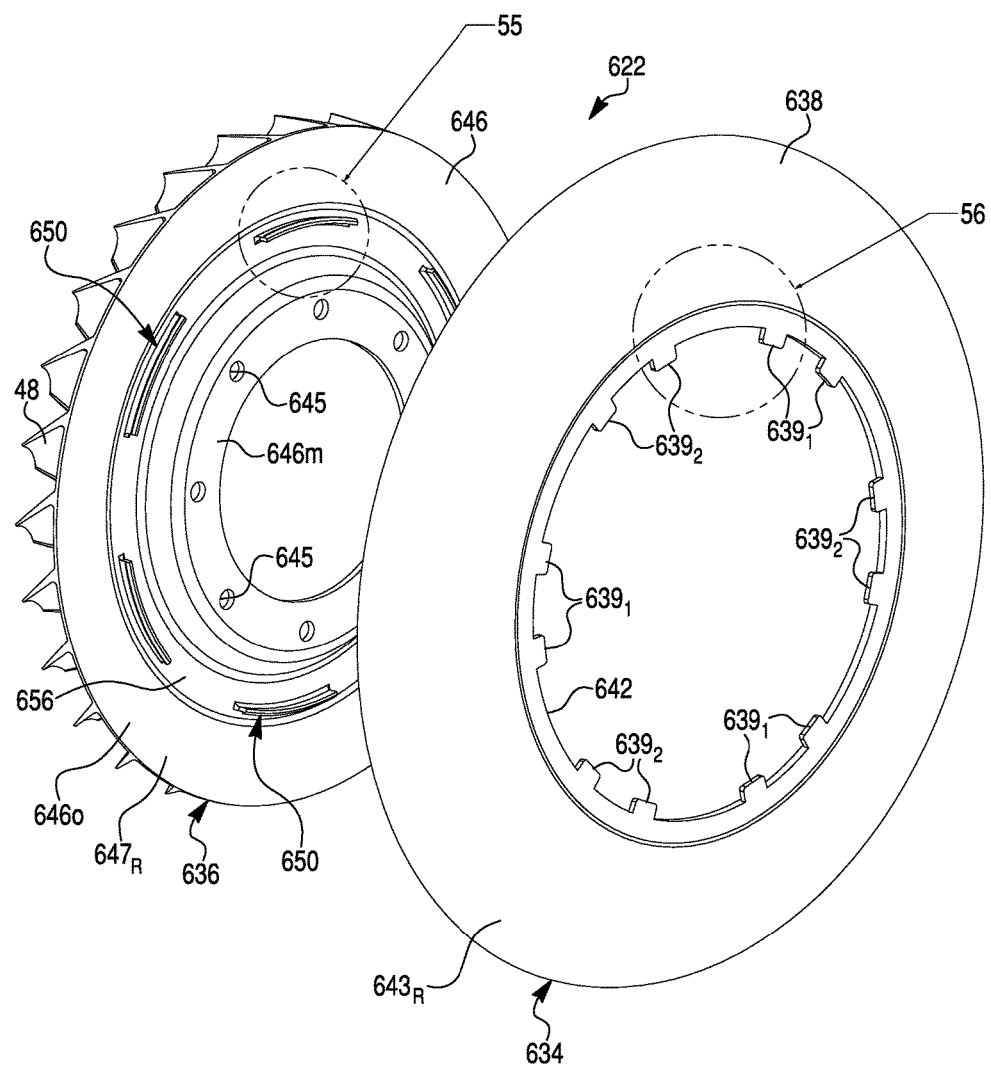
FIG. 54 is a rear partial exploded perspective view of the turbine assembly in accordance with the seventh exemplary embodiment of the present invention.

The turbine assembly 622 of the seventh exemplary embodiment comprises a first turbine component 634 rotatable about the rotational axis X, and a second turbine component 636 non-moveably secured to the first turbine component 634 coaxially therewith, as best shown in FIGS. 52-54. As illustrated, the first turbine component 634 includes a substantially annular first turbine shell member 638 and a plurality of first turbine blade members 40 integrally formed therewith and outwardly extending from the first turbine shell member 638 so as to face the impeller blades 25 of the impeller assembly 20. Preferably, the first turbine shell member 638 and the first turbine blade members 40 are made of a single or unitary component, but may be separate components fixedly (i.e., non-moveably) connected together.

The first turbine shell member 638 has a substantially annular, semi-toroidal (i.e., concave) inner surface 643a and a substantially annular support surface 643b located radially within the inner surface 643a of the first turbine shell member 638. Both the inner surface 643a and the support surface 643b of the first turbine shell member 638 are facing the impeller assembly 20. As best shown in FIG. 53, the turbine blade members 40 are integrally formed on and outwardly extend from the inner surface 643a of the first turbine shell member 638 of the first turbine component 634 of the turbine assembly 622. A radially inner peripheral edge 642 of the first turbine shell member 638 is provided with a plurality of circumferentially spaced pairs of protrusions, each pair including first and second protrusions $639_1$ and $639_2$, respectively. The pairs are equiangularly disposed about the edge 642. Each of the first and second protrusions $639_1$ and $639_2$ extending radially inwardly from the radially inner peripheral edge 642 of the first turbine shell member 638 and integrally formed with the first turbine shell member 638, as best shown in FIGS. 53 and 54. Moreover, the radially inner peripheral edge 642 of the first turbine shell member 638 is coaxial (or concentric) with the rotational axis X. According to the seventh exemplary embodiment, a circumferential distance between the first and second protrusions $639_1$ and $639_2$ is substantially bigger that a circumferential distance between the first protrusions $639_1$ or between the second protrusions $639_2$, as best shown in FIGS. 53 and 54.

As further illustrated in FIGS. 52-54, the second turbine component 636 includes a substantially annular second turbine shell member 646 and a plurality of second turbine blade members 48 integrally formed therewith and outwardly extending from the second turbine shell member 646 so as to face the impeller blades 25 of the impeller assembly 20. Preferably, the second turbine shell member 646 and the second turbine blade members 48 are made of a single or unitary component, but may be separate components fixedly (i.e., non-moveably) connected together.

In the seventh exemplary embodiment of the present invention illustrated in FIGS. 52-61, the second turbine component 636 includes two or more of circumferentially (or angularly) spaced snap fasteners 650, as best shown in FIGS. 52, 54, 55, 56, 58 and 61. The snap fasteners 650 are configured to fixedly (i.e., non-moveably) secure the first turbine component 634 of the turbine assembly 622 to the second turbine component 636 thereof. A second turbine shell member 646 of the second turbine component 636 non-moveably engages a first turbine shell member 638 of the first turbine component 634 so as to define together a turbine shell 630 of the turbine assembly 622.

Figure 55:
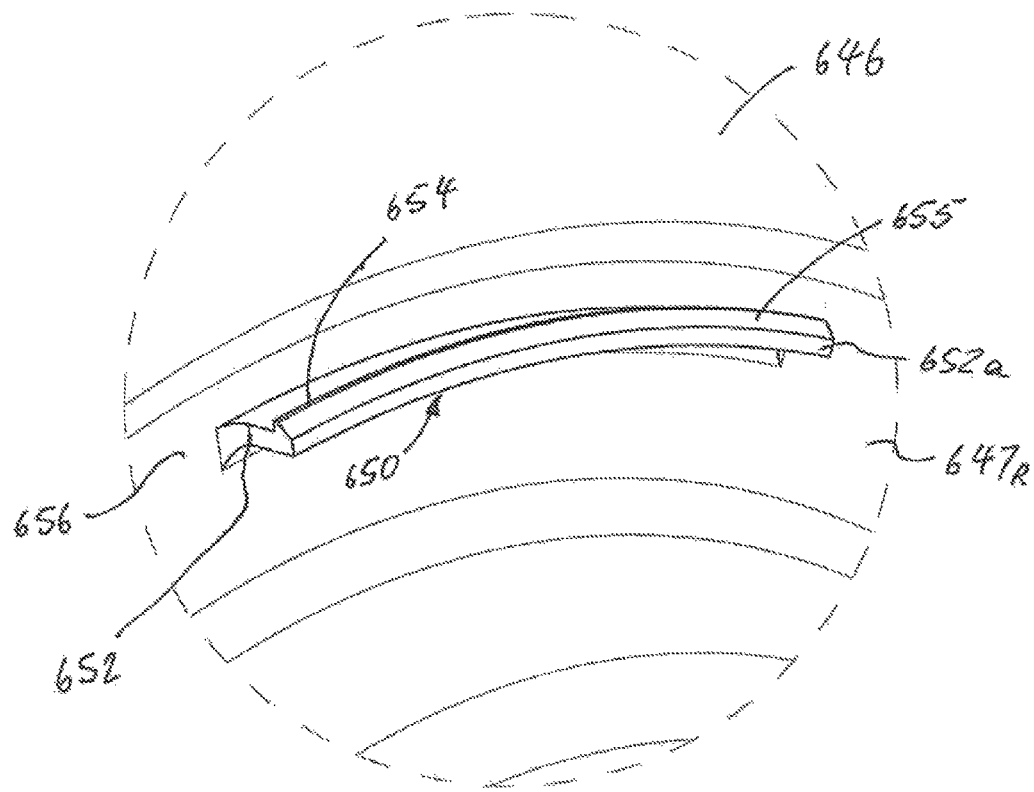
FIG. 55 is an enlarged view of a fragment of the turbine assembly shown in the circle "55" of FIG. 54.
Figure 56:
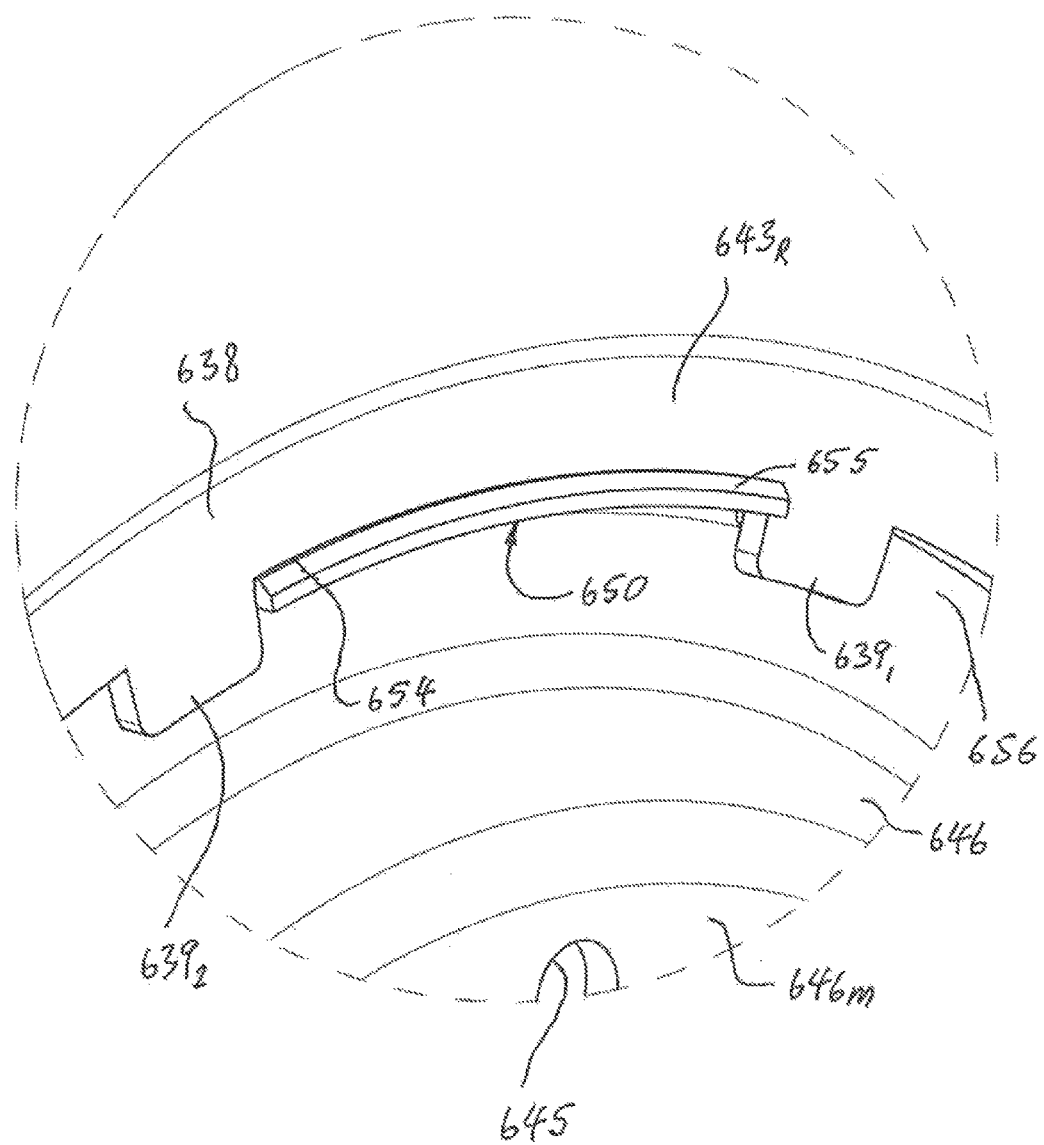
FIG. 56 is an enlarged view of a fragment of the turbine assembly shown in the circle "56" of FIG. 54 including snap fasteners fixedly securing the first turbine component of the turbine assembly to the second turbine component thereof.
Figure 57:
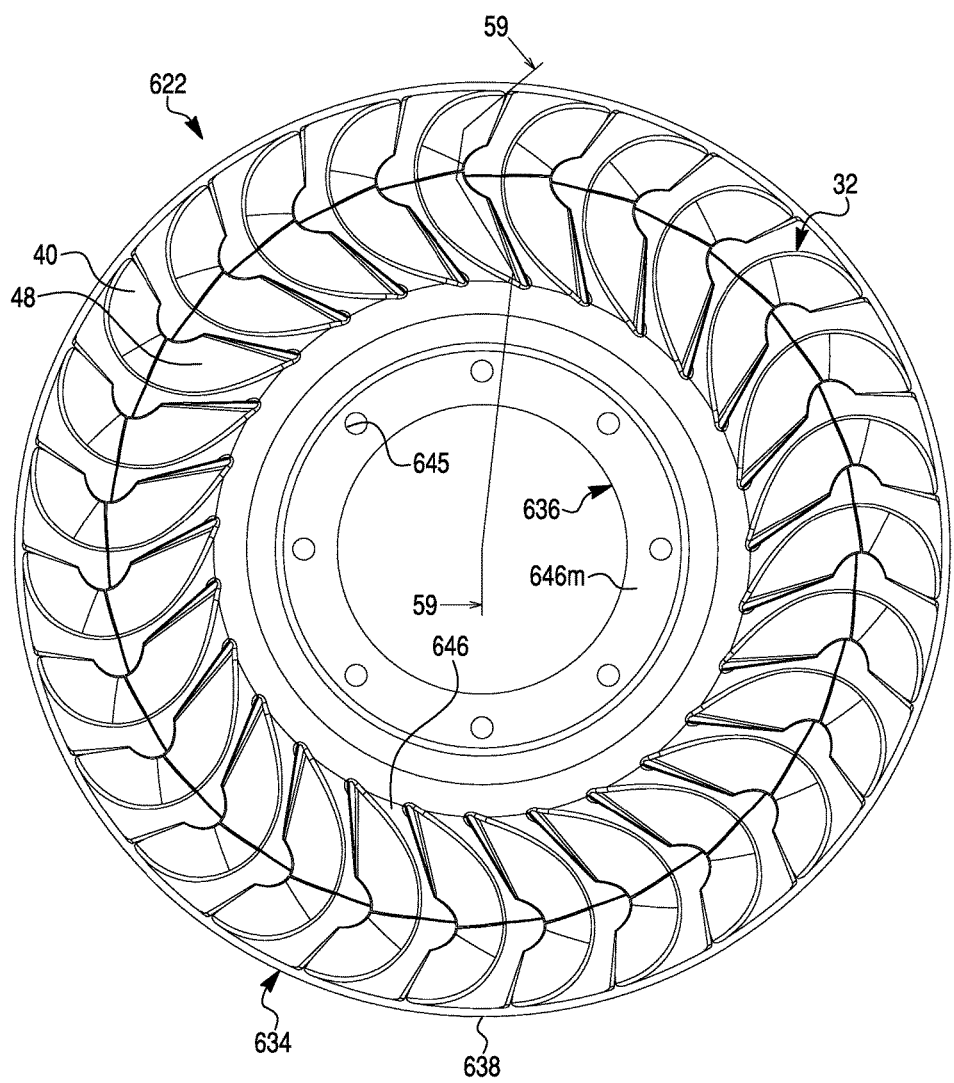
FIG. 57 is a front elevational view of the turbine assembly in accordance with the seventh exemplary embodiment of the present invention.
Figure 58:
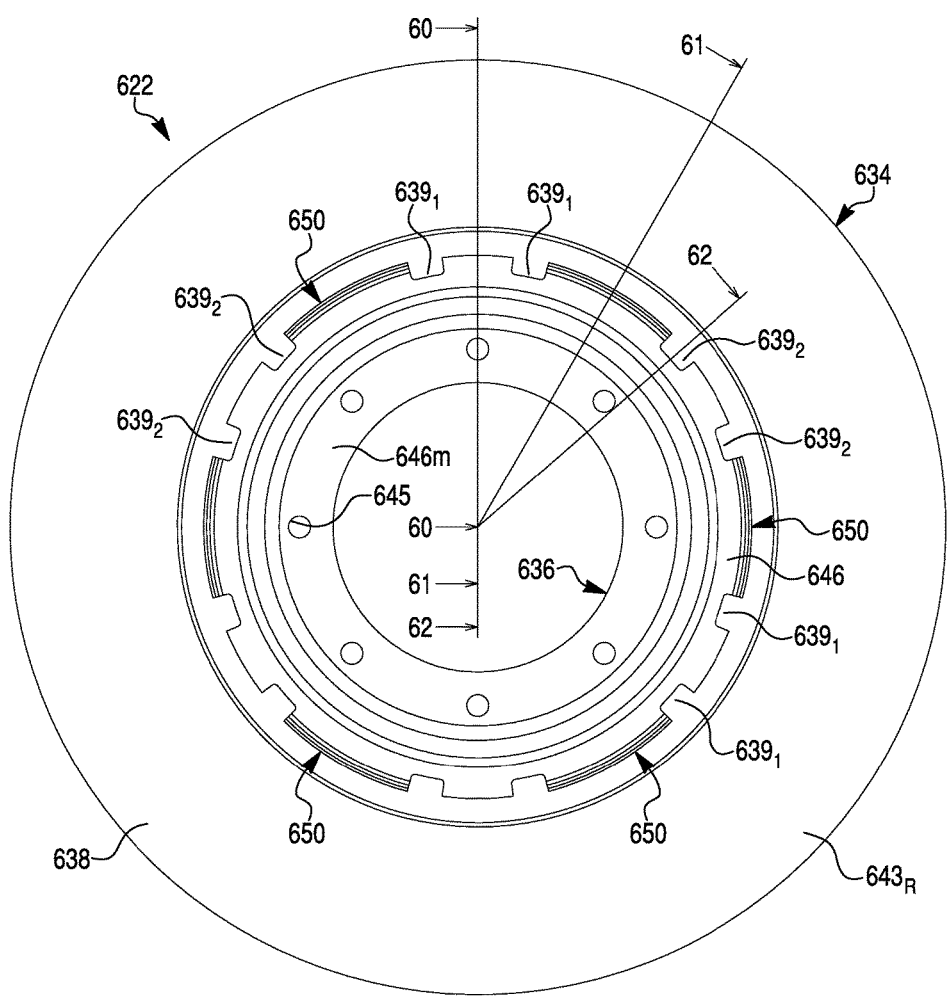
FIG. 58 is a rear elevational view of the turbine assembly in accordance with the seventh exemplary embodiment of the present invention.
Figure 61:
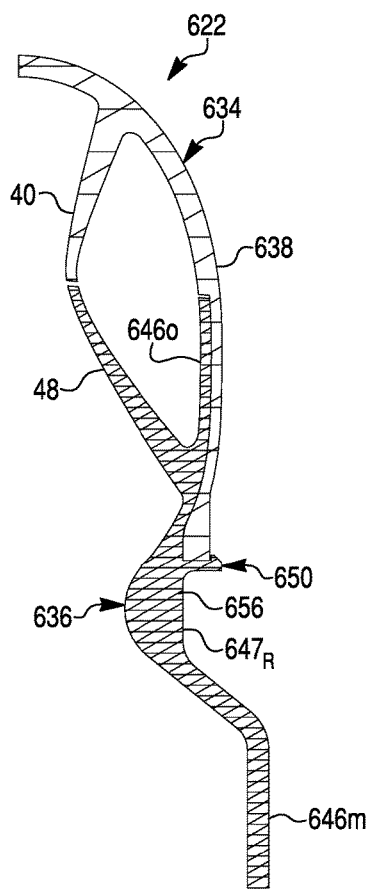
FIG. 61 is a partial sectional view the turbine assembly taken along the line 61-61 in FIG. 58.
Figure 62:
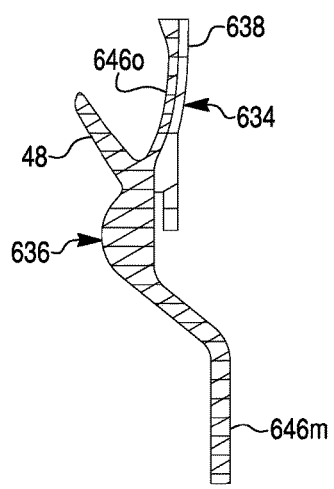
FIG. 62 is a partial sectional view the turbine assembly taken along the line 62-62 in FIG. 58.

Each of the snap fasteners 650 according to the seventh exemplary embodiment of the present invention includes a resilient snap arm 652 integrally formed with the base portion 656 of the second turbine shell member 646 on an annular outer surface $647_R$ thereof so as to extend axially outward from the outer surface $647_R$ of the second turbine shell member 646 toward the first turbine shell member 638 of the first turbine component 634, as best shown in FIG. 55. Preferably, the snap arms 652 extend substantially perpendicularly to the outer surface $647_R$ of the second turbine shell member 646, or substantially parallel to the rotational axis X. Also, each of the snap arms 652 extends substantially circumferentially (or angularly). In other words, each of the snap arms 652 is a circular arc (i.e., part of a circle) coaxial (or concentric) with the rotational axis X. Moreover, a radius of the radially inner peripheral edge 642 of the first turbine shell member 638 and a radius of a radially outer peripheral surface of each of the snap arms 652 are substantially equal to each other.

Furthermore, the snap arms 652 are configured to axially extend between the first and second protrusions $639_1$ and $639_2$ formed on the radially inner peripheral edge 642 of the first turbine shell member 638 in order to non-rotatably secure the second turbine component 636 relative to the first turbine component 634. Specifically, a circumferential (or angular) length of each of the snap arms 652 substantially equals to the circumferential distance between the first and second protrusions $639_1$ and $639_2$ of the first turbine component 634. Accordingly, as the snap arms 652 of the second turbine component 636 extend between the first and second protrusions $639_1$ and $639_2$ of the first turbine component 634, the relative angular movement between the first turbine component 634 and the second turbine component 636 is blocked.

Furthermore, an axially distal free end 652a of each of the snap arms 652 is formed with a barb or ledge 654 extending radially outwardly from the axially distal end 652a of the snap arm 652, as best shown in FIG. 55. Moreover, as best shown in FIG. 55, each of the barbs 654 has an outwardly tapered exterior end surface 655 forming a ramp surface. The snap arms 652 are elastically deformable in the radial direction. The second turbine shell member 646 of the second turbine component 636 is fixedly (i.e., non-moveably) secured to the first turbine shell member 638 of the first turbine component 634 by the snap fasteners 650 extending between the first and second protrusions $639_1$ and $639_2$ of the first turbine component 634.

A method of securing the second turbine component 636 to the first turbine component 634 is as follows. First, the snap arms 652 of the snap fasteners 650 on the second turbine component 636 are inserted into spaces between the first and second protrusions $639_1$ and $639_2$ of the first turbine component 634. The snap arms 652 are pressed toward the first turbine component 634, causing the snap arms 652 to resiliently deform inwardly as a result of the pressure applied by the radially inner peripheral edge 642 of the first turbine component 634 against the tapered exterior end surfaces 655 of the barbs 654 of the snap fasteners 650. During insertion, the outwardly inclined tapered exterior end surfaces 655 of the barbs 654 also act to guide the snap arms 652 into the spaces between the first and second protrusions $639_1$ and $639_2$ of the first turbine component 634. The snap arms 652 of the snap fasteners 650 advance toward the first turbine component 634 until the snap arms 652 spring back to their original or undeformed position as soon as the barbs 654 pass (or clear) the radially inner peripheral edge 642 of the first turbine component 634, i.e. until the barbs 654 of the snap fasteners 650 of the second turbine component 636 positively engage an annular rear surface $643_R$ of the first turbine shell member 638 so that the annular outer surface $647_R$ of the second turbine shell member 646 engages the annular support surface 643b of the first turbine shell member 638.

In a hydrokinetic torque coupling device of a eighth exemplary embodiment illustrated in FIGS. 63-72, the turbine assembly 622 is replaced by a turbine assembly 722. The hydrokinetic torque coupling device of FIGS. 63-72 corresponds substantially to the hydrokinetic torque coupling device 610 of FIGS. 52-62, and only the portions of the turbine assembly 722, which differ, will therefore be explained in detail below.

In the eighth exemplary embodiment of the present invention illustrated in FIGS. 63-72, a second turbine component 736 includes two or more of circumferentially (or angularly) spaced snap fasteners 750, as best shown in FIGS. 64-66, 68, 71 and 72. The snap fasteners 750 are configured to fixedly (i.e., non-moveably) secure a first turbine component 734 of the turbine assembly 722 to the second turbine component 736 thereof. A second turbine shell member 746 of the second turbine component 736 non-moveably engages a first turbine shell member 738 of the first turbine component 734 so as to define together a turbine shell of the turbine assembly 722.

The turbine assembly 722 of the eighth exemplary embodiment comprises a first turbine component 734 rotatable about the rotational axis X, and a second turbine component 736 non-moveably secured to the first turbine component 734 coaxially therewith, as best shown in FIGS. 63-64 and 68-72. As illustrated, the first turbine component 734 includes a substantially annular first turbine shell member 738 and a plurality of first turbine blade members 40 integrally formed therewith and outwardly extending from the first turbine shell member 738 so as to face the impeller blades 25 of the impeller assembly 20. Preferably, the first turbine shell member 738 and the first turbine blade members 40 are made of a single or unitary component, but may be separate components fixedly (i.e., non-moveably) connected together.

Figure 63:
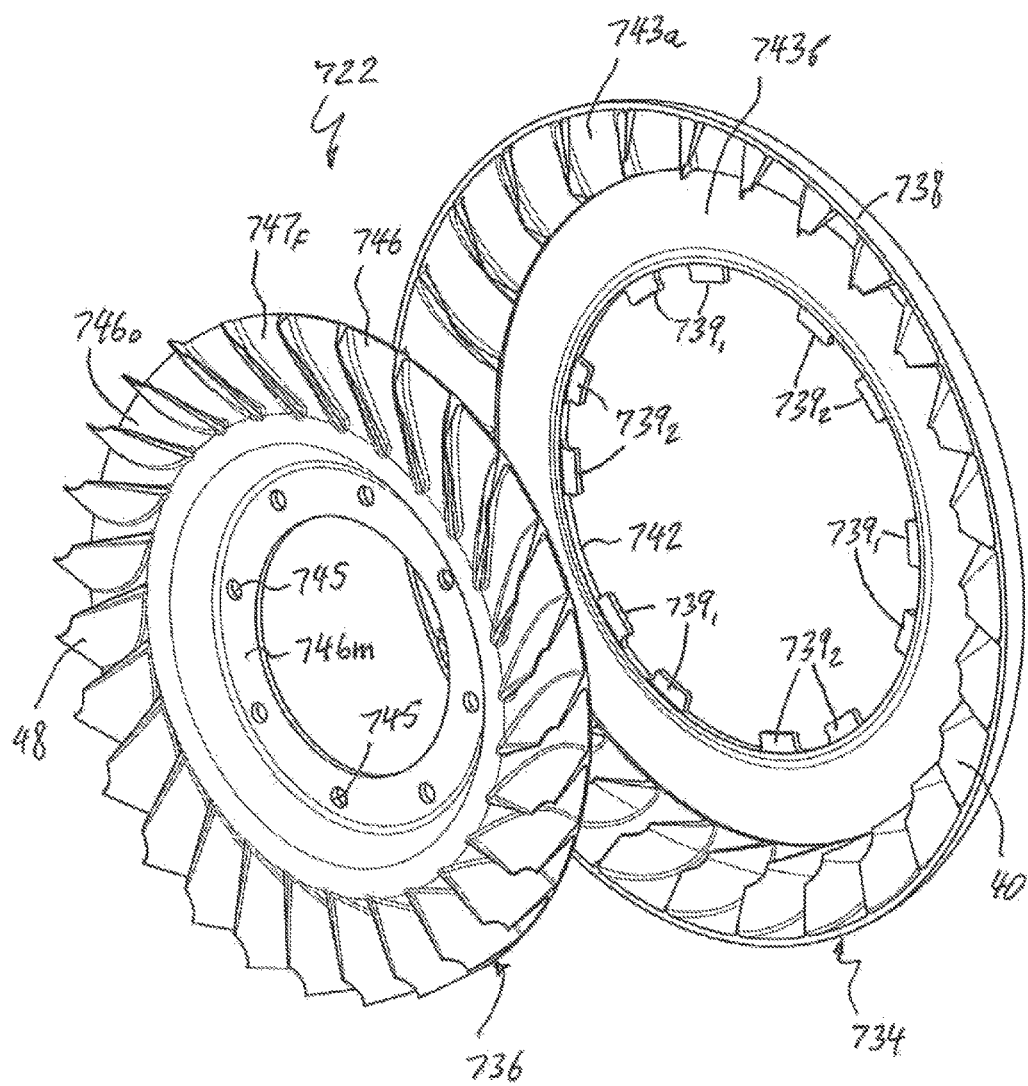
FIG. 63 is a front partial exploded perspective view of the turbine assembly in accordance with the eighth exemplary embodiment of the present invention.
Figure 64:
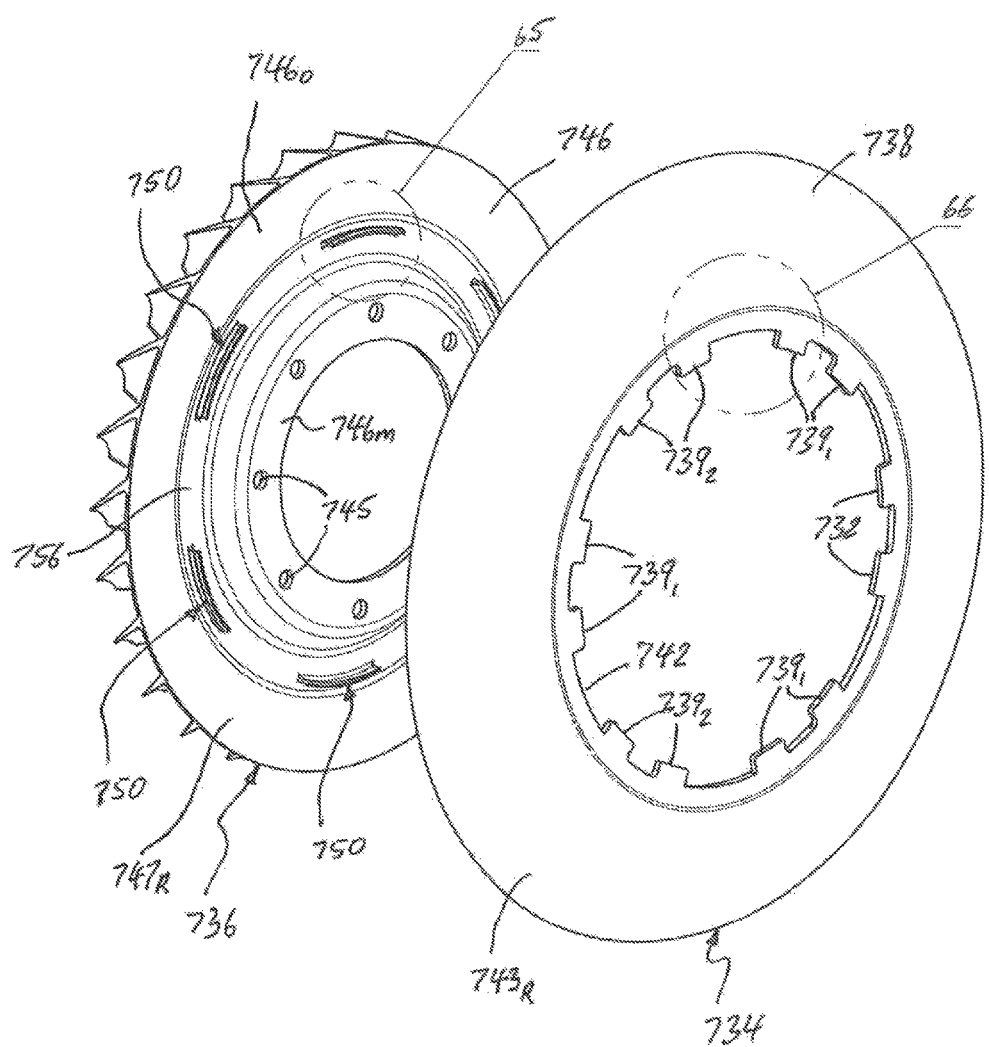
FIG. 64 is a rear partial exploded perspective view of the turbine assembly in accordance with the eighth exemplary embodiment of the present invention.

A radially inner peripheral edge 742 of the first turbine shell member 738 is provided with a plurality of circumferentially spaced pairs of protrusions, each pair including first and second protrusions $739_1$ and $739_2$, respectively. Each of the first and second protrusions $739_1$ and $739_2$ extending radially inwardly extending from the radially inner peripheral edge 742 of the first turbine shell member 738 and integrally formed with the first turbine shell member 738, as best shown in FIGS. 63 and 64. Moreover, the radially inner peripheral edge 742 of the first turbine shell member 738 is coaxial (or concentric) with the rotational axis X, as best shown in FIG. 68. According to the seventh exemplary embodiment, a circumferential distance between the first and second protrusions $739_1$ and $739_2$ is substantially bigger that a circumferential distance between the first protrusions $739_1$ or between the second protrusions $739_2$, as best shown in FIGS. 63, 64 and 68.

As further illustrated in FIGS. 63-64 and 68-72, the second turbine component 736 includes a substantially annular second turbine shell member 746 and a plurality of second turbine blade members 48 integrally formed therewith and outwardly extending from the second turbine shell member 746 so as to face the impeller blades 25 of the impeller assembly 20. Preferably, the second turbine shell member 746 and the second turbine blade members 48 are made of a single or unitary component, but may be separate components fixedly (i.e., non-moveably) connected together.

Figure 65:
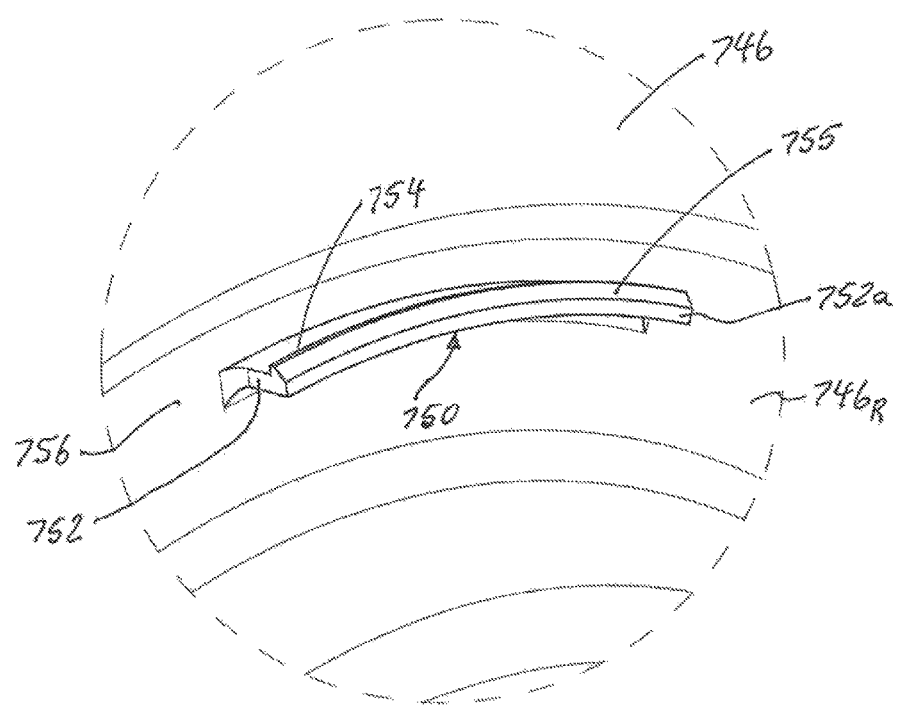
FIG. 65 is an enlarged view of a fragment of the turbine assembly shown in the circle "65" of FIG. 64.
Figure 66:
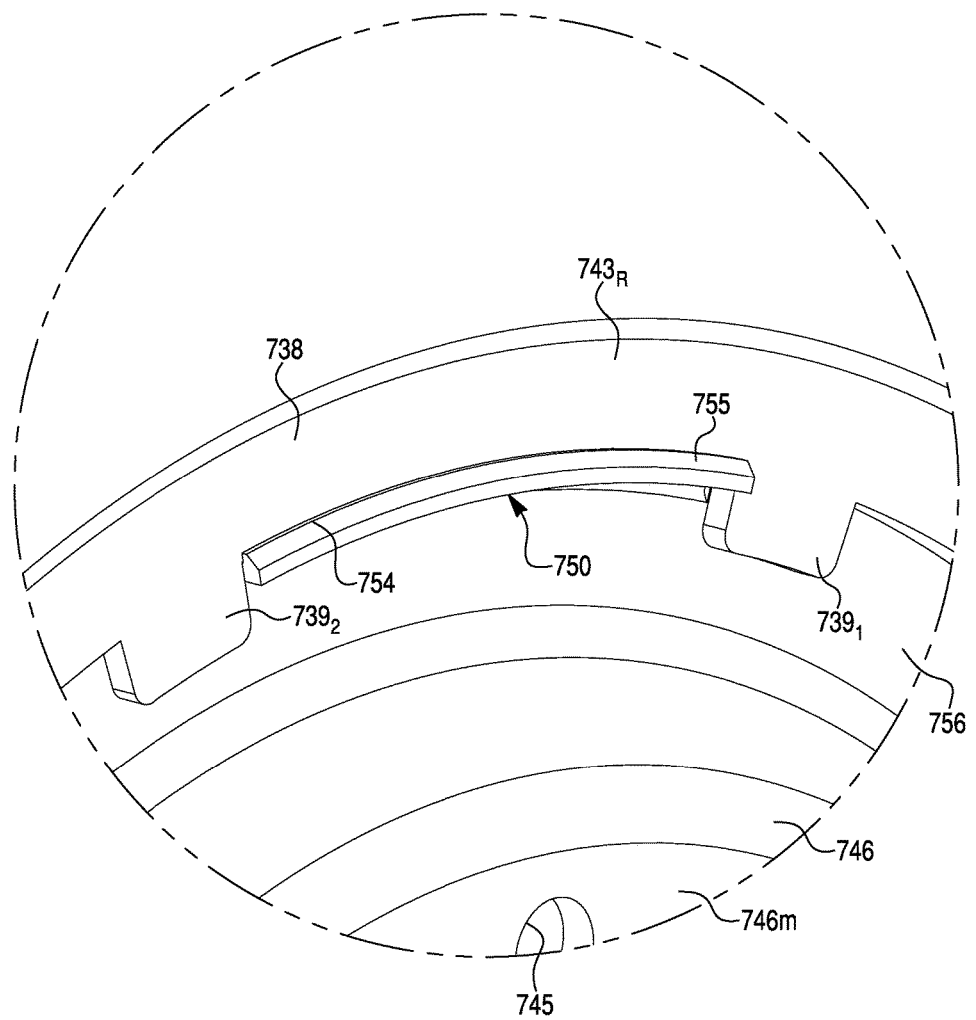
FIG. 66 is an enlarged view of a fragment of the turbine assembly shown in the circle "66" of FIG. 64 including snap fasteners fixedly securing the first turbine component of the turbine assembly to the second turbine component thereof.

Each of the snap fasteners 750 according to the eighth exemplary embodiment of the present invention includes a resilient snap arm 752 integrally formed with a base portion 756 of the second turbine shell member 746 on an annular outer surface $747_R$ thereof so as to extend axially outward from the outer surface $747_R$ of the second turbine shell member 746 toward the first turbine shell member 738 of the first turbine component 734, as best shown in FIG. 65. Preferably, the snap arms 752 extend substantially perpendicularly to the outer surface $747_R$ of the second turbine shell member 746, or substantially parallel to the rotational axis X. Also, each of the snap arms 752 extends substantially circumferentially (or angularly). In other words, each of the snap arms 752 is a circular arc (i.e., part of a circle) but not coaxial with the rotational axis X, as best shown in FIG. 68. Specifically, a radius $R_1$ of the radially inner peripheral edge 742 of the first turbine shell member 738 is substantially different than a radius $R_2$ of a radially outer peripheral surface of each of the snap arms 752. Moreover, as best shown in FIG. 68, the radii $R_1$ and $R_2$ have different centers radially spaced from each other to a distance δ.

Moreover, the snap arms 752 are configured to axially extend between the first and second protrusions $739_1$ and $739_2$ formed on the radially inner peripheral edge 742 of the first turbine shell member 738 in order to non-rotatably secure the second turbine component 736 relative to the first turbine component 734. Specifically, a circumferential (or angular) length of each of the snap arms 752 substantially equals to the circumferential distance between the first and second protrusions $739_1$ and $739_2$ of the first turbine component 734. Accordingly, as the snap arms 752 of the second turbine component 736 extend between the first and second protrusions $739_1$ and $739_2$ of the first turbine component 734, the relative angular movement between the first turbine component 734 and the second turbine component 736 is blocked.

Furthermore, an axially distal free end 752a of each of the snap arms 752 is formed with a barb or ledge 754 extending radially outwardly from the axially distal end 752a of the snap arm 752, as best shown in FIG. 65. Moreover, as best shown in FIG. 65, each of the barbs 754 has an outwardly tapered exterior end surface 755 forming a ramp surface. The snap arms 752 are elastically deformable in the radial direction. The second turbine shell member 746 of the second turbine component 736 is fixedly (i.e., non-moveably) secured to the first turbine shell member 738 of the first turbine component 734 by the snap fasteners 750 extending between the first and second protrusions $739_1$ and $739_2$ of the first turbine component 734.

A method of securing the second turbine component 736 to the first turbine component 734 is as follows. First, the snap arms 752 of the snap fasteners 750 on the second turbine component 736 are inserted into spaces between the first and second protrusions $739_1$ and $739_2$ of the first turbine component 734. The snap arms 752 are pressed toward the first turbine component 734, causing the snap arms 752 to resiliently deform inwardly as a result of the pressure applied by the radially inner peripheral edge 742 of the first turbine component 734 against the tapered exterior end surfaces 755 of the barbs 754 of the snap fasteners 750. During insertion, the outwardly inclined tapered exterior end surfaces 755 of the barbs 754 also act to guide the snap arms 752 into the spaces between the first and second protrusions 739$_1$ and 739$_2$ of the first turbine component 734. The snap arms 752 advance toward the first turbine component 734 until the snap arms 752 spring back to their original or undeformed position as soon as the barbs 754 pass (or clear) the radially inner peripheral edge 742 of the first turbine component 734, i.e. until the barbs 754 of the snap fasteners 750 of the second turbine component 736 positively engage an annular rear surface 743$_R$ of the first turbine shell member 738 so that the annular outer surface 747$_R$ of the second turbine shell member 746 engages the annular support surface 743$b$ of the first turbine shell member 738. As the snap arms 752 are not coaxial with the rotational axis X, the deformation of the snap arms 752 during assembly of the turbine assembly 722 is less and stress and plastic deformation lower on distal ends (extremities) of the snap arms 752, then during the assembly of the turbine assembly 622 of the seventh exemplary embodiment.

In a hydrokinetic torque coupling device 810 of a ninth exemplary embodiment illustrated in FIGS. 73-81, the torque converter 14 is replaced by a torque converter 814. The hydrokinetic torque coupling device 810 of FIGS. 73-81 corresponds substantially to the hydrokinetic torque coupling device 10 of FIGS. 1-8C, and only the portions of the torque converter 814 which differ will therefore be explained in detail below.

The torque converter 814 of the ninth exemplary embodiment comprises an impeller assembly (sometimes referred to as the pump or impeller wheel) 20, a turbine assembly (sometimes referred to as the turbine wheel) 822, and a stator assembly (sometimes referred to as the reactor) 824 interposed axially between the impeller assembly 20 and the turbine assembly 822. The impeller assembly 20, the turbine assembly 822, and the stator assembly 824 are coaxially aligned with one another and the rotational axis X. The impeller assembly 20, the turbine assembly 822, and the stator assembly 824 collectively form a torus. The impeller assembly 20 and the turbine assembly 822 may be fluidly coupled to one another in operation as known in the art. The torque coupling device 810 also includes a substantially annular turbine (or output) hub 28 (as best shown in FIGS. 74 and 75) rotatable about the rotational axis X, which is arranged to non-rotatably couple together the driven shaft and the turbine assembly 822. A sealing member 29 (best shown in FIGS. 73 and 74) is mounted to a radially inner peripheral surface of the turbine hub 28 so as to create a seal at the interface of the transmission input shaft and the turbine hub 28.

The turbine assembly 822, as best shown in FIG. 74, comprises a substantially annular, semi-toroidal (or concave) turbine shell 830 rotatable about the rotational axis X, and a plurality of turbine blades 32 fixedly (i.e., non-moveably) secured to the turbine shell 830 and outwardly extending from the turbine shell 830 so as to face impeller blades 25 of the impeller assembly 20. The turbine shell 830 of the turbine assembly 822 is non-movably (i.e., fixedly) secured to the turbine hub 28 by appropriate means, such as by rivets 27 (as best shown in FIG. 74) or welding.

Figure 73:
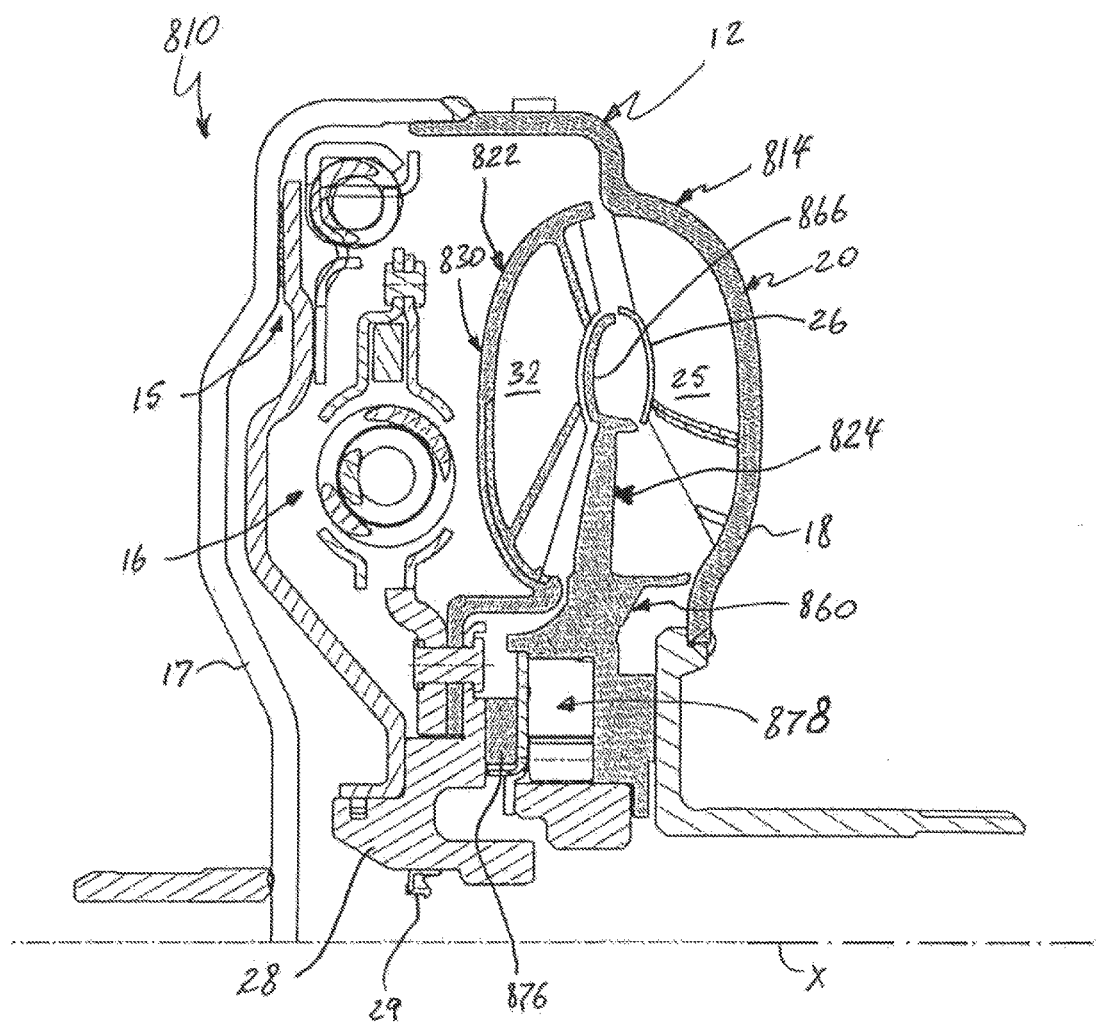
FIG. 73 is a fragmented half-view in axial section of a hydrokinetic torque coupling device with a stator assembly in accordance with a ninth exemplary embodiment of the present invention.
Figure 74:
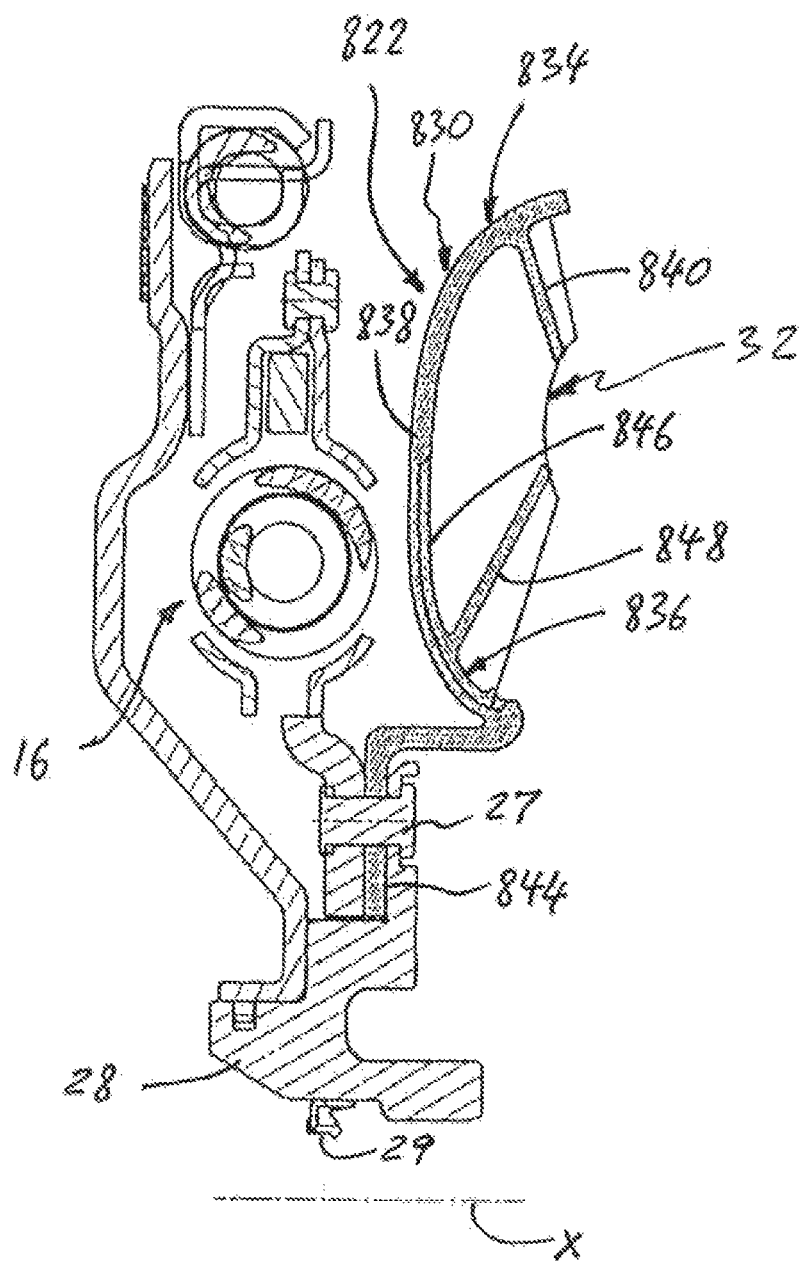
FIG. 74 is a fragmented half-view in axial section of the hydrokinetic torque coupling device in accordance with the ninth exemplary embodiment of the present invention without an impeller assembly.
Figure 75:
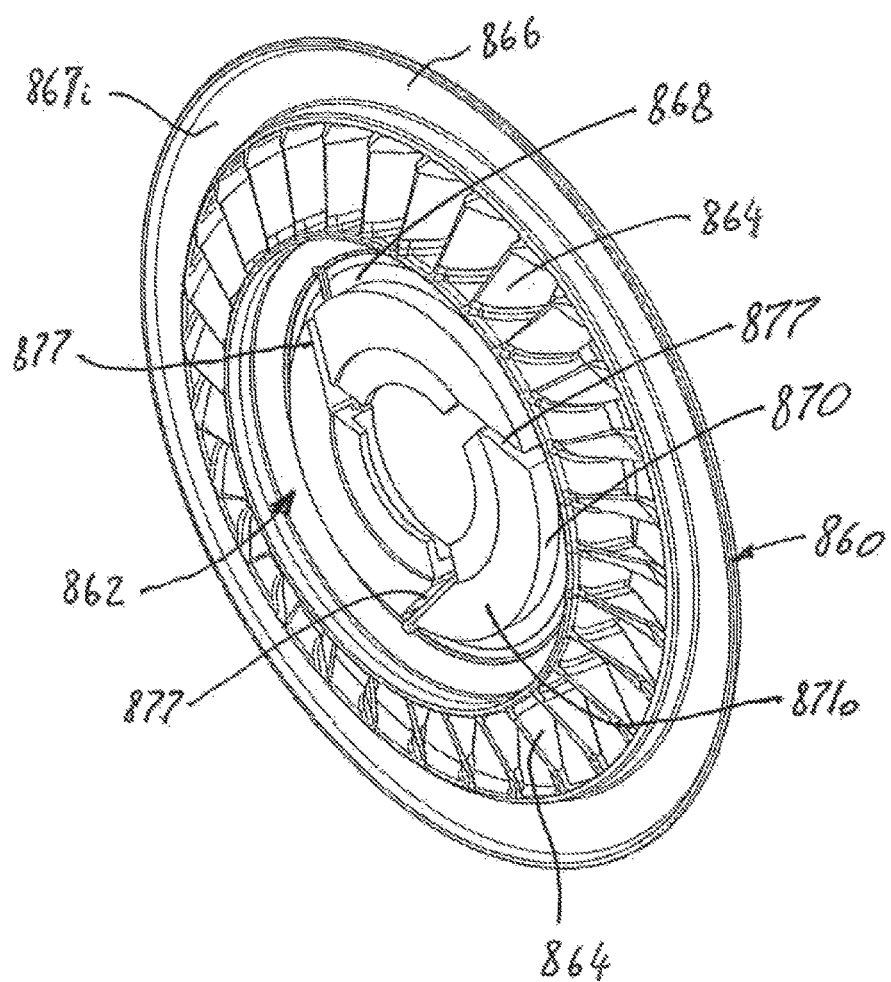
FIG. 75 is an impeller side perspective view of a stator in accordance with the ninth exemplary embodiment of the present invention.

Furthermore, the turbine assembly 822 comprises a first turbine component 834 rotatable about the rotational axis X, and a second turbine component 836 formed separately from and non-moveably secured to the first turbine component 834 coaxially therewith, as best shown in FIGS. 73 and 74. As illustrated in FIG. 74, the first turbine component 834 includes a substantially annular first turbine shell member 838 and a plurality of first turbine blade members 840 integrally formed therewith and outwardly extending from the first turbine shell member 838 so as to face the impeller blades 25 of the impeller assembly 20. Preferably, the first turbine shell member 838 and the first turbine blade members 840 are made of a single or unitary (i.e., one-piece) component, but may be separate components fixedly (i.e., non-moveably) connected together. The first turbine shell member 838 is fixedly secured to the turbine hub 28 by the rivets 27 extending through holes in the mounting portion 844 of the first turbine shell member 838.

The second turbine component 836 is formed separately from the first turbine component 834 and includes a substantially annular second turbine shell member 846, and a plurality of second turbine blade members 848 integrally formed therewith and outwardly extending from the second turbine shell member 846 so as to face the impeller blades 25 of the impeller assembly 20, as illustrated in FIGS. 74 and 75. Preferably, the second turbine shell member 846 and the second turbine blade members 848 are made of a single or unitary (i.e., one-piece) component, but may be separate components fixedly (i.e., non-moveably) connected together.

The second turbine shell member 846 of the second turbine component 836 non-moveably engages the first turbine shell member 838 of the first turbine component 834 by appropriate means known in the art, such as adhesive bonding, friction welding, snap-on connection, etc. In other words, the second turbine shell member 846 is fixedly (i.e., non-moveably) secured to the first turbine shell member 838 by appropriate means, including, but not limited to, those mechanisms described in the first to eighth embodiments of the present invention. Specifically, according to the ninth exemplary embodiment of the present invention, the second turbine shell member 846 of the second turbine component 836 is fixedly secured the first turbine shell member 838 of the first turbine component 834 by ultrasonic welding.

Thus, the first turbine component 834 and the second turbine component 836 are formed separately, and then non-moveably, coaxially assembled together so as to form the turbine assembly 822. Also, the second turbine shell member 846 of the second turbine component 836 is non-moveably secured to the first turbine shell member 838 of the first turbine component 834 so as to define together the turbine shell 830 of the turbine assembly 822.

According to the present invention, the first and second turbine components 834 and 836, respectively, are made by casting aluminum or magnesium alloys or by molding thermoplastic or thermosetting plastic materials, or they may be formed by plastic deformation of a metallic material, such as sheet steel. Preferably, each of the first turbine component 834 and the second turbine component 836 is made by injection molding of a thermoplastic polymer, such as a polyetheretherketone (PEEK) thermoplastic polymer, a polytetrafluoroethylene (PTFE) based material, or a thermosetting polymer. PEEK polymer provides fatigue and chemical resistance, can operate at high temperatures and retains outstanding mechanical properties at continuous-use temperatures of up to 240° C. (464° F.), allowing it to replace metal even in the most severe end-use environments. Glass fiber-reinforced and carbon fiber-reinforced grades of PEEK provide a wide range of performance options. For example, each of the first and second turbine components 834 and 836 may be made of a glass fiber and carbon fiber reinforced PEEK, such as the KetaSpire® KT-880 CF30 polyetheretherketone, which is a high flow, 30% carbon fiber reinforced grade of polyetheretherketone.

Alternatively, the first turbine component 834 may be made by casting an aluminum or magnesium alloy, while the second turbine component 836 may be made by injection molding a thermoplastic polymer, such as a polyetheretherketone (PEEK) thermoplastic polymer, a polytetrafluoroethylene (PTFE) based material, or a thermosetting polymer, such as a glass fiber and carbon fiber reinforced PEEK, such as the KetaSpire® KT-880 CF30 polyetheretherketone.

In other words, the first turbine component 834 and the second turbine component 836 could be made of the same or different materials having different mechanical and chemical characteristics, such as a specific strength, specific weight, density, modulus of elasticity, etc.

Moreover, as best shown in FIGS. 73 and 74, at least one of the first turbine component 834 and the second turbine component 836 has a variable thickness. In fact, both the first turbine shell member 838 and the first turbine blade members 840 of the first turbine component 834 may have a variable thickness, as best shown in FIG. 81. Similarly, both the second turbine shell member 846 and the second turbine blade members 848 of the second turbine component 836 may have a variable thickness. Accordingly, the molded turbine assembly 822 can have variations in thickness, and be formed in a very particular form and shape. Also, the molded turbine assembly can have reinforcing ribs. Thus, with the molded turbine assembly of the present invention there is a possibility for mass optimization by putting the thickness where it is needed for strength, and reducing the thickness where it is not needed, where stress and deformation are low. This allows optimization of weight and performance characteristics.

The stator assembly 824 is rotatable about the rotational axis X and comprises a stator (or reactor) 860, a one-way (or overrunning) clutch 878 is mounted to the stator 860, a substantially annular retainer plate 872 mounted to the stator 860 to retain the one-way clutch 878 in the stator 860, and a turbine thrust bearing in the form of an annular plastic washer 876 mounted adjacent to the retainer plate 872 between the stator 860 and the turbine hub 28. The one-way clutch 878, shown in FIGS. 73 and 80, permits rotation of the stator 860 in one direction only.

The stator 860, as best shown in FIG. 75, includes a substantially annular stator hub 862 coaxial to the rotational axis X, an annular stator core ring 866 coaxial to the rotational axis X and located radially outside the stator hub 862, and a plurality of stator blades 864 integral with and interconnecting the stator hub 862 and the stator core ring 866. Thus, the stator blades 864 extend radially outwardly from the stator hub 862, which is located radially inwardly and central to the stator blades 864. In other words, the stator blades 864 extend radially between the annular stator hub 862 and the annular stator core ring 866. In turn, the stator core ring 866 extends radially outwardly from the stator blades 864 and the stator hub 862, as best shown in FIGS. 80 and 81.

The stator core ring 866 is curved in the axial direction. In other words, the stator core ring 866 is semi-toroidal in cross-section similarly to the impeller core ring 26 of the impeller assembly 20, as best shown in FIGS. 73, 80 and 81. As illustrated in FIG. 81, the stator core ring 866 of the stator 860 has axially opposite an axially inner concave surface 867i facing the impeller core ring 26 of the impeller assembly 20, and an axially outer convex surface 867o facing the turbine blades 32 of the turbine assembly 822 and away from the impeller core ring 26. The stator core ring 866 is formed at radially distal ends 865o of the stator blades 864. The stator core ring 866 is axially aligned with the impeller core ring 26 of the impeller assembly 20, as best shown in FIG. 73. Moreover, the stator core ring 866 is axially spaced from the turbine blades 32, as best shown in FIGS. 73 and 74.

As best shown in FIG. 81, the stator hub 862 includes an annular base member 868 coaxial to the rotational axis X, and a transverse wall 870 extending radially inwardly from the base member 868 so as to define an axial annular hub bore 874 within the stator hub 862. The annular hub bore 874 is coaxial to the rotational axis X. The axial annular hub bore 874 within the stator hub 862 is delimited by a cylindrical inner peripheral surface 869 of the base member 868 and an annular inner transverse surface 871i of the transverse wall 870. The cylindrical inner peripheral surface 869 of the base member 868 extends substantially coaxially to the rotational axis X, while the inner transverse surface 871i of the transverse wall 870 extend substantially perpendicular to the rotational axis X.

The one-way clutch 878 is disposed substantially in the hub bore 874 of the stator hub 862 coaxially to the rotational axis X. The one-way clutch 878, as best shown in FIGS. 73 and 80, includes an outer ring 880 non-rotationally secured (i.e., fixed) to the stator hub 862 coaxially to the rotational axis X, an inner ring 882 coaxial to the rotational axis X, and a plurality of sprags or cylindrical rollers 884 circumferentially disposed in an annular space defined between the outer ring 880 and the inner ring 882. The inner ring 882 is splined for non-rotatably coupling to an outer periphery of a stator shaft. The outer ring 880 is mounted within the hub bore 874 coaxially to the rotational axis X so as to non-rotatably engage the inner peripheral surface 869 of the base member 868, best shown in FIG. 81. The outer ring 880 can be toothed externally and force-fit into the inner peripheral surface 869 of the base member 868 so as to non-rotatably secure the outer ring 880 of the one-way clutch 878 to the stator hub 862 of the stator 860. The outer ring 880 abuts the inner transverse surface 871i of the transverse wall 870 to axially position the outer ring 880 in the axial cylindrical hub bore 874 of the stator hub 862.

The annular retainer plate 872, as best shown in FIG. 80, is mounted to the stator hub 862 coaxially with the rotational axis x and adjacent to an axially distal end portion 875 of the base member 868 of the stator hub 862. The retainer plate 872 is provided to retain the one-way clutch 878 in the cylindrical hub bore 874 of the stator hub 862 and to prevent axial movement of the components of the one-way clutch 878 in the direction of the rotational axis X relative to the stator hub 862. As best shown in FIG. 80, the retainer plate 872 is in the form of a substantially annular, planar retainer ring.

Figure 76:
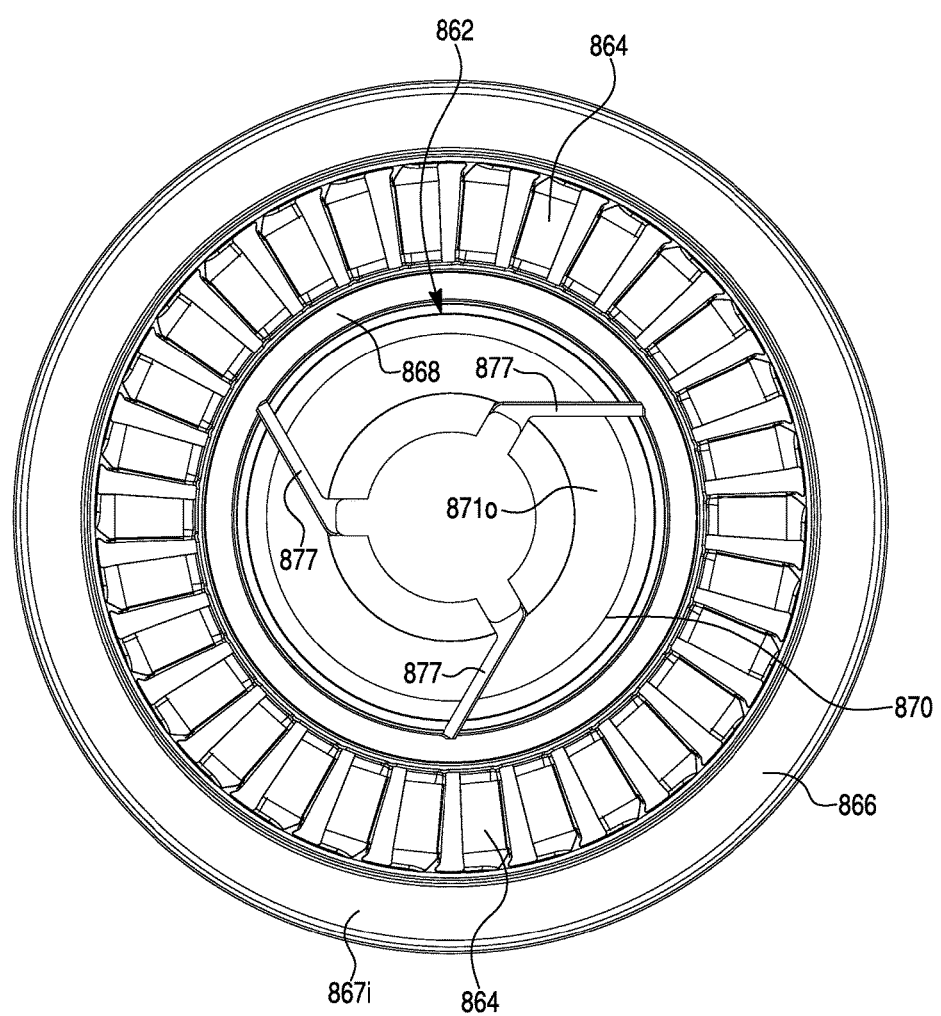
FIG. 76 is an impeller side elevational view of the stator in accordance with the ninth exemplary embodiment of the present invention.
Figure 77:
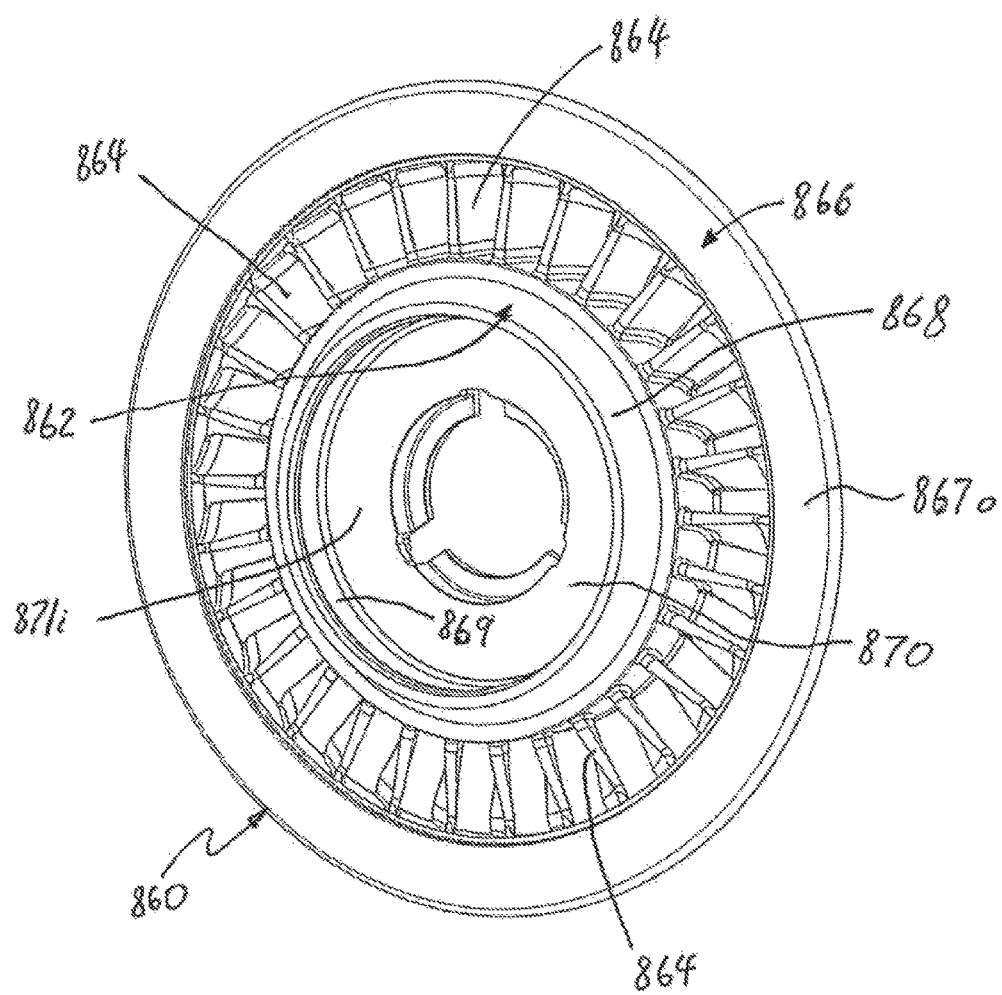
FIG. 77 is a turbine side perspective view of the stator in accordance with the ninth exemplary embodiment of the present invention.

As the stator 860 is rotatable about the rotational axis X, the stator assembly 824 further comprises an impeller thrust bearing between the stator 862 and the impeller assembly 20. As best shown in FIG. 73, the transverse wall 870 of the stator hub 862 acts as the impeller thrust bearing. Specifically, an annular outer transverse surface 871o of the transverse wall 870 slidably engages the impeller assembly 20. As illustrated in FIGS. 73, 80 and 81, the outer transverse surface 871o of the transverse wall 870 is orthogonal to the rotational axis X. Moreover, the transverse wall 870 provided with one or more channels (or grooves) 877 crossing the outer transverse surface 871o thereof, as best illustrated in FIGS. 75 and 76. The one or more channels 877 are open toward and facing the impeller assembly 20.

The turbine thrust bearing 876 is mounted between the retainer plate 872 of the stator assembly 824 and the turbine hub 28 so as to slidingly engage the turbine hub 28. Moreover, the retainer plate 872 includes one or more support tabs 873 extending axially outwardly from the transverse wall 872 and the stator hub 862 toward the turbine hub 28, as best shown in FIG. 80. The turbine thrust bearing 876 is mounted to the support tabs 873 of the retainer plate 872 so as to center and radially support the turbine thrust bearing 876. Thus, the turbine thrust bearing 876 and the impeller thrust bearing 870 allow relative rotation of the stator 862 with respect to the turbine hub 28 and the impeller assembly 20. Accordingly, the turbine thrust bearing 876 is preferably made of low friction plastic materials, such as phenolic polymers. It should be understood that the low friction material prevents or reduces friction between the rotating components.

The stator 860 is made of a single or unitary (i.e., one-piece) component, but may be separate components fixedly (i.e., non-moveably) connected together. According to the present invention, the stator 860 is made by molding of a low friction thermoplastic or thermosetting plastic material. Preferably, each of the first turbine component 834 and the second turbine component 836 is made by injection molding a thermoplastic polymer, such as a polyetheretherketone (PEEK) thermoplastic polymer. PEEK polymer provides fatigue and chemical resistance, can operate at high temperatures and retains outstanding mechanical properties at continuous-use temperatures of up to 240° C. (464° F.), allowing it to replace metal even in the most severe end-use environments. Glass fiber-reinforced and carbon fiber-reinforced grades of PEEK provide a wide range of performance options. For example, the stator 860 according to the exemplary embodiment of the present invention may be made of a carbon fiber reinforced PEEK, such as the KetaSpire® KT-880 CF30 polyetheretherketone, which is a high flow, 30% carbon fiber reinforced grade of polyetheretherketone.

Described below is an exemplary method whereby the stator assembly 824 of a hydrokinetic torque converter 814 according to the ninth exemplary embodiment of the present invention is manufactured. It should be understood that alternative methods may be practiced within the scope of the invention.

According to an embodied method, the stator 860 is molded to form a single-piece part defining the stator hub 862 with the hub bore 874, the stator blades 864 and the stator core ring 866, and having the rotational axis X. The stator 860 is molded from a low friction thermoplastic or thermosetting plastic material, such as carbon fiber reinforced PEEK, for example the KetaSpire® KT-880 CF30 polyetheretherketone.

Then, the one-way clutch 878 is mounted to the stator 860 in the hub bore 874. The one-way clutch 878 may be mounted as follows. The outer ring 880 of the one-way clutch 878 is axially inserted into the hub bore 874 until the outer ring 880 axially engages the inner transverse surface 871i of the transverse wall 870. A press fitting operation may be used to insert the outer ring 880 into inner peripheral surface 869 of the hub bore 874 so as to non-rotatably secure the outer ring 880 of the one-way clutch 878 to the stator hub 862 of the stator 860. The inner ring 882 of the one-way clutch 878 is axially inserted into the stator hub 860 until the inner ring 882 axially engages support tabs 879 of the transverse wall 870 of the stator hub 862. The sprags or cylindrical rollers 884 of the one-way clutch 878 are circumferentially placed in the annular space defined between the outer ring 880 and the inner ring 882. The elements 880, 882 and 884 of the one-way clutch 878 may be inserted into the hub bore 874 in any order or simultaneously.

Next, the annular retainer plate 872, which may be made by metal stamping, is mounted to the stator hub 862 of the stator 860 by inserting the annular retainer plate 872 into the stator hub 862 until the annular retainer plate 872 axially engages at least one of the outer ring 880 of the one-way clutch 878, the inner ring 882 of the one-way clutch 878, and/or a contact surface of the stator hub 862. Then, the turbine thrust bearing in the form of the plastic washer 876 is mounted to the stator hub 862 of the stator 860 by inserting the plastic washer 876 around the support tabs 873 of the retainer plate 872 until the plastic washer 876 axially engages the annular retainer plate 872.

An exemplary method for assembling the hydrokinetic torque converter 814 according to the embodiment of FIGS. 73-81 will now be explained. It should be understood that this exemplary method may be practiced in connection with the other embodiments described herein. This exemplary method is not the exclusive method for assembling the hydrokinetic torque coupling devices described herein. While the methods for assembling the hydrokinetic torque converter 814 may be practiced by sequentially performing the steps as set forth below, it should be understood that the methods may involve performing the steps in different sequences The impeller assembly 20, the turbine assembly 822, and turbine assembly 822 may each be preassembled. The impeller assembly 20, the turbine assembly 822 and the stator assembly 824 are assembled together so as to form the torque converter 814. Specifically, the stator assembly 824 is mounted between the impeller assembly 20 and the turbine assembly 822 so that the inner concave surface 867i of the semi-toroidal stator core ring 866 faces the impeller core ring 26 of the impeller assembly 20. Various modifications, changes, and alterations may be practiced with the above-described embodiment.

Therefore, the present invention provides a novel turbine assembly and a novel stator assembly for a hydrokinetic torque converter and method for assembling thereof. The turbine assembly of the present invention has light weight and reduced inertia that both increase launching performance and reduce exhaust emissions of the engine, allows greater flexibility in design for improved mass and strength optimization compared to turbine assemblies of conventional hydrokinetic torque converters.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque converter, comprising:
an impeller assembly rotatable about a rotational axis, the impeller assembly including an impeller shell, a annular impeller core ring and a plurality of impeller blades outwardly extending between the impeller shell and the impeller core ring; and
a turbine assembly rotatable about the rotational axis and disposed axially opposite to the impeller assembly, the turbine assembly coaxially aligned with and hydrodynamically drivable by the impeller assembly; and
a stator assembly comprising a stator rotatable about the rotational axis, the stator comprising
an annular stator hub coaxial to the rotational axis;
an annular stator core ring coaxial to the rotational axis; and
a plurality of stator blades integral with and interconnecting the stator hub and the stator core ring;
the stator core ring having an axially concave surface facing the impeller core ring of the impeller assembly and an axially convex surface facing the turbine blades of the turbine assembly and away from the impeller core ring, the axially concave surface being axially opposite to the axially convex surface.

2. The hydrokinetic torque converter as defined in claim 1, wherein the stator with the stator hub, the stator blades and the stator core ring is formed as a single-piece part from a plastic material.

3. The hydrokinetic torque converter as defined in claim 2, wherein the plastic material is low friction thermoplastic or thermosetting plastic material.

4. The hydrokinetic torque converter as defined in claim 2, wherein the plastic material is glass fiber-reinforced and carbon fiber-reinforced polyetheretherketone thermoplastic polymer.

5. The hydrokinetic torque converter as defined in claim 1, wherein the stator core ring is curved in the axial direction and extends radially outwardly from the stator blades and the stator hub.

6. The hydrokinetic torque converter as defined in claim 1, wherein the turbine assembly comprises:
a first turbine component coaxial with the rotational axis; and
a second turbine component formed separately from and non-moveably secured to the turbine component coaxially therewith;
the first turbine component having a plurality of first turbine blade members integrally formed therewith; and
a turbine hub rotatable about the rotational axis and non-moveably secured to one of the first turbine component and the second turbine component of the turbine assembly.

7. The hydrokinetic torque converter as defined in claim 6, wherein the second turbine component having a plurality of second turbine blade members integrally formed therewith.

8. The hydrokinetic torque converter as defined in claim 7, wherein each of the first turbine blade members is oriented adjacent to one of the second turbine blade members so as to define together a turbine blade of the turbine assembly.

9. The hydrokinetic torque converter as defined in claim 6, wherein each of the first and second turbine components are formed as a single component.

10. The hydrokinetic torque converter as defined in claim 6, wherein the first and second turbine components are made of different materials having different mechanical characteristics.

11. The hydrokinetic torque converter as defined in claim 1, further comprising a plastic thrust bearing disposed between the impeller assembly and the stator hub of the stator assembly.

* * * * *